US012643379B2

(12) United States Patent
Tsang et al.

(10) Patent No.: US 12,643,379 B2
(45) Date of Patent: Jun. 2, 2026

(54) VEHICLE DOOR

(71) Applicant: Rivian IP Holdings, LLC, Plymouth, MI (US)

(72) Inventors: Ruey-Khan Kenneth Tsang, Tustin, CA (US); Austin Simpson, Huntington Beach, CA (US); William Thomas Wanstall, Huntington Beach, CA (US); Kevin Dean Kline, Mission Viejo, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 483 days.

(21) Appl. No.: 18/194,265

(22) Filed: Mar. 31, 2023

(65) Prior Publication Data

US 2024/0123799 A1    Apr. 18, 2024

Related U.S. Application Data

(60) Provisional application No. 63/379,527, filed on Oct. 14, 2022.

(51) Int. Cl.
| | |
|---|---|
| B60J 5/04 | (2006.01) |
| B60N 2/01 | (2006.01) |
| B60R 3/02 | (2006.01) |
| B60R 19/52 | (2006.01) |
| B62D 65/06 | (2006.01) |
| E05D 3/02 | (2006.01) |
| E05D 11/08 | (2006.01) |

(52) U.S. Cl.
CPC .............. B60J 5/0473 (2013.01); B60N 2/01 (2013.01); B60R 3/02 (2013.01); B60R 19/52 (2013.01); B62D 65/06 (2013.01); E05D 3/02 (2013.01); E05D 11/087 (2013.01); B60R 2019/522 (2013.01); E05Y 2201/26 (2013.01); E05Y 2201/266 (2013.01); E05Y 2900/531 (2013.01)

(58) Field of Classification Search
CPC ........ B60R 3/02; B60J 5/0473; B64C 1/1415; B64C 1/1423; B64C 1/24
See application file for complete search history.

(56) References Cited

U.S. PATENT DOCUMENTS

| | | | | |
|---|---|---|---|---|
| 1,838,114 | A | 12/1931 | Joseph | |
| 2,699,964 | A | 1/1955 | Hartung | |
| 6,224,120 | B1 | 5/2001 | Eipper et al. | |
| 6,460,915 | B1 * | 10/2002 | Bedi | B60J 5/0498 |
| | | | | 296/183.1 |
| D572,180 | S | 7/2008 | Storer | |
| 2009/0139057 | A1 * | 6/2009 | Honda | B60J 5/103 |
| | | | | 16/343 |
| 2011/0006553 | A1 | 1/2011 | Fretz et al. | |

(Continued)

FOREIGN PATENT DOCUMENTS

| | | | | |
|---|---|---|---|---|
| DE | 4134499 C2 * | 9/1994 | ........... | B64C 1/1415 |
| GB | 2411154 A * | 8/2005 | ............. | B62D 47/02 |

OTHER PUBLICATIONS

Non-Final Office Action on U.S. Appl. No. 18/194,254 dated Dec. 16, 2025 (15 pages).

*Primary Examiner* — Daniel J Colilla
(74) *Attorney, Agent, or Firm* — Foley & Lardner LLP

(57) ABSTRACT

An apparatus can include a door. The door can be configured to couple with a side of a vehicle. The door can include a step. The door can move the step.

19 Claims, 33 Drawing Sheets

(56) References Cited

U.S. PATENT DOCUMENTS

2016/0311296 A1* 10/2016 Flores .................... B60J 5/0487
2018/0119471 A1*  5/2018 Iacovoni ............... E05F 15/603
2018/0209210 A1*  7/2018 Arndt .................... B65G 69/28
2023/0271558 A1*  8/2023 Nilsson .................... B60R 3/02
                                              280/163

* cited by examiner

1000

1100

Provide door including step — 1105

VEHICLE DOOR

CROSS-REFERENCE TO RELATED PATENT APPLICATION

The present application claims the benefit of and priority to U.S. Provisional Patent Application No. 63/379,527, filed Oct. 14, 2022, the disclosure of which is incorporated herein by reference in its entirety.

INTRODUCTION

A vehicle, such as an electric vehicle, can be powered by batteries. The vehicle can include components that operate the vehicle based on power provided by the batteries.

SUMMARY

An aspect of this disclosure is generally directed to techniques for a door of a vehicle including steps. A vehicle may have a high clearance, e.g., a clearance of 5-8 inches, less than 5 inches, or more than 8 inches. A user, driver, or occupant of the vehicle may have difficulty accessing an area of the vehicle The systems, devices, and apparatus described herein can include a door of the vehicle that includes at least one step. The door, when opened, can transport the step out of the vehicle. The door of the vehicle can open to expose the step and allow occupants to access or exit the vehicle via the step. The door can include at least one hinge on a bottom side of the door that is coupled, fixed, fixedly coupled, attached, connected, or linked to the vehicle. The door can rotate on the hinge to open vertically or top-down, e.g., a top of the door can rotate away from the vehicle and downwards towards a surface under the vehicle.

At least one aspect is directed to an apparatus. The apparatus can include a door. The door can be configured to couple with a side of a vehicle. The door can include a step. The door can be configured to move the step.

At least one aspect is directed to a vehicle. The vehicle can include a door. The door can be configured to couple with a side of the vehicle. The door can include a step. The door can be configured to move the step.

At least one aspect is directed to a method. The method can include coupling a door with a side of a vehicle. The door can include a step. The method can include moving the door to move the step.

At least one aspect is directed to a grille guard apparatus. The grille guard apparatus can include a first member. The grille guard apparatus can include a second member forming a stadium shape. At least one of the first member or the second member can be coupled with a vehicle.

At least one aspect is directed to a vehicle. The vehicle can include a frame. The vehicle can include a first member. The vehicle can include a second member forming a stadium shape. At least one of the first member or the second member can be coupled with a vehicle.

At least one aspect is directed to an apparatus. The apparatus can include a member coupled with a rear of a vehicle. The member can rotate a connector. The connector can couple with a tire.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 26 depicts a vehicle including hinges that a tire carrier couples with.

DETAILED DESCRIPTIONS

Figure 1:
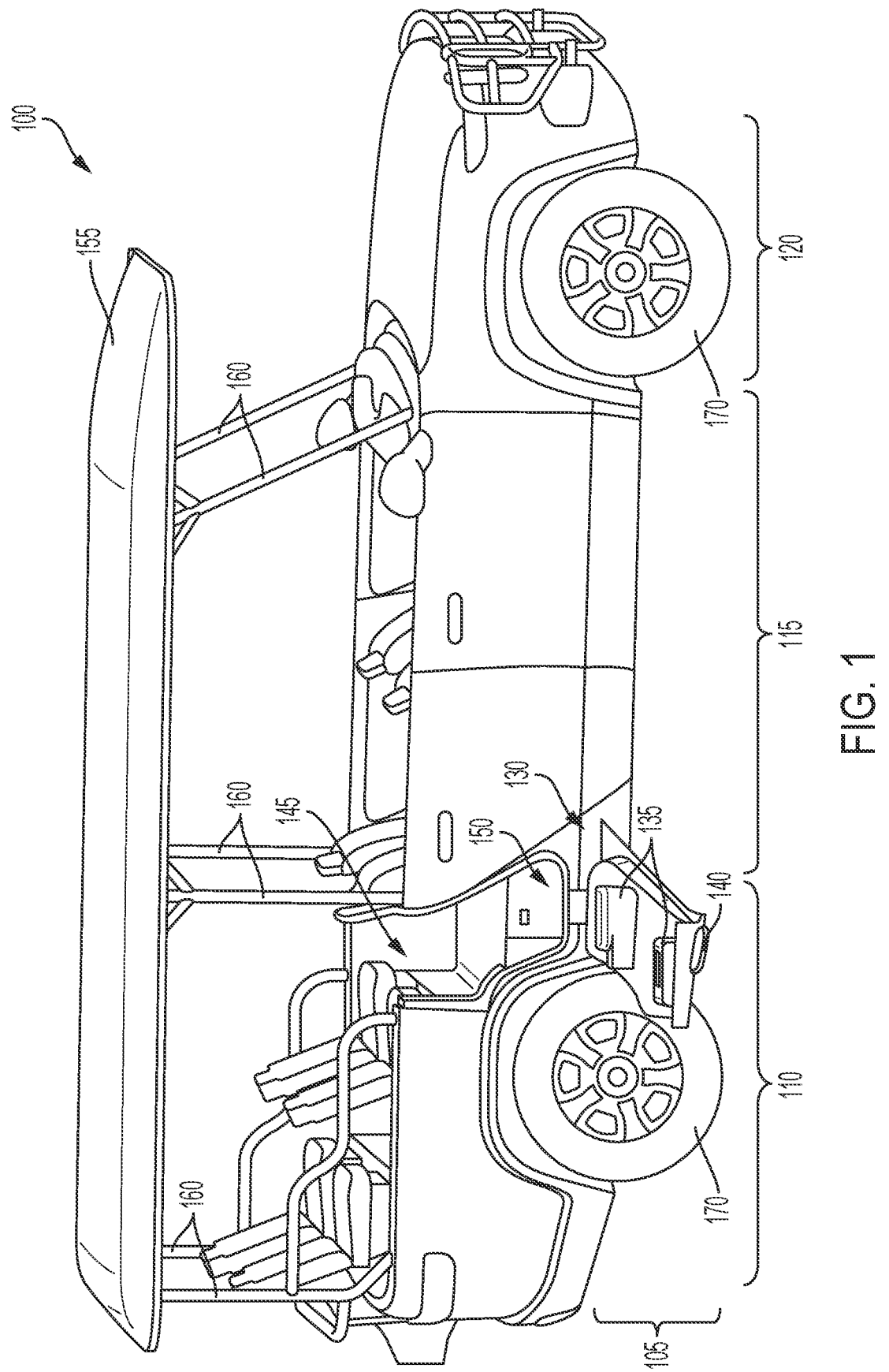
FIG. 1 depicts an example vehicle including a door including at least one step.

Following below are more detailed descriptions of various concepts related to, and implementations of, methods, apparatuses, and systems for vehicles. The various concepts introduced above and discussed in greater detail below may be implemented in any of numerous ways.

An aspect of this disclosure can be generally directed to a vehicle, such as a high clearance vehicle or automobile. A vehicle, such as an electric vehicle, hybrid vehicle, or combustion engine vehicle may have a high clearance, e.g., a clearance of 5-8 inches, less than 5 inches, or more than 8 inches. A user, driver, or occupant of the vehicle may have difficulty accessing an area of the vehicle (e.g., a cargo area, a storage area, an occupant area, a seating area) or exiting the area of the vehicle due to the high clearance of the vehicle. To solve these and other technical problems, the systems, devices, and apparatus described herein can include a door of the vehicle that includes at least one step. The door, when opened, can transport the step out of the vehicle. The door of the vehicle can open to expose the step and allow occupants to access or exit the vehicle via the step. The door can include at least one hinge on a bottom side of the door that is coupled, fixed, fixedly coupled, attached, connected, or linked to the vehicle. The door can rotate on the hinge to open vertically or top-down, e.g., a top of the door can rotate away from the vehicle and downwards towards a surface under the vehicle.

The hinge of the door can be fixed to a frame of the door. The hinge can be fixed to a frame of the vehicle. The frame can include the step. Force that the user exerts on the step when stepping on the step can be transferred through the frame of the door and the hinge to the frame of the vehicle. Because the frame and hinge can resolve forces applied to the steps of the door by users, the door can be supported by the vehicle in a cantilevered position. The hinge can cantilever the door off of a side of the vehicle when the door is opened. For example, the door may be suspended over a surface under the vehicle. Because the frame of the door and the hinge resolve the force applied to the steps of the door by the user, the door may not need any additional support components besides the hinge, e.g., the door may not need tension cables, railings, legs.

The hinge of the door can include an apparatus, such as a sprag apparatus. The sprag apparatus can include a bearing or sprag bearing. The sprag bearing can turn in a single direction, e.g., freely turn when the door is closing but resist, stop, or limit turning when the door is opening. A pin of the hinge can be fixedly coupled to the door and can apply a force to the sprag bearing or turn the sprag bearing. The door opening or closing can spin or rotate the pin. The sprag apparatus can include a component that is fixedly coupled around the sprag bearing. When the sprag bearing resists a turning force of the pin, the force applied to the sprag bearing can turn the component. The component, when rotated by the sprag bearing, can engage with a frictional load. For example, the component can be a cylindrical component that telescopes over the sprag bearing and engages with a clamping load clamped on an end of the cylindrical component. Because the sprag bearing only turns in a single direction, the component engages with the frictional load when the door opens and the sprag bearing resists the rotation of the pin. Because the sprag bearing turns the cylindrical component and the cylindrical component engages with the clamping load when the door is opening, this can slow, limit, or reduce the rate at which the door would normally open due to gravitational forces. However, because the pin freely spins the sprag bearing when the door is closing, the sprag bearing does not turn the cylindrical component and the cylindrical component does not engage with the clamping load when the door is being closed. Thus, the door can be freely closed.

The techniques described herein can be applied to a vehicle with any level of clearance, for example, high clearance vehicles, regular clearance vehicles, or low clearance vehicles. For example, the door including at least one step described herein can be used to assist an occupant, a driver, a passenger, an injured individual, a handicapped individual, an elderly individual, or any individual that may or may not have trouble accessing the vehicle to access, enter, or exit the vehicle. Various types of vehicles such as trucks, sport utility vehicles, cars, sedans, or coups can implement the door including at least one step described herein.

FIG. 1 depicts an example vehicle 100 including a door 130 including at least one step 135. The step 135 can be on an inner side of the door 130. The vehicle 100 can be an automobile, an electric vehicle, a combustion vehicle, a hybrid vehicle, an off-road vehicle, or any other type of vehicle. The vehicle 100 can be a high clearance vehicle. The vehicle 100 can have a clearance 105 from a surface under the vehicle 100. The clearance 105 can be 6-7 inches. The clearance 105 can be less than 6 inches. The clearance 105 can be greater than 7 inches. The vehicle 100 can include a rear portion 110, a middle portion 115, and a front portion 120. The vehicle 100 can be a vehicle for off-road driving. For example, the vehicle 100 can be a rugged safari vehicle for traversing grass, mud, dirt, gravel, or pavement to see wilderness areas, animal habitats, or other remote areas. For example, the vehicle 100 can drive through rugged off-road areas to allow passengers of the vehicle 100 to see wildlife or wilderness areas.

The vehicle 100 can include a canopy 155. The canopy 155 can be suspended over the rear portion 110, the middle portion 115, and at least part of the front portion 120. The canopy 155 can be a flat shape, a sled shape, a skateboard shape, a curved shape, or any other shape. The canopy 155 can be a flexible material such as cloth, polyester, plastic. The canopy 155 can be a hardened material such as plastic, carbon fiber, fiber glass, or any other material. The canopy 155 can be 5-12 inches thick. The canopy 155 can be more than 12 inches thick. The canopy 155 can be less than 5 inches thick. The canopy 155 can be suspended over the vehicle 100 to shield occupants of the vehicle 100 from sun, rain, snow, dirt, dust, or debris. The canopy 155 can be suspended by supports 160. The canopy 155 can be supported by two angled supports 160 in the front portion 120. One support may be located on a driver side of the vehicle 100 while the other support 160 may be located on a passenger side of the vehicle 100. The angled supports 160 can form an angle of 60-95 degrees. The angles supports 160 can form angles less than 60 degrees. The angled supports 160 can form angles more than 95 degrees. The canopy 155 can include two supports 160 behind a passenger seating area of the middle portion 115 and two supports 160 behind a passenger seating area of the rear portion 110. The supports 160 behind the passenger seating areas may be perpendicular to the frame of the vehicle 100. The supports 160 behind the passenger seating area of the rear portion 110 may be pairs of supports with one support located on a driver side of the vehicle 100 with the other support 160 may be located on a passenger side of the vehicle 100.

The rear portion 110 can be a truck bed, storage area, storage compartment, passenger seating area, occupant seating area. The rear portion 110 can include at least one seat or row or seats. The rear portion 110 can include a first row of seats in front of a second row of seats. The rear portion 110 can include at least one side, lateral wall, or lateral side 145. The side 145 can include an opening that the door 130 fits into, seals with, or couples with when the door 130 is in a closed position. The door 130 can be configured to open to expose the opening of the side 145 to allow a user to access the rear portion 110 of the vehicle 100, the middle portion 115 of the vehicle 100. The door 130 can be configured to close, retract, move, transport, translate between the open position exposing the opening of the side 145 of the vehicle 100 and a closed position.

The door 130 can couple, seal, or come into contact with a bottom side of the opening of the side 145, a first lateral side of the opening, and a second lateral side opening. A top of the door 130 in the closed position may form a top side of the side 145 of the vehicle. The first lateral side of the opening can extend up from the bottom side up to a top of the opening, and a second lateral side of the opening can extend up from the bottom side up to a top of the opening. The opening may have no top side to permit a user to enter the rear portion 110.

The door 130 can rotate on a hinge 150. The hinge 150 can be fastened to one side of the door 130. The hinge 150 can be fastened to the side 145 of the vehicle, a frame of the vehicle 100, or any other component of the vehicle. The door 130 can rotate on the hinge 150 between the open and closed positions. The hinge 150 can rotate the door 130 from a closed position vertically, e.g., top-down, to the open position. The hinge 150 can be fixedly coupled to a side of the door 130 that is a bottom side of the door 130 when the door 130 is in the closed position. The top side of the door 130, e.g., a side of the door 130 that is a top of the door 130 when the door 130 is in the closed position, can rotate downwards along a circular, curved, or oval shaped path towards a surface under the vehicle 100. The door 130 can rotate 100-120 degrees. The door 130 can rotate 90-150 degrees. The door can rotate less than 90 degrees. The door 130 can rotate more than 150 degrees.

The door 130 can be cantilevered from the side 145 of the vehicle 100 when the door 130 is in the open position. The hinge 150 can support the weight of the door 130 when the door 130 is in the open position. The hinge 150 can support the full weight of the door 130 and any user or users that stand on the steps 135 of the door 130. The hinge 150 can suspend the door 130 above a surface under the vehicle 100. In some situations, rocks, dirt, debris may elevate the surface under the vehicle 100 above the bottom of tires of the vehicle 100. To prevent the door 130 from coming into contact with the vehicle 100 and potentially damaging the door 130, the door 130 can include a handle 140 that extends beyond an edge of the door 130. If the door is opened, instead of the body of the door 130 coming into contact with the surface under the vehicle 100, the handle 140 can come into contact with the surface under the vehicle. The handle 140 can support at least a portion of the weight of the door 130 or at least a portion of the weight of a user or users that stand on the steps 135 of the door 130.

The steps 135 can be retractable steps 135 or form retractable stairs. The steps 135 can be retractable or stowable in the door 130 or in a door compartment. For example, the steps 135 can be fixed to a frame of the door 130 and folded away from the frame, retracted from the frame, or otherwise deployed from the door 130. Furthermore, the steps 135 can be stowed, stored, or retracted back to the door 130 from a deployed position. The retractable steps 135 can stow along a surface of the door 130. The retractable steps 135 can stow within a body or housing of the door 130. At least one hinge can retract the steps 135 from the door 130. Each step 135 can include a hinge assembly the deploys or stows each step 135. The hinge assembly can deploy or store multiple steps 135 simultaneously. A motor, spring, gas piston, or other actuator device can deploy the steps 135 or stow the steps 135.

The retractable steps 135 can be deployed when they are needed and stowed when the steps 135 are not needed.

Retractable steps 135 can save space when the door 130 is in a closed position. For example, instead of the steps 135 extending into an interior area of the vehicle 100, the retractable steps 135 can stow within a body of the door 130 saving space within the interior area of the vehicle 100. Furthermore, a user can selectively deploy the retractable steps 135 when the door 130 is in an open position in order to only deploy the steps 135 when a user wishes to utilize the steps 135.

Figure 2:
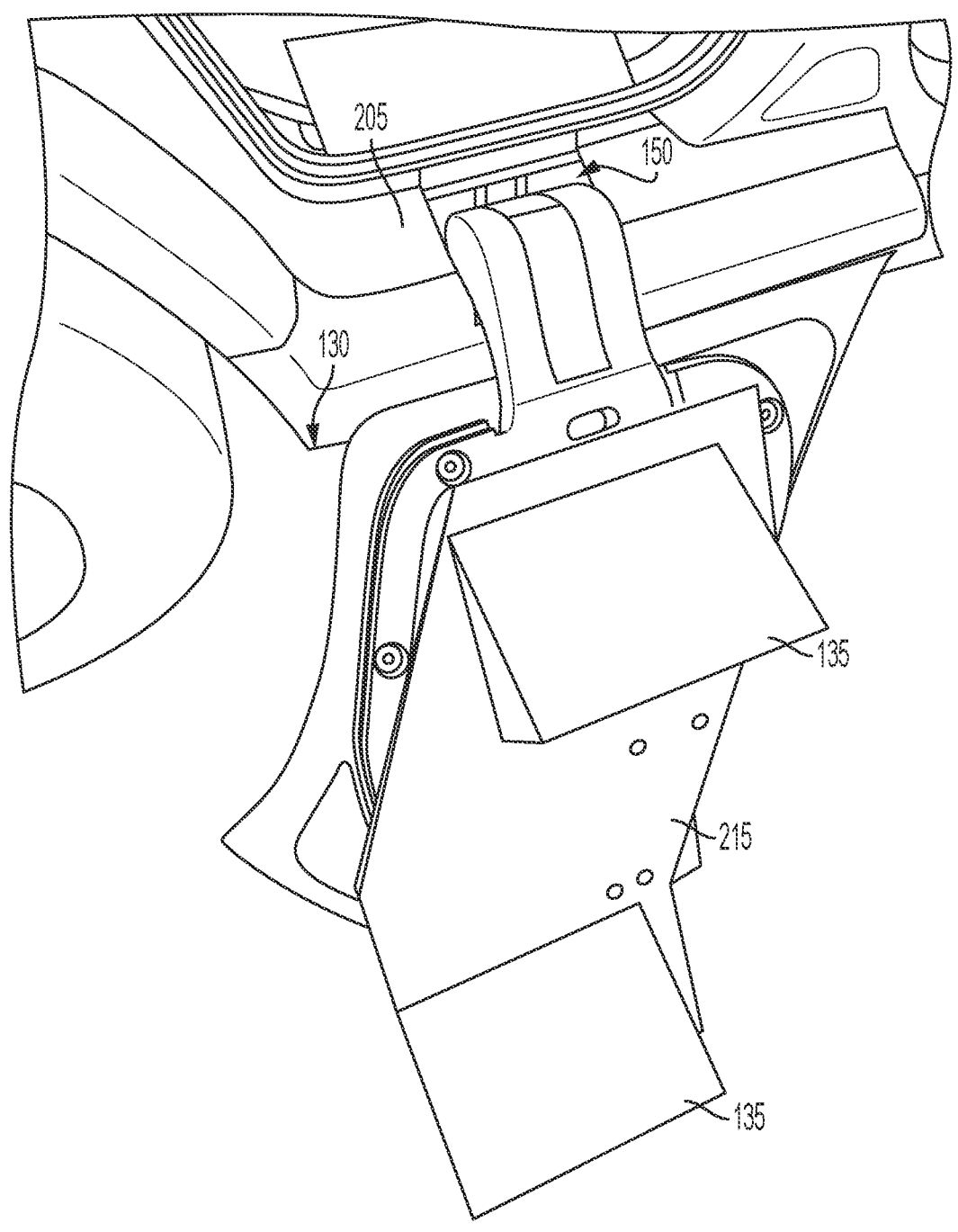
FIG. 2 depicts an example door of a vehicle including steps.

FIG. 2 depicts an example door 130 of a vehicle 100 including steps 135. In FIG. 2, the door 130 is shown in the opened position. When the door 130 is in the deployed position, a top surface of the steps 135 may be parallel, or substantially parallel with a bottom surface of the vehicle 100. The bottom surface may be a floor of an interior of the vehicle 100. The steps 135 can include a top surface including a gripping material that grips with a foot or a user that stands on the steps 135. The gripping material can be a rubber. The gripping material can be roughened to prevent a user from slipping on the steps 135. The gripping material can have protrusions or perforations to prevent a user from slipping on the steps 135. The top surface of the steps 135 can extend out from a top surface 215 of the door 130. The top surface of the steps 135 can extend out at an acute angle from the surface 215 so that when the door 130 is fully opened at an angled position, the top surface of the step 135 is parallel with an interior floor of the vehicle 100. The steps 135 can include lateral sides that extend from the surface 215 to the top surface of the door 130 to a top surface of the steps 135 and a front surface of the steps 135. The front surface of the steps 135 can be angled and extend from a front end of the steps 135 towards the surface 215. The lateral sides may be triangular, rectangular, pentagonal, hexagonal.

The vehicle 100 can include a cover 205. The cover 205 can be a plastic, aluminum, fiberglass, rubber, or other material. The cover 205 can cover the hinge 150 or components of the hinge 150. The cover 205 can be detachable or removable. The cover 205 can cover one or more components that control the rate at which the door 130 opens or closes. The components can include a load such as a clamping load, a spring load, a piston load. The load can slow the rate at which the door 130 opens or closes. The cover 205 can cover one or more components that lift the door 130 upwards. The one or more components that lift the door 130 can provide a rotational force that is less than the weight of the door 130. The one or more components can assist a user lifting the door 130 to close the door 130. The one or more components that lift the door 130 can be a spring, a gas piston, an elastic component. The cover 205 can cover electrically actuated components such as a motor, spring, piston, that rotate that can automatically open or close the door 130.

Figure 3:
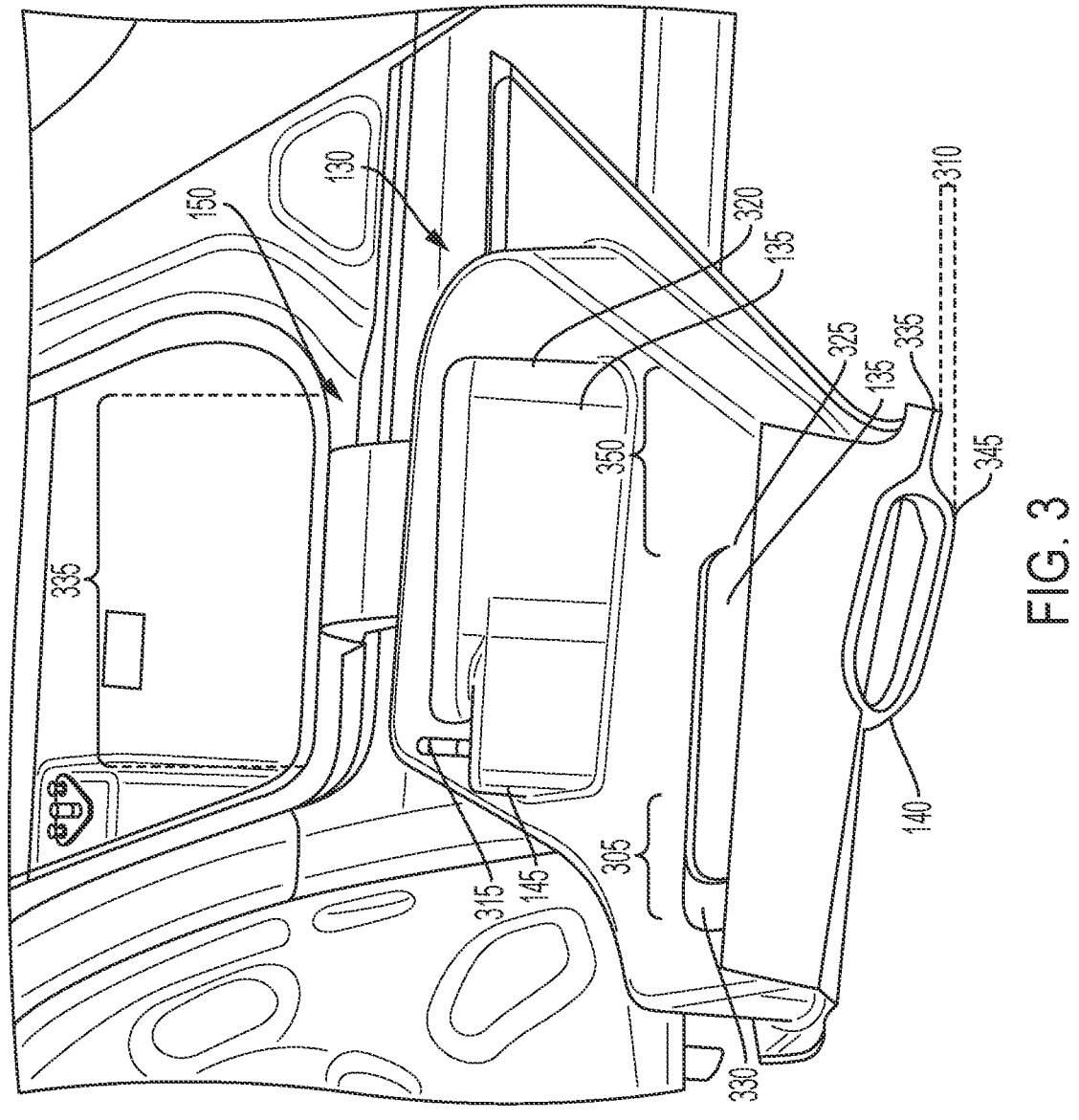
FIG. 3 depicts an example door of a vehicle including at least one step.

FIG. 3 depicts an example door 130 of a vehicle 100 including at least one step 135. The door 130 includes a top step 135 located above a bottom step 135. For example, a top surface of the top step 135 can be located a first distance from a bottom side 335 of the opening. A top surface of the bottom step 135 can be located a second distance greater than the first distance from the bottom side 335 of the opening. The top step 135 can be offset from the bottom step 135. For example, the top step 135 can be offset from the bottom step 135 towards the front portion 120 of the vehicle. The top step 135 can be offset from the bottom step 135 towards the rear portion 110 of the vehicle 100. The top step 135 can include a right lateral wall 320 and a left lateral wall 145. The right lateral wall 320 can be a first distance from the front portion 120 of the vehicle 100 while the left lateral wall 320 can be a second distance less than the first distance from the front portion 120 of the vehicle 100. The bottom step 135 can include a right lateral wall 325 and a left lateral wall 330. The right lateral wall 325 can be a first distance from the front portion 120 of the vehicle 100 while the left lateral wall 330 can be a second distance less than the first distance from the front of the vehicle 100.

The right lateral wall 320 of the top step 135 can be offset a distance 350 from the right lateral wall 325 of the bottom step 135 towards the front portion 120 of the vehicle 100. The right lateral wall 320 of the top step 135 can be offset from the right lateral wall 325 of the bottom step 135 towards the rear portion 110 of the vehicle 100. The left lateral wall 145 of the top step 135 can be offset a distance 305 from the left lateral wall 330 of the bottom step 135 towards the front portion 120 of the vehicle 100. The left lateral wall 145 of the top step 135 can be offset from the left lateral wall 330 of the bottom step 135 towards the front portion 120 of the vehicle 100.

The handle 140 can include an end 345 (e.g., an edge, a boundary, a periphery, a face) that is located a distance 310 from an end 335 (e.g., an edge, a boundary, a periphery, a face) of the door 130. The end 345 can extend the distance 310 beyond the end 335 towards a surface under the vehicle 100. Because the end 345 extends beyond the end 335 towards the surface under the vehicle, the end 345 of the handle can come into contact with the surface under the vehicle 100 preventing the end 335 of the door from coming into contact with the surface.

The top step 135 can include a connector 315. The connector 315 can be a u-shaped component. The connector 315 can be a half circle shaped component. The connector 315 can be a rectangular shaped component. The connector 315 can fit within a locking component of the vehicle 100. For example, the connector 315 can be a tongue shaped component that fits within a groove shaped component of the vehicle 100. When the locking component of the vehicle 100 locks, the locking component can close around or through the connector 315, holding the door 130 in the closed position and limiting movement of the door 130, e.g., preventing the door 130 from rotating from the closed position to the open position.

Figure 4:
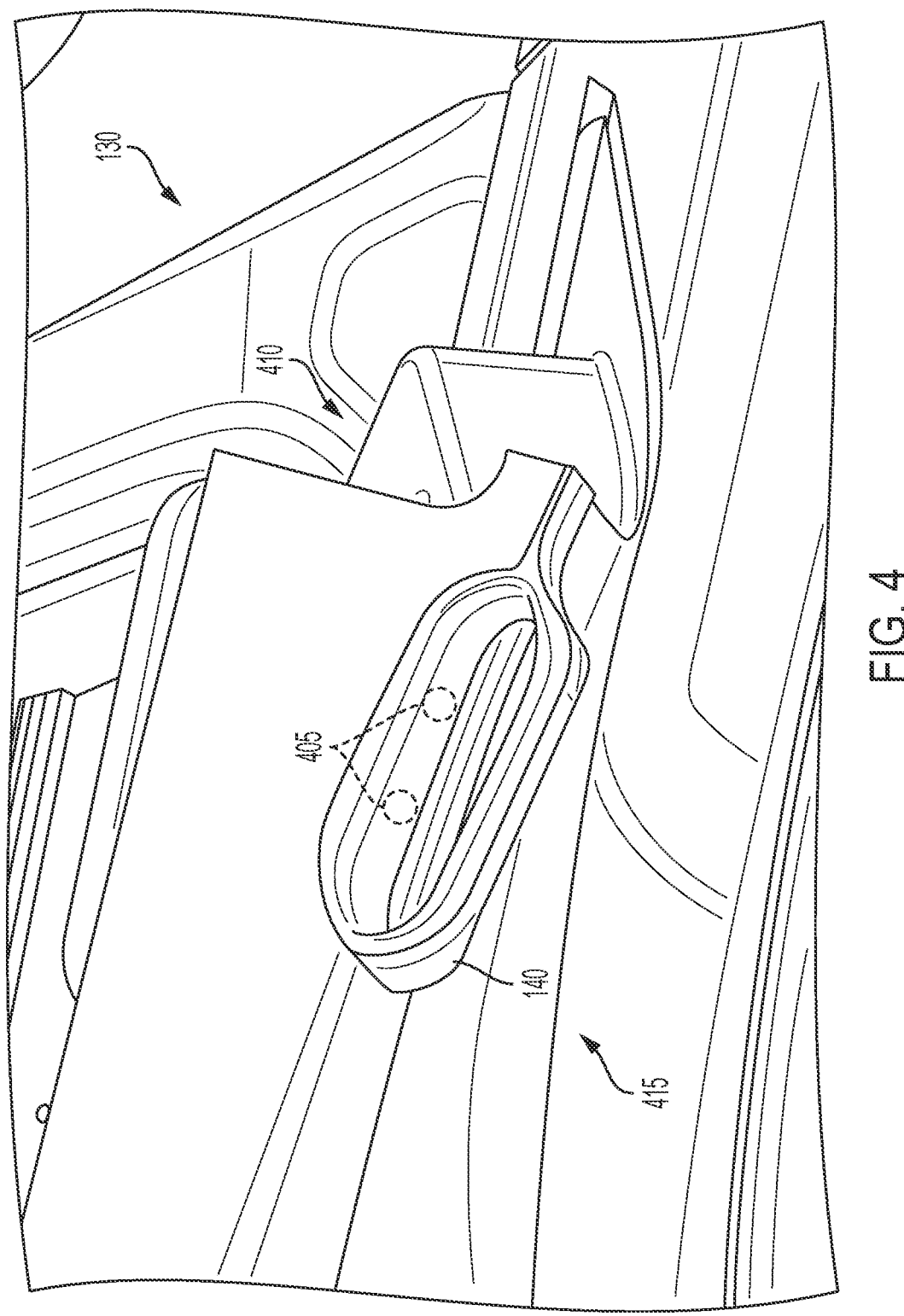
FIG. 4 depicts an example door of a vehicle including a handle.

FIG. 4 depicts an example door 130 of a vehicle 100 including a handle 140. The door 130 can include an inner side 410 and an outer side 415. The inner side 410 can move with the door 130 from inside the vehicle 100 to outside the vehicle 100 when the door 130 opens. The inner side 410 can move from outside the vehicle 100 to inside the vehicle 100 when the door 130 closes. When the door 130 is closed, the outer side 415 can align with the side 145 of the vehicle to form a smooth, flat, or curved boundary. When the door 130 is open, the outer side 415 can be positioned closer to a surface under the vehicle 100 than the inner side 410. The handle 140 can be fixedly coupled to the outer side 415 or a frame of the door 130.

The handle 140 can include at least one connector 405. The connector 405 can be a screw, a bolt, a snap, or other mechanism to fix the handle 140 to the door 130. For example, the connector 405 can be countersunk. The handle 140 can be detached from the door 130. The handle 140 can be a replaceable component. The connectors 405 can be accessible, e.g., not covered such that a user can remove the connectors 405, remove the handle 140, and replace the handle 140.

Figure 5:
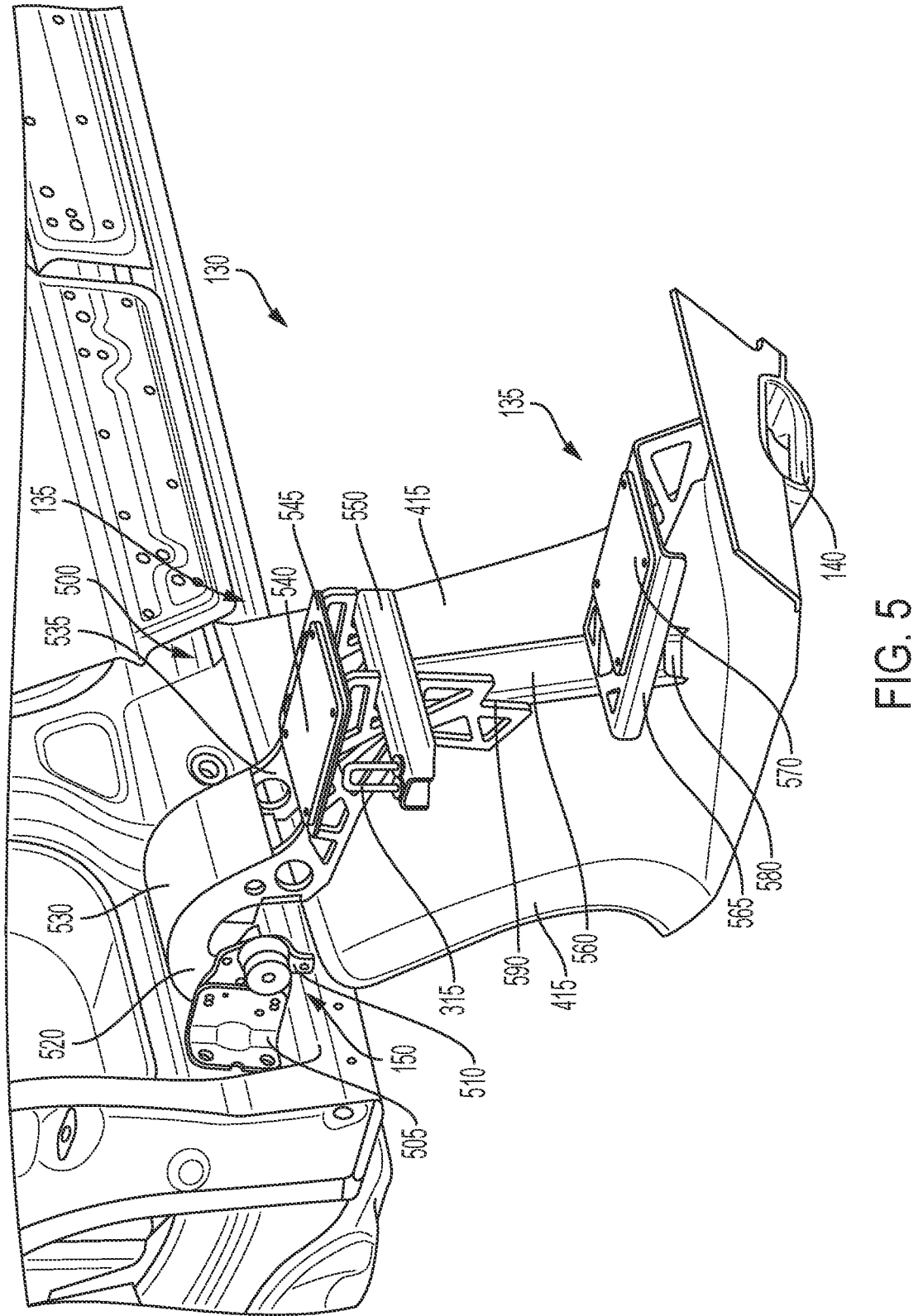
FIG. 5 depicts an example door of a vehicle including a frame with steps.
Figure 6:
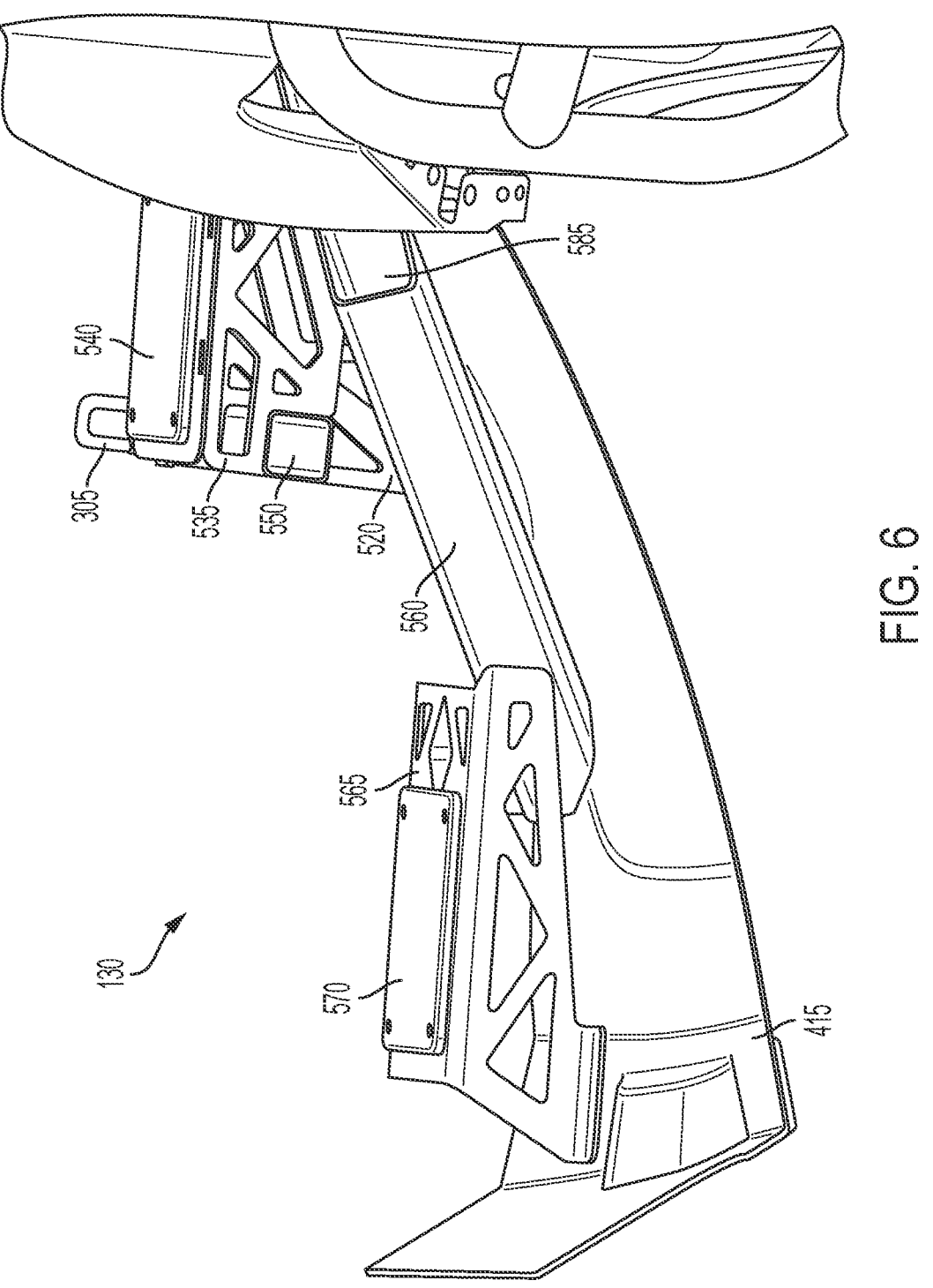
FIG. 6 depicts an example door of a vehicle including a frame with steps.

FIGS. 5-6 depict an example door 130 of a vehicle 100 including frame 500 with steps 135. The frame 500 can be located between the inner side 410 and the outer side 415 of the door 130. In FIG. 5, the inner side 410 is not shown to illustrate the frame 500. The inner side 410 and the outer side 415 can partially or completely cover the frame 500. The inner side 410 and the outer side 415 can be made of plastic, fiberglass, or carbon fiber. To prevent the inner side 410 or the outer side 415 from becoming damaged when a user steps on the steps 135, the frame 500 can form the steps 135, stairs, or a stairway and support the weight of the user by transferring the force exerted by the user on the steps 135 to the hinge 150 which can transfer the force exerted by the user to a frame of the vehicle 100.

The hinge 150 can include a first bracket 505 and a second bracket 510. The first bracket 505 can be fixedly coupled to a frame of the vehicle 100. The first bracket 505 can be an L-shaped bracket. The first bracket 505 can be an L-shaped bracket with a ninety degree angle between a first portion and a second portion of the bracket 505. The first portion of the bracket can be fixedly coupled via at least one connector (e.g., bolt, screw, snap, weld) to the frame of the vehicle 100. The second portion of the bracket can extend from the frame of the vehicle 100. For example, the second bracket can extend at an angle perpendicular from a surface of the frame. A second bracket 510 can be fixedly coupled to the second portion of the first bracket 505. The second bracket 510 can support at least one hinge component, e.g., sprag bearing, cylindrical component, clamping load.

The frame 500 can include a first arm 520 and a second arm 535. The first arm 520 and the second arm 535 can be identical or similar shaped components. The first arm 520 can be located closer to a rear wheel 170 of the vehicle 100 than the second arm 535. The second arm 535 can be located closer to the front portion 120 of the vehicle than the first arm 520. The first arm 520 and the second arm 535 can be fixedly coupled to the hinge 150 and rotate on the hinge 150. For example, the hinge 150 can include a pin that is coupled to the bracket 510. The first arm 520 and the second arm 535 can rotate on the pin to rotate the door 130 between the closed position and the open position. The arms 520 and 535 can include a first curved section and a second straight section. The first curved section can have an edge, end, boundary, that is circular, oval shaped, or a free form shaped. A section 530 can extend between the first arm 520 and the second arm 535 over the curved section. The straight section of the first arm 520 and the second arm 535 can form a step 135. A plate 545 can extend between the first arm 520 and the second arm 535 over the straight section to form an area or component for a user to step on. A plate 540 can be mounted to the plate 545.

The first arm 520 and the second arm 535 can include a third vertical portion. The vertical portion can extend from the straight portions towards a surface under the vehicle 100. The vertical portion of the first arm 520 can extend further towards the surface under the vehicle 100 than the vertical portion of the second arm 535. The vertical portions of the first arm 520 and the second arm 535 can include a cutaway portion. The cutaway portions can be rectangular or square shaped. A portion 550 can extend, beginning at the cutaway of the second arm 535, through the cutaway of the first arm 520 a distance. The connector 315 can be fixedly coupled to an end of the portion 550 extended through the cutaway of the first arm 520. The first arm 520 and the second arm 535 can include circular, rectangular, or triangular cutaways. The cutaways can reduce a weight of the first arm 520 and the second arm 535.

A portion 560 can extend from the second arm 535. The portion 560 can be a linkage, a bar, a beam, an elongated member, a structural member, or a support member. The portion 560 can extend an angle acute or oblique from the surface of the vehicle 100. The portion 560 can extend at an angle acute or oblique from a surface of the second arm 535. The portion 560 can extend at an angle (e.g., acute angle) rearwards towards a rear wheel of the vehicle 100 and outwards away from the vehicle 100. The acute angle can be 30-60 degrees. The acute angle can be 40-50 degrees. The acute angle can be less than 30 degrees. The acute angle can be more than 60 degrees. A first end, edge, or boundary 585 of the portion 560 can be fixedly coupled to the second arm 535. A second end, edge, or boundary 580 of the portion 560 can be fixedly coupled to a plate 565. A plate 570 can be fixed to a surface of the plate 565. At a point, section, or portion of the portion 560 between a first end of the portion 560 and the second end of the portion 560, the portion 560 can be fixed to the plate 565. The point 590 at which the portion 560 connects to the first arm 520 can be a mid-point of a length between the first end 585 of the portion 560 and the second end 580 of the portion 560. The point 590 can be offset from the mid-point of the length between the first end of the portion 560 and the second end of the portion 560 closer to the first end 585 or closer to the second end 580.

Figure 7:
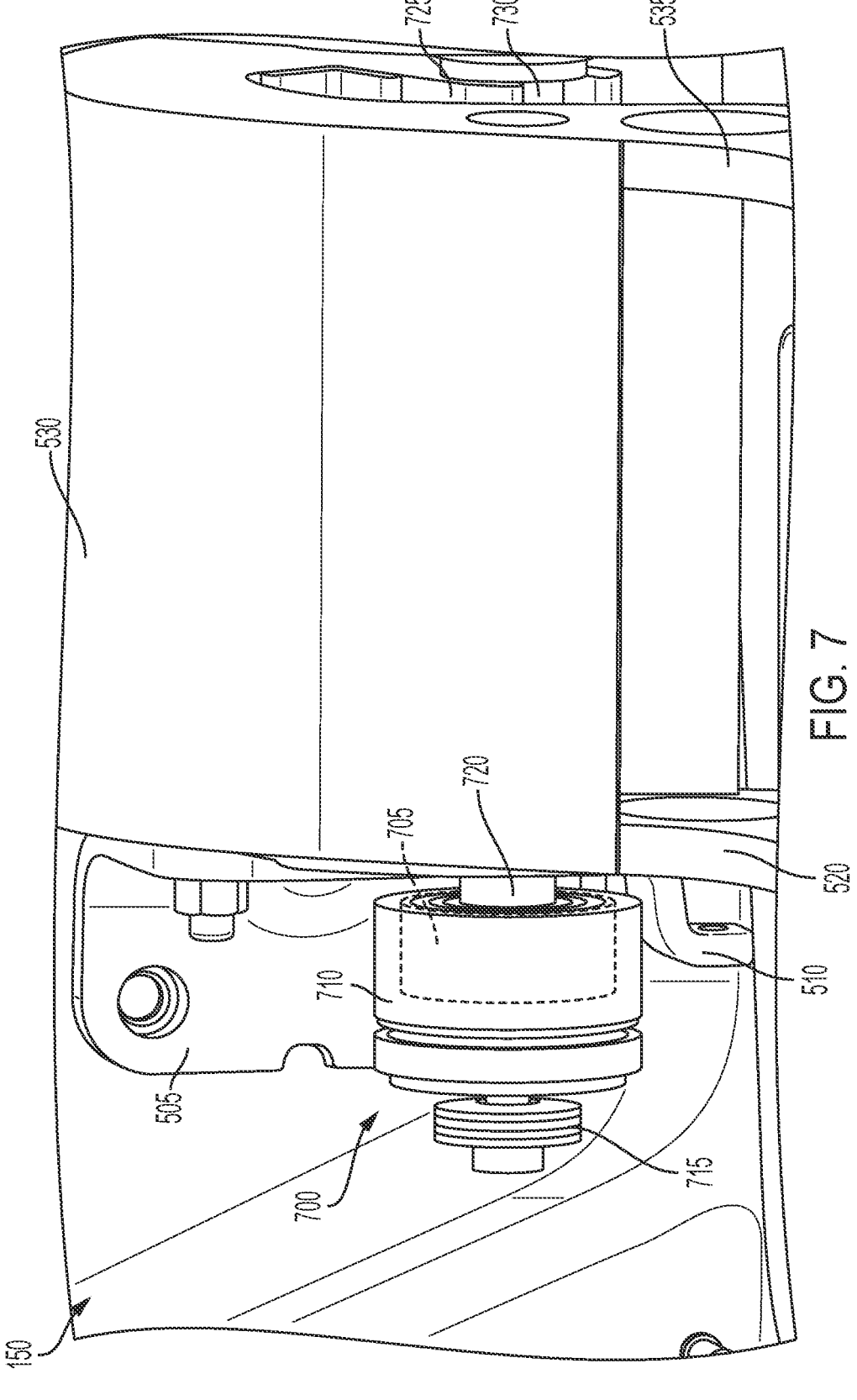
FIG. 7 depicts an example hinge of a door of a vehicle including a sprag apparatus including a load that controls the rate of movement of the door.
Figure 8:
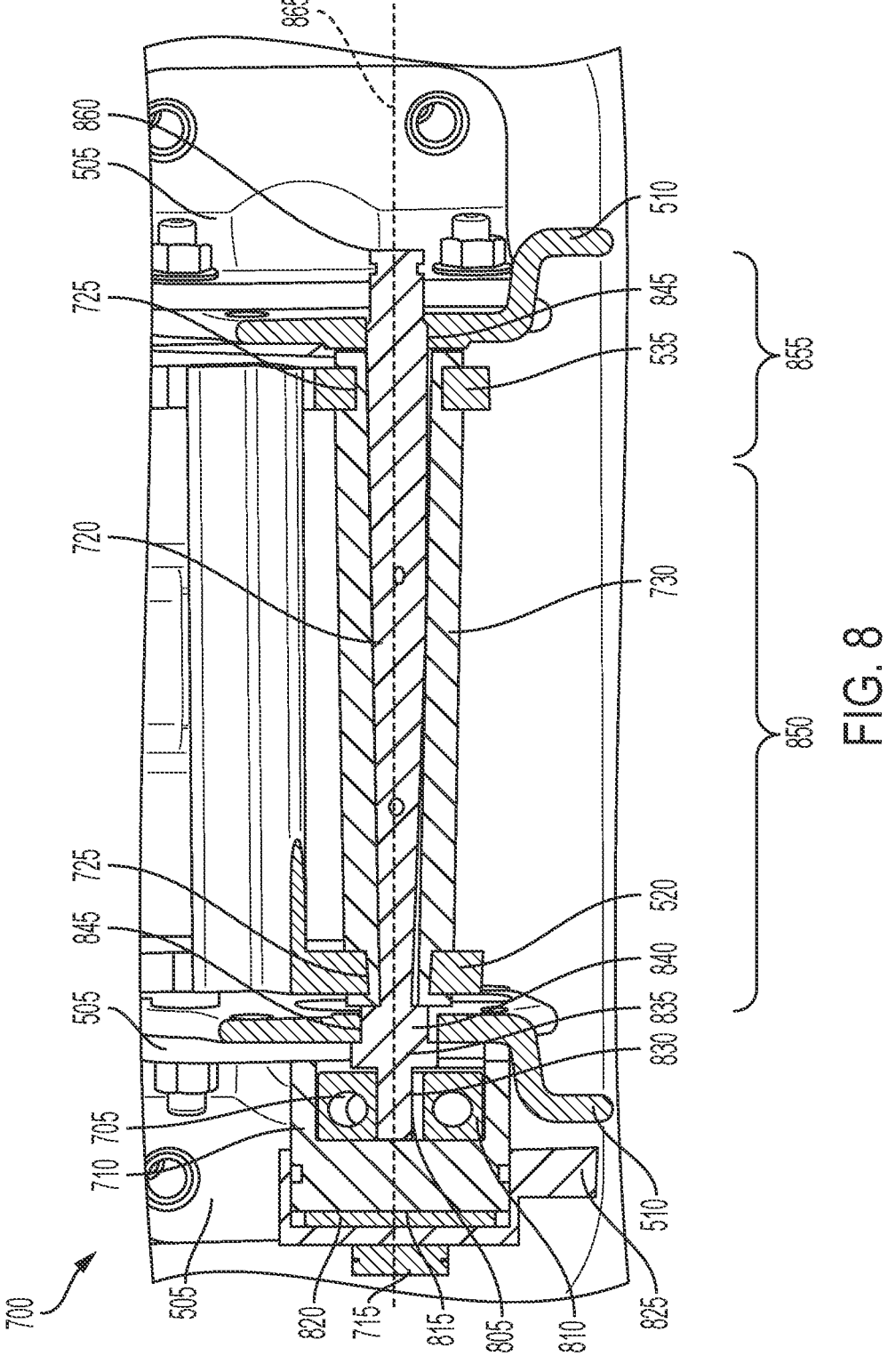
FIG. 8 depicts an example door of a vehicle including a sprag apparatus including a load that controls the rate of movement of the door.

FIGS. 7-8 depict an example hinge 150 of a door 130 of a vehicle 100, the hinge 150 including a sprag apparatus 700 including a load that controls the rate of movement of the door. The sprag apparatus 700 can be a device, an apparatus, or a system. The sprag apparatus 700 can include at least one pin 720. The pin 720 can include a longitudinal axis 865. The pin 720 can include a first section 830. The first section 830 can be a cylindrical shaped component. The first section 830 can extend from a second section 835 at a constantly decreasing diameter along the longitudinal axis 865 to an end of the first section 830. At least a portion of the first section 830 can fit within an opening, cavity, cylindrical shaped space, or other area of the bearing 705 and couple, fix, fixedly couple, attach, or engage with an inner surface 805 of the bearing 705.

The second section 835 can be a cylindrical shaped section. The section 835 can include a constant diameter along the longitudinal axis 865 of the pin 720. The diameter of the section 835 can be greater than a largest diameter of the first section 830. The diameter of the section 835 can be greater than a diameter of the third section 840. The diameter of the section 835 can be equal to, less than, or greater than a largest diameter of the fourth section 850 or the fifth section 855 of the pin 720. The second section 835 can extend between the bearing 705 and the bracket 510. The diameter of the section 835 can prevent the bearing 705 from coming into contact with the bracket 510.

The third section 840 can be a cylindrical component that fits through an opening 845 (e.g., circular, cylindrical, or oval shaped opening) of the bracket 510. The third portion 840 can be a cylindrical component with a fixed diameter along the longitudinal axis 865 of the pin 720. The opening 845 of the bracket 510 can a cylindrical shaped or circular shaped opening. A diameter of the opening 845 can be substantially the same as, or slightly greater than, a diameter of the third section 840 of the pin 720. A fourth section 850 can extend from the third section 840 to the fifth section 855 along the longitudinal axis 865. The diameter of the fourth section 850 can increase along the longitudinal axis 865 of the pin 720 from the third portion 840 to the fifth section 855. The fifth section 855 can extend from and end of the fourth section 850 to an end 860 of the pin 720. The shape of the fifth section 855 can be a cylindrical shaped section.

The fifth section 855 can extend at a decreasing diameter from the fourth section 850 through the opening 845 of the bracket 510.

The apparatus 700 can include at least one bearing 705, such as a sprag bearing 705. The bearing 705 can be a cylindrical component including an inner surface 805 around an opening of the bearing 705. The bearing 705 can include an outer surface 810. The bearing 705 can have an inner circumference defining the opening and an edge, boundary, or surface of the inner surface 805 and an outer circumference greater than the inner circumference defining the outer surface 810. The inner surface 805 can be fixedly coupled, fastened, or connected to the pin 720. An outer surface of the pin 720 can fit within the inner surface 805 and rotate around the longitudinal axis 865 to turn the inner surface 805 of the bearing 705. The bearing 705 can allow the pin 720 to rotate in a first direction to allow the door 130 to close. However, the bearing 705 can limit, prevent, or resist rotation in the opposite direction, e.g., in a second direction to allow the door 130 to open.

When the bearing 705 resists rotation of the pin 720, the pin 720 can cause the outer surface 810 to rotate. The outer surface 810 can be fixedly coupled, fastened, coupled, or attached to a component 710. The rotation of the outer surface 810 of the bearing 705 can cause the component 710 to rotate in the same direction as the outer surface 810 of the bearing 705 rotates. The component 710 can be a cylindrical component with an opening that the bearing 705 fits within or telescopes within. The opening can be a cylindrical shaped cavity that is the same size, or slighting larger, than the bearing 705. The component 710 can have a longitudinal axis aligned with the longitudinal axis 865 of the pin 720. The component 710 can include an end, boundary, edge, or surface 815. The end 815 can be circular or oval shape and couples with a component 820.

The component 820 can be a cylindrical or disc shaped component. The component 820 can be a friction material, a spacer, a brake, a ceramic material, a washer. A longitudinal axis of the component 820 can be aligned with the longitudinal axis 865 of the pin 720. The component 820 can apply force to the surface 815. When the component 710 rotates, the component 820 can apply force to the surface 815 and slow the rate at which the component 720, the outer surface 810 of the bearing 705, and the pin 720 rotate. This can slow the rate at which the door 130 opens. A load 825 can be applied to the component 710, the bearing 705, or the pin 720 to control, limit, reduce, or slow the rate at which the door 130 opens. The load 825 can be a friction load, a clamp, a spring load, a piston load. The load 825 can be a component that includes a cylindrical cavity that the component 820 and the component 710 fit within or telescope within. For example, a diameter of the cavity of the load 825 can be substantially equal to, or slightly greater than, an outer diameter of the component 820 or a diameter of the component 710. A longitudinal axis of the load 825 can be aligned with the longitudinal axis 865 of the pin 720.

An inner surface of the load 825 can apply a force to the component 820, causing the component 820 to apply a force to the surface 815 of the component 710. The load 825 can be clamped by a clamping connector, washers, spacers, a nut, a bolt, a connector. For example, a bolt can extend through an opening of the load 825, the component 820, and the component 710. Spacers 715 can be coupled to the bolt between an end of the bolt and an outer surface of the load 825. When the bolt is tightened, the spacers 715 can apply a force to the clamp 825 causing the clamp to apply the force onto the component 820 and the component 710.

The left arm 520 and the right arm 535 can be coupled to the pin 720. For example, the left arm 520 and the right arm 535 can each include an opening 725. A component 730 can fit through the openings 725. For example, the component 730 can be a cylindrical component. The openings 725 can be circular or cylindrical shaped openings. The diameter of the openings 725 can be substantially equal to, or slightly greater, than the diameter of the cylindrical component 730. The component 730 can be fixed, attached, frictionally coupled, or otherwise connected to the left arm 520 and the right arm 535 via the openings 725. The component 730 can extend through each opening 725 such that a left end of the component 730 extends past an outer surface of the left arm 520 or a right end of the component 730 extends past an outer surface of the right arm 535. A longitudinal axis of the cylindrical component 730 can be aligned with the longitudinal axis 865 of the pin 720.

The cylindrical component 730 can include a hollow portion, an open portion, a cavity. The pin 720 can extend through the open portion of the cylindrical component 730. The inner surface of the hollow portion can conform to an outer surface of the pin 720. At least one snap, bolt, screw, nail, connector, weld, or other component can fix the cylindrical component t730 with the pin 720. Rotation of the door 130 can cause the cylindrical component 730 to rotate which in turn can cause the pin 720 to rotate.

Figure 9:
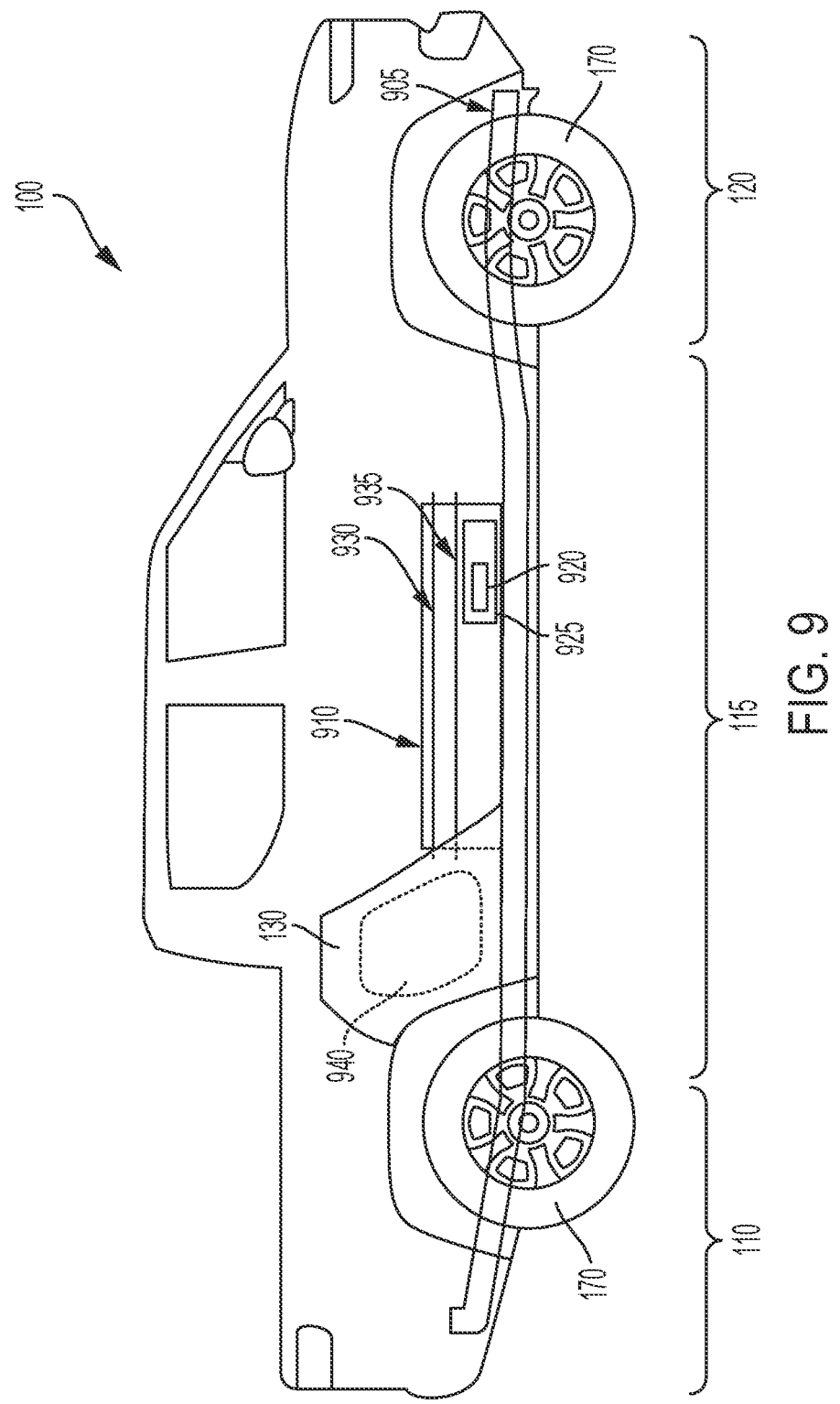
FIG. 9 depicts an example electric vehicle.

FIG. 9 is an example electric vehicle 100. The electric vehicle 100 can be installed with at least one battery pack 910. Electric vehicles 100 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 910 can also be used as an energy storage system to power a building, such as a residential home or commercial building. Electric vehicles 100 can be fully electric or partially electric (e.g., plug-in hybrid) and further, electric vehicles 100 can be fully autonomous, partially autonomous, or unmanned. Electric vehicles 100 can also be human operated or non-autonomous. Electric vehicles 100 such as electric trucks or automobiles can include on-board battery packs 910, battery modules 925, or battery cells 920 to power the electric vehicle 100.

The electric vehicle 100 can include a chassis 905 (e.g., a frame, internal frame, or support structure). The chassis 905 can support various components of the electric vehicle 100, e.g., the door 130. The chassis 905 can span the front portion 120 (e.g., a hood or bonnet portion), the body portion 115, and the rear portion 110 (e.g., a trunk, payload, or boot portion) of the electric vehicle 100. The battery pack 910 can be installed or placed within the electric vehicle 100. For example, the battery pack 910 can be installed on the chassis 905 of the electric vehicle 100 within one or more of the front portion 120, the body portion 115, or the rear portion 110. The battery pack 910 can include or connect with at least one busbar, e.g., a current collector element. For example, the first busbar 930 and the second busbar 935 can include electrically conductive material to connect or otherwise electrically couple the battery modules 925 or the battery cells 920 with other electrical components of the electric vehicle 100 to provide electrical power to various systems or components of the electric vehicle 100.

The vehicle 100 can include two front wheels 170 and two rear wheels 170. The vehicle 100 can include one or multiple motors. The motors can drive an axle connected to the two front wheels 170 or an axle connected to the two rear wheels 166. A single motor can drive an axle of the two front wheels 170. A single motor can drive an axel of the two rear wheels 170. Each wheel of the wheels 170 can be driven by an individual motor. For example, each of the four wheels 170 can be driven by one of four motors. The battery pack 910 can discharge stored energy to power the motors of the front wheels 170 and the rear wheels 170. The battery pack 910 can discharge stored energy to generate power that the motors receive. Operating the motors of the wheels 170 can cause the vehicle 100 to drive forward, reverse, or turn.

The gear tunnel 940 can extend across the vehicle 100. The gear tunnel 940 can extend into the vehicle 100 but no across the vehicle 100. The gear tunnel 940 can include at least one top portion, at least one bottom portion, at least one first side portion, and at least one second side portion. The first side portion can extend up from a bottom portion to a top portion at an oblique angle to the bottom portion. The first side portion and the second side portion can be parallel (e.g., parallel and oblique to the bottom portion or parallel and perpendicular to the bottom portion). The first side portion and the second side portion can be slanted towards each other or away from each other. The first side portion can include an oblique sub-portion that extends from a bottom of the gear tunnel 940 and a perpendicular sub-portion that extends up to the top portion of the gear tunnel 940 from an end of the oblique sub-portion. The gear tunnel 940 can be disposed adjacent a cargo bed of the vehicle 100. The gear tunnel 940 can be disposed adjacent the rear passenger storage area 115. The gear tunnel 940 can be disposed between the cargo bed 110 and the rear passenger storage area 115.

A first door 130 can cover a first end of a gear tunnel 940. A second door 130 can cover a second end of the gear tunnel 940. The doors 130 can move between open and closed positions sealing or exposing an interior of the gear tunnel 940 and stowing or providing the steps 135. The doors 130 can hinge on a bottom side, a top side, or a lateral side of the opening. The gear tunnel 940 can include at least one bottom portion (e.g., a gear shuttle) that extends out from the gear tunnel 940. The bottom portion can be or include a sled or flat portion. The bottom portion can be supported by the vehicle 100. The bottom portion can be stored within the tunnel 940. The bottom portion can extend or transport out of the gear tunnel 940 through an opening of the gear tunnel 940. The bottom portion can be supported by at least one support. The support can include a leg, multiple legs, at least one pipe, wheel, or box. The bottom portion can be 60-70 inches long. The bottom portion can be 55-75 inches long. The bottom portion can be less than 55 inches long. The bottom portion can be more than 75 inches long. The bottom portion can be 18-19 inches wide. The bottom portion can be 17-20 inches wide. The bottom portion can be less than 17 inches wide. The bottom portion can be more than 20 inches wide. The bottom portion can be 0.5-1.5 inches thick. The bottom portion can be 0.2-2 inches thick. The bottom portion can be more than 2 inches thick. The bottom portion can be less than 0.2 inches thick. The bottom portion can include a top portion, a bottom portion, at least one lateral wall, and at least one end. The bottom portion can be a rectangular solid or a prismatic shape.

Figure 10:
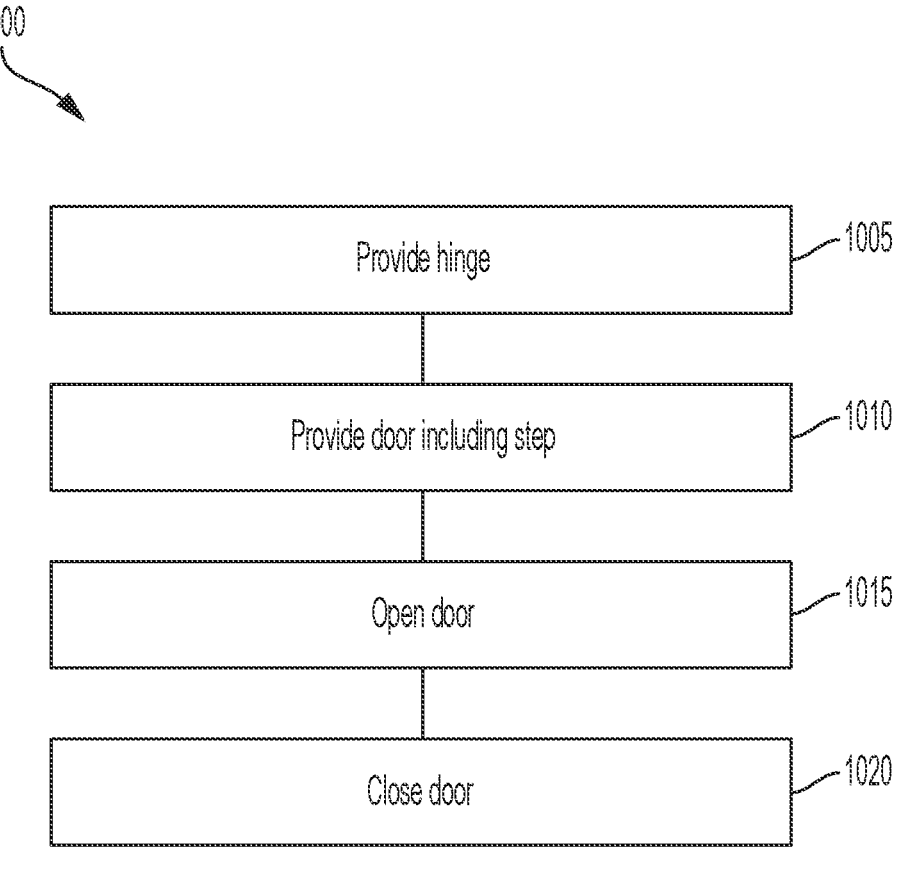
FIG. 10 depicts an example method for a door including at least one step.

FIG. 10 depicts an example method 1000 for a door 130 including at least one step 135. At least one ACT of the method 1000 can be performed by the vehicle 100, the door 130, the hinge 150 of the door 130, the sprag apparatus 700, a user, a driver of the vehicle 100, an occupant of a vehicle 100, a person, a manufacturing individual, a maintenance individual, a robotic manufacturing system, a manufacturing apparatus. The method 1000 can include an ACT 1005 including providing a hinge. The method 1000 can include an ACT 1010 including providing a door including a step. The method 1000 can include an ACT 1015 including opening a door. The method 1000 can include an ACT 1020 including closing a door.

At ACT 1005, the method 1000 can include providing a hinge. Providing the hinge can include providing the hinge 150. Providing the hinge 150 can include coupling the hinge 150 to the side 145 of the vehicle 100. Providing the hinge 150 can include coupling an end of the hinge 150 to a side 145 of the vehicle 100. For example, the hinge 150 can include a bracket 505 fixed to the side 145 of the vehicle 100. A bracket 510 can be fixed to the bracket 505 and can support a sprag apparatus 700 including a pin 720, a cylindrical component 730, a bearing 705, a cylindrical component 710, a component 820, a clamp 825, and spacers 715.

At ACT 1010, the method 1000 can include providing a door including a step. For example, the ACT 1010 can include providing at least one door 130. For example, the ACT 1010 can include providing a passenger side door 130 for a passenger side of the vehicle 100 and a driver side door 130 for a driver side of the vehicle 100. The ACT 1010 can include providing the door 130 including at least one step 135. The door 130 can include multiple steps 135 forming a ladder or stairs. Providing the door 130 can include fixing the door 130 to the hinge 150. For example, arms 520 and 535 can be coupled with the pin 720 and the portion 730. For example, the pin 720 and the portion 730 can be inserted through openings 725 of the arms 520 and 535.

At ACT 1015, the method 1000 can include opening a door. For example, the ACT 1015 can include opening the door 130. Opening or closing the door 130 can include moving the door 130 to move the step 135 between open and closed positions. Opening the door 130 can include rotating the door 130 from a closed position to an open position. Opening the door 130 can include rotating the door 130 on the hinge 150. A side of the door 130 that is a top side when the door 130 is closed, e.g., a side, edge, or boundary that is highest above a surface under the vehicle 100, can rotate downwards along a circular, oval, or curved shaped path towards the surface under the vehicle 100. The hinge 150 can be fixed to a bottom edge, surface, or boundary of the opening of the side 145 of the vehicle and can be fixed to a bottom side of the door 130 when the door 130 is in the closed position. When the door 130 rotates to the open position, the weight of the door 130 can be supported by the hinge 150 and the vehicle 100. The hinge 150 can cantilever the door from the side 145 of the vehicle 100. When the door 130 opens, the hinge 150 can apply a load such that the door 130 can rotate at a rate less than a rate at which the door 130 would rotate at due to gravity were the load not applied. For example, the sprag apparatus 700 can apply a clamping load 825 that slows, reduces, or limits the rate at which the door 130 opens. The load 825 of the sprag apparatus 700 can apply when the door 130 is rotating to open. The load 825 of the sprag apparatus 700 may not slow, reduce, or limit the rate at which the door 130 travels when the door 130 is closed.

At ACT 1020, the method 1000 can include closing a door. For example, the ACT 1020 can include closing the door 130. When the door 130 closes, the arms 520 and 535 can rotate the pin 720. The pin 720 can be coupled to the sprag bearing 705 and can rotate the inner surface 805 of the bearing 705. The sprag bearing 705 can allow the inner surface 805 to rotate when the door 130 rotates from the open position to the closed position. Because the sprag bearing 705 permits the inner surface 805 to rotate, the component 710 is not rotated and the clamping load 825 applied to the surface 815 of the component 710 does not limit, slow, or control the rate at which the inner surface 805 of the sprag bearing 705 rotates. Therefore, the door 130 can close without any, or with minimal, resistance from the clamping load 825.

Figure 11:
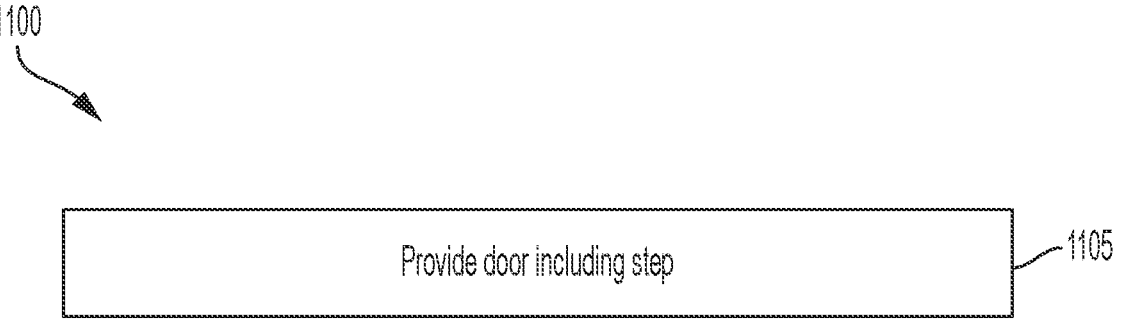
FIG. 11 depicts an example method of providing a door including at least one step.

FIG. 11 depicts an example method 1100 of providing a door including a step. The method 1100 can include an ACT 1105 of providing the door 130 including at least one step 135. The door 130 can include a hinge 150. The door 130 can include at least one bracket 505 coupled to a frame of the vehicle 100. The door 130 can include at least one bracket 510 coupled to the bracket 505. The door 130 can include a left arm 520 coupled to one bracket 510 and a right arm 535 coupled to a bracket 510 via a pin 720. The door 130 can include a sprag bearing 705 coupled to an end of the pin 720. The door 130 can include a component 710 telescoped around an outer surface 810 of the bearing 705. The door 130 can include a component 820 clamped to a surface 815 of the component 710 via a clamping load 825 clamped by at least one spacer 715.

The door 130 can include a plate 545 coupled to an upper surface, edge, or boundary of the left arm 520 and the right arm 535 to form a step 135. The door 130 can include a portion 560 that extends from the right arm 535, to the left arm 520, and to a plate 564 that forms a second step 135. The door 130 can include a handle 140. The handle 140 can normally be suspended above a surface under the vehicle 100. If the surface under the vehicle 100 is uneven such that a surface reaches the door 130, an edge 345 of the handle 140 can extend a distance 310 beyond an edge 335 of the door 130 to make contact with the surface under the vehicle 100 to prevent the door 130 from coming into contact with the surface under the vehicle 100 and being damaged by the surface.

Figure 12:
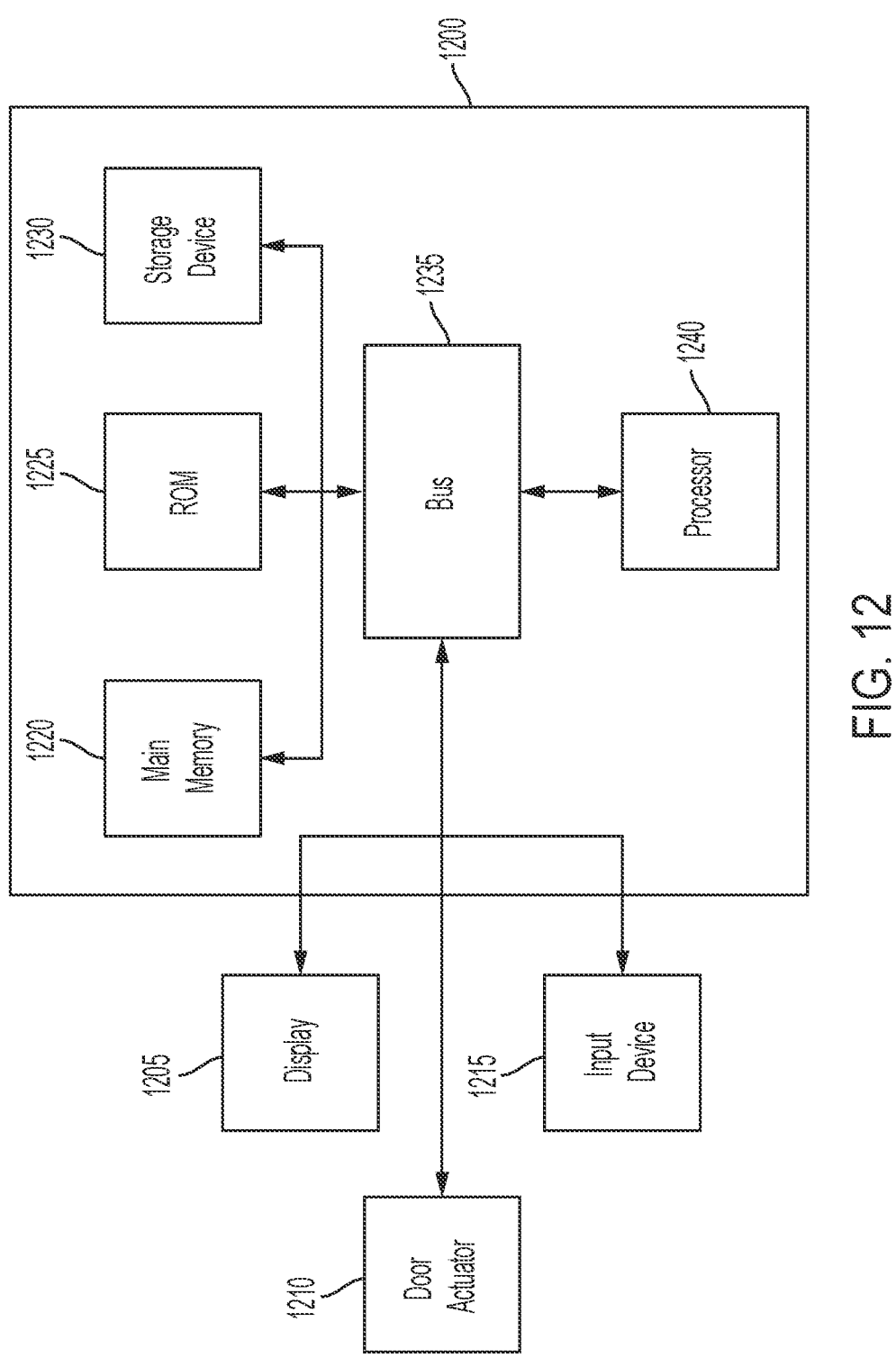
FIG. 12 depicts a block diagram illustrating an architecture for a data processing system that can be employed to implement elements of the systems and methods described and illustrated herein.

FIG. 12 is a block diagram illustrating an architecture for a data processing system 1200 that can be employed to implement elements of the systems and methods described and illustrated herein. The data processing system 1200 can be a component of a vehicle 100. The data processing system 1200 can be a component of a user device such as a smartphone, a laptop, a tablet, a desktop computer. The data processing system 1200 can be a data processing node, a server system, a centralized processing system, a cloud computing system, a distributed processing system.

The data processing system 1200 can communicate with a door actuator 1210. The door actuator 1210 can be a component of the door 130 or a component of the vehicle 100. The door actuator 1210 can be a component that actuates the door 130. For example, the door actuator 1210 can be a motor, an electrically or mechanically controlled or engaged gas piston, spring piston, spring, solenoid, or any other actuator device. The door actuator 1210 can cause the door 130 to automatically raise or lower, e.g., rotate between the closed and open positions. The door actuator 1210 can selectively apply lift assistance when a user begins closing the door. For example, the door actuator 1210 can monitor a rotational force applied to the door 130 or a rotational acceleration of the door 130 and can automatically close or open the door 130 based on the detected rotational force.

The data processing system 1200 can transmit commands, signals, operating parameters, to the door actuator 1210 causing the door actuator 1210 to open the door 130, close the door 130, raise the door 130 a particular amount, lower the door 130 a particular amount. The data processing system 1200 can transmit the commands to the door actuator 1210 responsive to receiving an input via an input device 1215, e.g., a button press, a switch selection, a smartphone signal, or any other input command.

The data processing system 1200, e.g., a computer system or computing device, can include or be used to implement a data processing system or its components. The data processing system 1200 includes at least one bus 1235 or other communication component for communicating information and at least one processor 1240 or processing circuit coupled to the bus 1235 for processing information. The data processing system 1200 can also include one or more processors 1240 or processing circuits coupled to the bus for processing information. The data processing system 1200 also includes at least one main memory 1220, such as a random access memory (RAM) or other dynamic storage device, coupled to the bus 1235 for storing information, and instructions to be executed by the processor 1240. The main memory 1220 can be used for storing information during execution of instructions by the processor 1240. The data processing system 1200 may further include at least one read only memory (ROM) 1225 or other static storage device coupled to the bus 1235 for storing static information and instructions for the processor 1240. A storage device 1230, such as a solid state device, magnetic disk or optical disk, can be coupled to the bus 1235 to persistently store information and instructions.

The data processing system 1200 may be coupled via the bus 1235 to a display 1205, such as a liquid crystal display, or active matrix display, for displaying information to a user such as a driver of the electric vehicle 100 or other end user. An input device 1215, such as a keyboard or voice interface may be coupled to the bus 1235 for communicating information and commands to the processor 1240. The input device 1215 can include a touch screen display 1205. The input device 1215 can also include a cursor control, such as a mouse, a trackball, or cursor direction keys, for communicating direction information and command selections to the processor 1240 and for controlling cursor movement on the display 1205.

The processes, systems and methods described herein can be implemented by the data processing system 1200 in response to the processor 1240 executing an arrangement of instructions contained in main memory 1220. Such instructions can be read into main memory 1220 from another computer-readable medium, such as the storage device 1230. Execution of the arrangement of instructions contained in main memory 1220 causes the data processing system 1200 to perform the illustrative processes described herein. One or more processors in a multi-processing arrangement may also be employed to execute the instructions contained in main memory 1220. Hard-wired circuitry can be used in place of or in combination with software instructions together with the systems and methods described herein. Systems and methods described herein are not limited to any specific combination of hardware circuitry and software.

Although an example computing system has been described in FIG. 12, the subject matter including the operations described in this specification can be implemented in other types of digital electronic circuitry, or in computer software, firmware, or hardware, including the structures disclosed in this specification and their structural equivalents, or in combinations of one or more of them.

Figure 13:
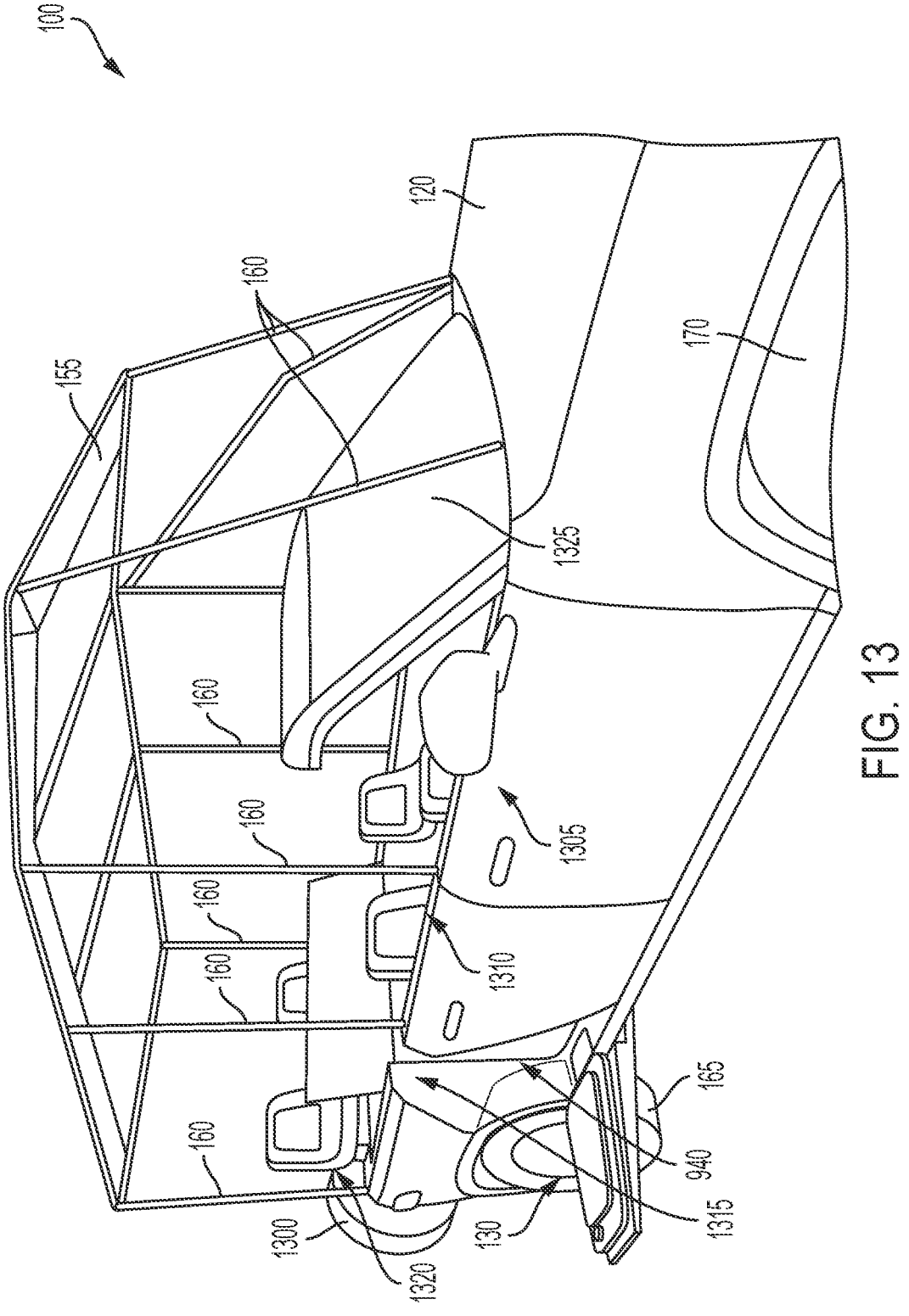
FIG. 13 depicts an example vehicle including a canopy and a spare tire apparatus.

FIG. 13 depicts an example vehicle 100 including a canopy 155 and a spare tire apparatus or tire carrier 1300.

Figure 17:
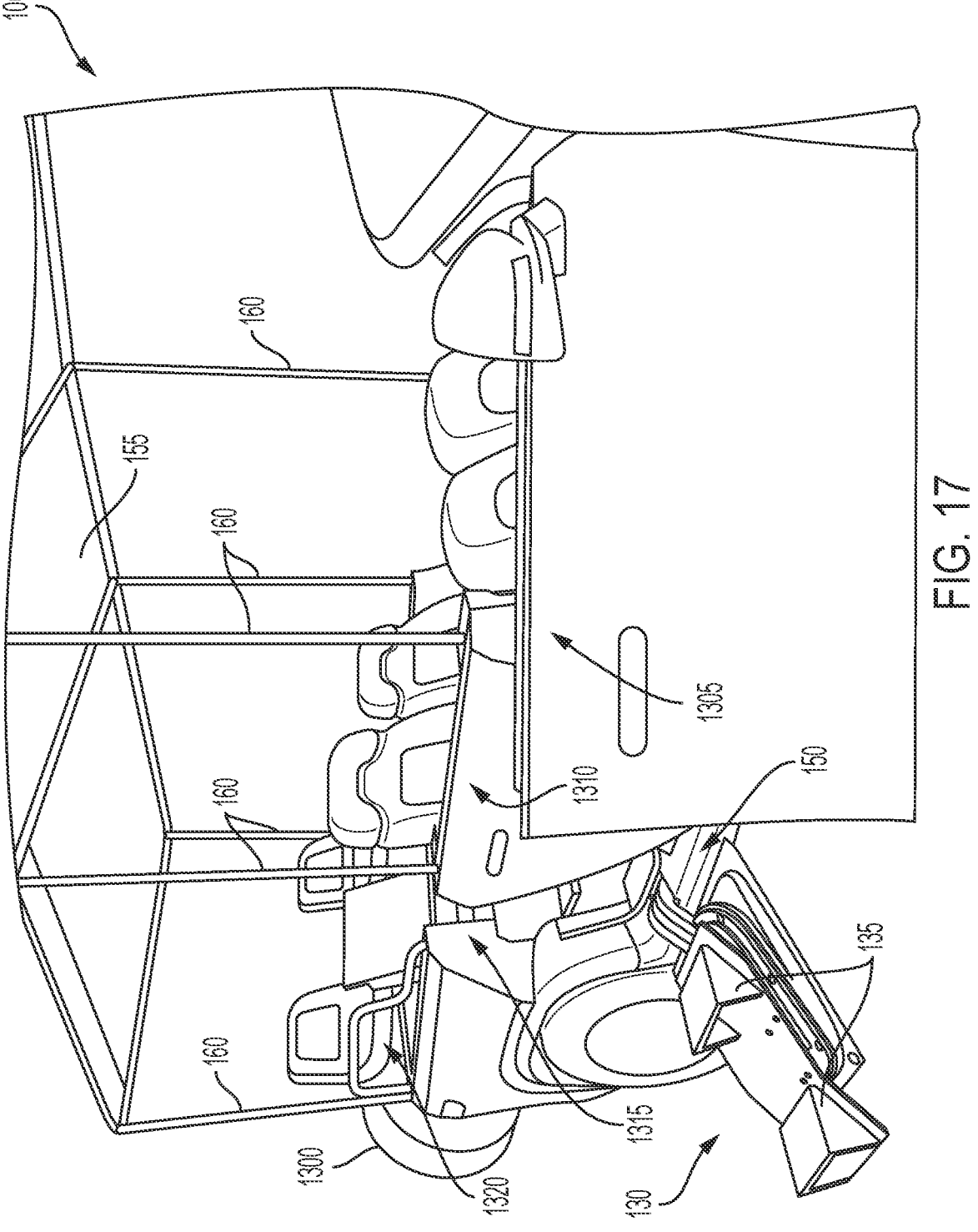
FIGS. 17-18 depict example vehicles.
Figure 18:
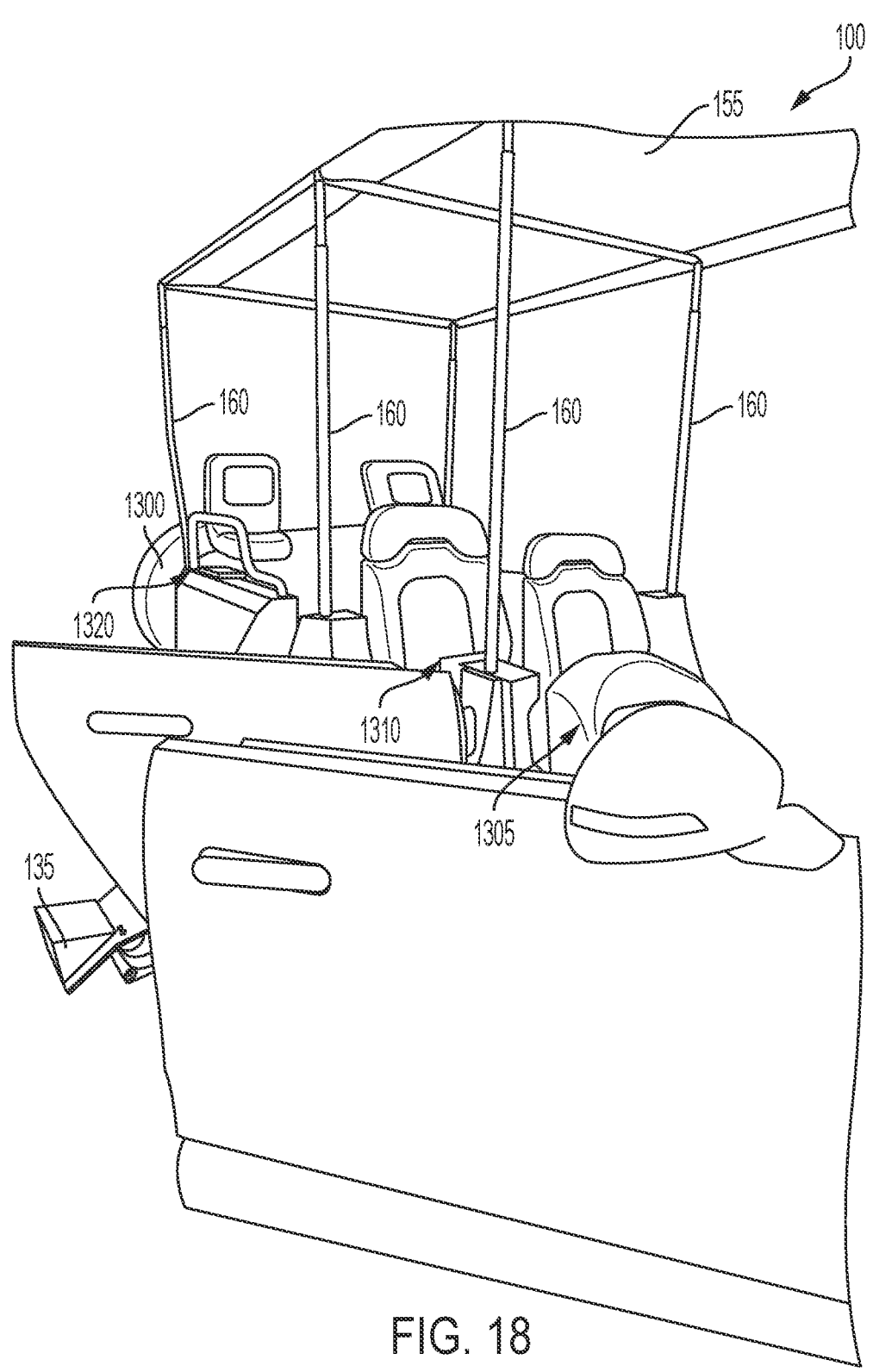

FIGS. 17-18 depict further views of an example vehicle 100. The vehicle 100 can included modified passenger and/or driver seats in a front row 1305. The modified passenger and driver seats of the front row 1305 may not include a headrest. The vehicle 100 can include an elevated second row 1310 of seats. The seats may be modified seats with a compartment underneath the seats. The vehicle 100 can include an elevated third row 1315 of seats. The third row 1315 of seats can be elevated above the first row 1305 and second row 1310. The third row 1315 of seats can include compartments underneath the seats. Furthermore, the vehicle 100 can include an elevated fourth row 1320 of seats. The fourth row 1320 of seats can be elevated above the third row 1315 of seats. The third row 1315 and the fourth row 1320 can provide terrace seating for the vehicle 100. The body of the vehicle 100 can be modified.

The front row 1305 and the elevated second row 1310 can both be disposed within the vehicle 100 distances from the front of the vehicle, e.g., from the front tires 170, a front bumper, a front hood. The front row 1305 can be disposed a first distance from the front of the vehicle 100. The second row 1310 can be positioned a second distance from the front of the vehicle. The front row 1305 can be positioned closer to the front of the vehicle than the elevated row 1310, e.g., the first distance can be less than the second distance or the second distance can be greater than the first distance. The third row 1315 can be positioned a third distance from the front of the vehicle 100. The third distance can be greater than the first distance and the second distance, e.g., the front row 1305 and the elevated row 1310 can be closer to the front of the vehicle than the third row 1315 or the third row 1315 can be closer to a rear of the vehicle 100 than the front row 1305 and the elevated row 1310. The fourth row 1320 can be disposed a fourth distance from the front of the vehicle 100. The fourth distance can be greater than the first distance, the second distance, and the third distance. The first distance, the second distance, and the third distance can each be less than the fourth distance. The fourth row 1320 can be positioned furthest from the front of the vehicle 100 or closest to a rear of the vehicle 100.

The door 130 and the opening on the side 145 of the vehicle 100 that the door 130 covers can be positioned in the rear area 110 between the third row 1315 and the second row 1310. The door 130 and the opening in the side 145 of the vehicle 100 can provide access to the third row 1315. The door 130 and the opening in the side 145 of the vehicle 100 can be located a distance from the front of the vehicle 100 that is less than the distance the third row 1315 is located from the front of the vehicle 100. The distance that the door 130 and the opening in the side 145 of the vehicle 100 is located from the front of the vehicle 100 can be less than a distance that the row 1310 is located form the front of the vehicle 100.

The front row 1305 and the elevated row 1310 can be disposed in a front area of the vehicle 100, e.g., in the middle portion 115 or the front portion 120 of the vehicle 100. The third row 1310 and the fourth row 1320 can be located or disposed in a rear area of the vehicle 100, e.g., the rear portion 110. The rows 1305-1320 can be elevated so that occupants of the rows 1305-1320 can see over each other. For example, from a floor of the vehicle 100, the first row 1305 can be elevated a first amount, the second row 1310 can be elevated a second amount, the third row 1315 can be elevated a third amount, and a fourth row can be elevated a fourth amount. The second row 1305 can be elevated higher than the first row 1310. The third row 1315 can be elevated higher than the second row 1310. The fourth row 1320 can be elevated higher than the third row 1315.

The vehicle 100 can include interior lighting. For example, one or more floor, side wall, or canopy lights can be coupled within the vehicle 100. The lights can be powered by the battery pack 910. The lights can be or include removable lights. The lights can be battery powered and charge via the battery pack 910. The lights can be removed from the vehicle 100 and used as flashlights. The lights can latch into, stow into, or charge in a storage compartment of the vehicle 100.

The vehicle 100 can include a cutaway tunnel 940. For example, the tunnel 940 can include a bottom side, a left side that extends up from the bottom side to an end, edge, or boundary of the left side, a right side that extends up from the bottom side to an end, edge, or boundary of the right side. However, the cutaway tunnel 940 may not include any top side. Therefore, a user can walk through the opening formed by the cutaway tunnel 940 since the tunnel 940 does not include a top side. The cutaway tunnel 940 can have a bottom floor panel that covers a storage area. Components, a compact kitchen, equipment, tools, groceries, or other items can be stowed within the storage area.

The canopy structure 155 can cover a windshield 1325. The windshield 1325 can be an adjustable windshield 1325. For example, the windshield can be removed, retracted, tilted. The front portion 120 of the vehicle can be a front trunk. The front trunk can be or include a water tank. The water tank can be suspended, hung, or coupled to the front trunk 120 allowing for a sink to be deployable and connect to the water tank to receive water from the water tank. The water tank can be located above the sink to provide water pressure at the sink. The front trunk 120 can include a pump that pumps the water to the sink to allow for water pressure at the sink.

Figure 14:
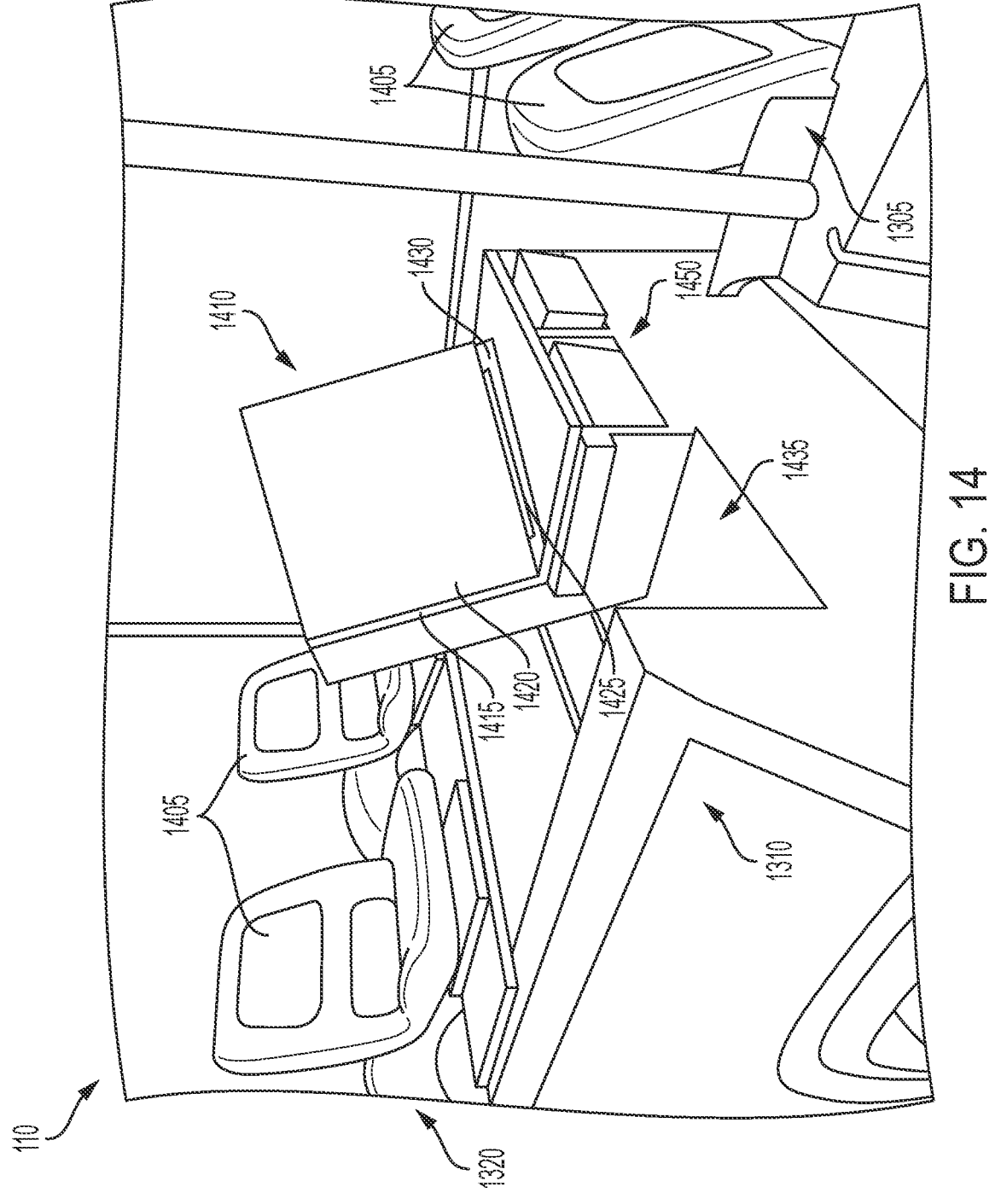
FIG. 14 depicts an example passenger seat that folds.

FIG. 14 depicts an example passenger seat 1410 that folds. The passenger seat 1410 can be a bench seat 1410. A portion 1420 of the bench 1410 can rotate on a hinge 1415. The hinge 1415 can be fixed to a back portion of the bench 1410 and allow the portion 1420 to rotate upwards from a deployed position to a stowed position. The hinge 1415 can rotate the portion 1420 from a passenger side of the vehicle 100 towards a driver side of the vehicle 100. The hinge 1415 can rotate the portion 1420 from the driver side of the vehicle 100 towards the passenger side of the vehicle 100. The bench 1410 can include a storage compartment 1450. The storage compartment can be included on the driver side of the vehicle 100 but not on the passenger side of the vehicle 100 such that a pass through area 1435 is clear for a user to pass through. The storage compartment 1450 can be included on the passenger side of the vehicle 100 but not the driver side of the vehicle 100. The storage compartment 1450 can extend from the driver side of the vehicle 100 to the passenger side of the vehicle 100.

The rows 1305-1320 can include swivel seats 1405. The swivel seats 1405 can rotate on a hinge fixed to the vehicle 100 in a single direction or bi-directionally (e.g., in either a clockwise or counter-clockwise direction). For example, the swivel seats 1405 can rotate ninety degrees in either direction. The swivel seats 1405 can rotate forty five degrees in either direction. The swivel seats 1405 can rotate one hundred eighty degrees in either direction. The swivel seats 1405 can rotate a full three hundred and sixty degrees. The portion 1420 can form a back rest of the bench 1410. The portion 1420 can include a hinge 1425 fixed to a seat portion 1430. The seat portion can be suspended by the hinge 1425 such that an occupant can sit on the seat portion 1430 when the seat portion 1430 is deployed. The seat portion 1430 can rotate upwards on the hinge 1425 and then from the occupant side of the vehicle to the driver side of the vehicle on the hinge 1415 to create an opening and allow occupants to gain access to the fourth row 1320. The folding seat of the bench 1410 can allow for a variety of folding or hinging configurations that address use cases such as a seat, a table, and a pass through area.

Figure 15:
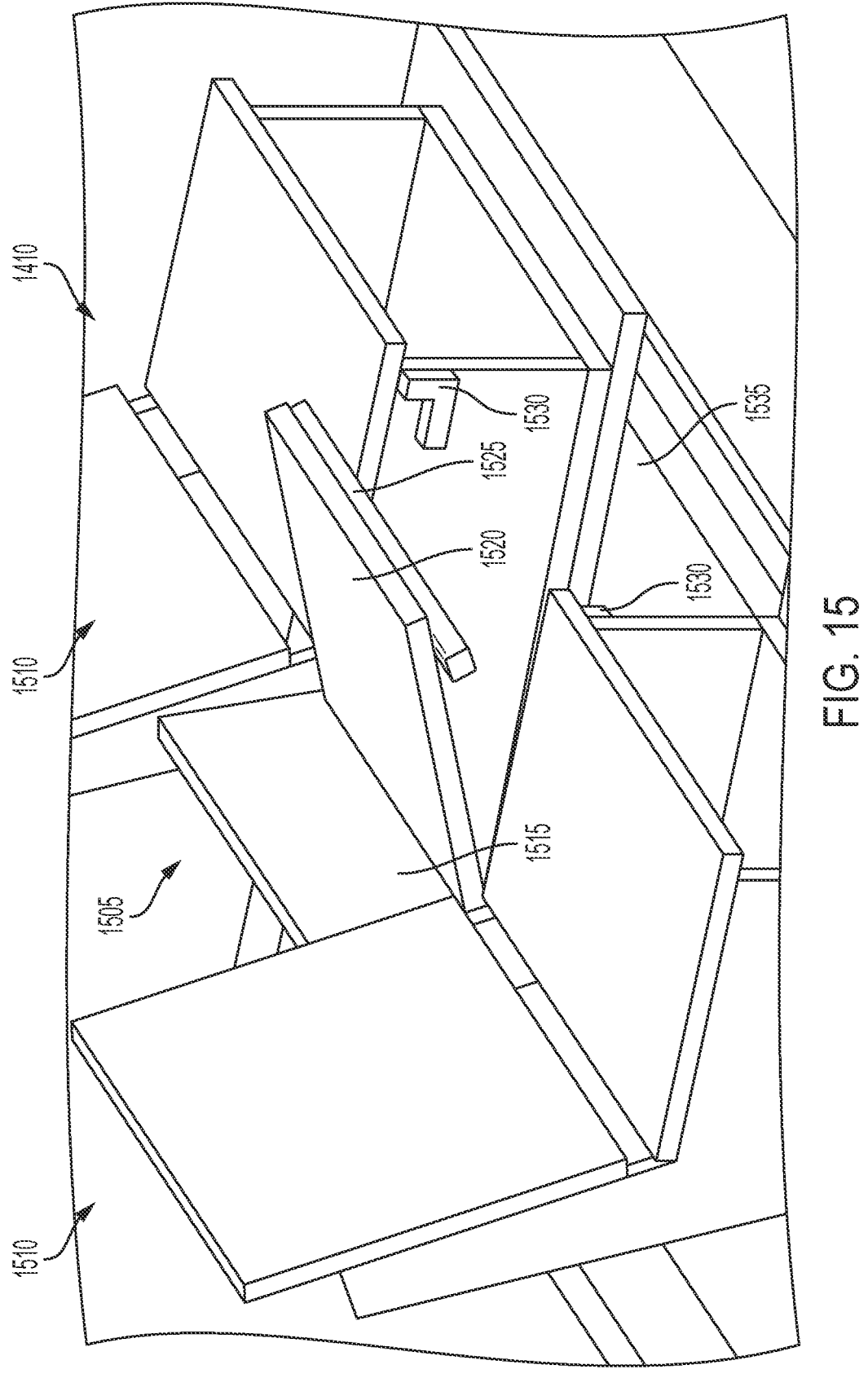
FIG. 15 depicts an example middle passenger seat that folds.
Figure 16:
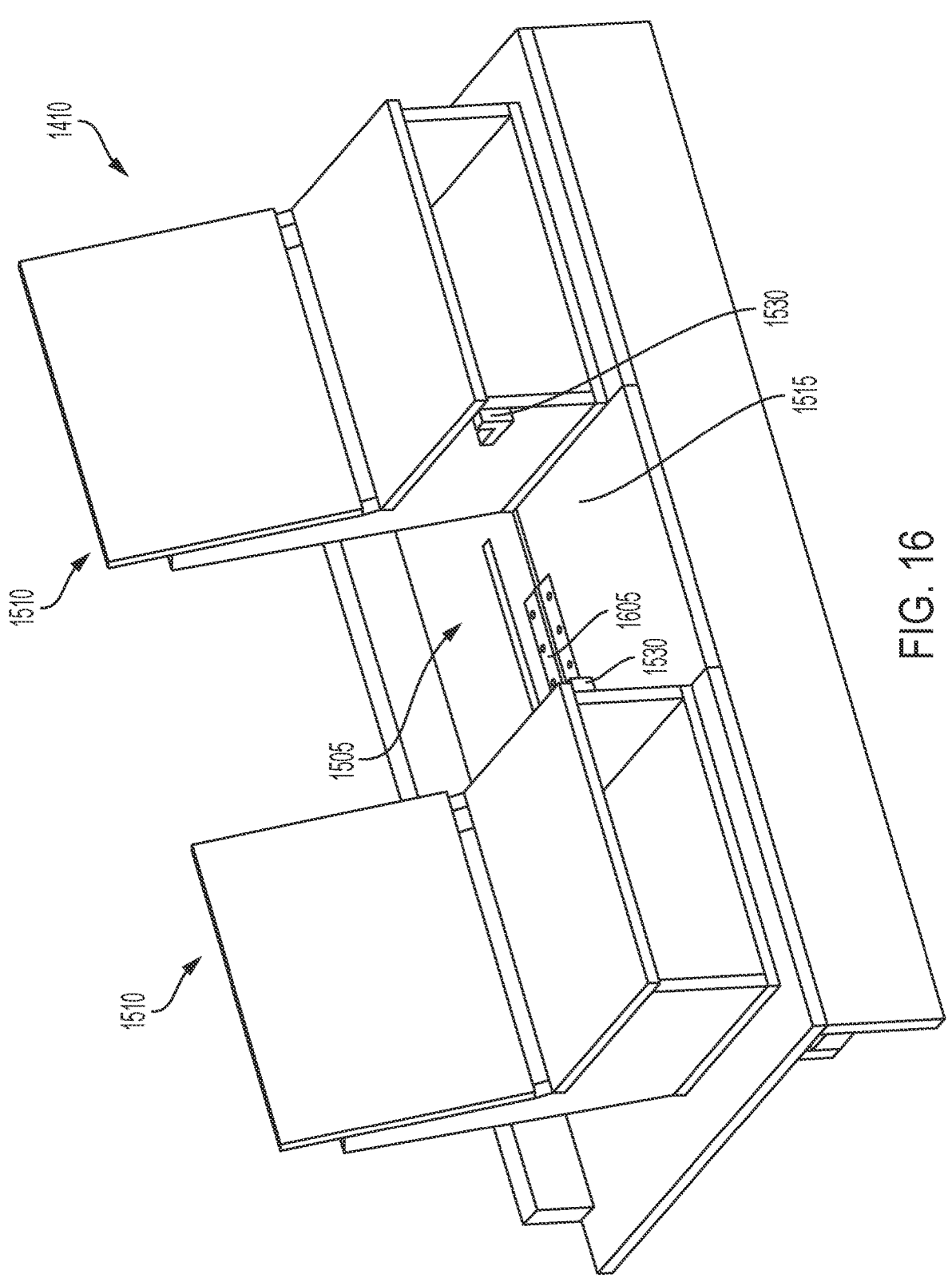
FIG. 16 depicts an example middle passenger seat folded to stow under a surface.

FIGS. 15-16 depict an example middle passenger seat 1505 that folds. The seat 1505 can be located between a first seat 1510 and a second seat 1510 in a row 1410. The seat 1505 can be located next to both the first seat 1510 and the second seat 1510 on either a passenger side of the vehicle 100 or the driver side of the vehicle 100. The seat 1505 can include a surface 1520. The surface can be a rectangular solid that a user can sit on. The surface 1520 can be fixed to a back 1515. The back 1515 can extend up from a floor up to an end, edge, or boundary. The back 1515 can be a back rest for an occupant to lean their back against. The back 1515 can be a rectangular solid. The back 1515 can be perpendicular to a floor of the vehicle 100 in a deployed position. The back 1515 can be angled away from the front portion 120 of the vehicle 100 towards the rear portion 110 of the vehicle 100. The angle can be 95 degrees to 100 degrees. The surface 1520 can extend from the back 1515 towards the front portion 120 of the vehicle.

In a deployed position, a member 1525 running front an edge or boundary of the first seat 1510 to the second seat can couple, secure, or fix the seat 1505 in a deployed position. The member 1525 can be a linkage, a bar, a beam, an elongated member, a structural member, or a support member. The member 1525 can sit on an l-shaped protrusion 1530. The first seat 1510 and the second seat 1510 can each include the protrusion 1530. The member 1525 can rest upon the protrusions 1530 to support the surface 1520.

The seat 1505 can lift backwards towards the rear portion 110 of the vehicle 100 on a hinge 1605. The hinge 1605 can be fixed to a floor of the vehicle 100 and the back 1515. The seat 1505 can lift backwards on the hinge 1605. The surface 1520 can rotate on a hinge that couples, fixes, or attaches to the back 1515 and the portion 1520. The portion 1520 can rotate towards the floor of the vehicle 100 while the back 1515 rotates backwards on the hinge 1605. The portion 1520 can be rotated upwards while the back 1515 is rotated backwards such that the portion 1520 can clear the protrusions 1530. The seat 1505 can rotate forward on the hinge 1605 and stow within a compartment, cavity, or opening 1535.

Figure 19:
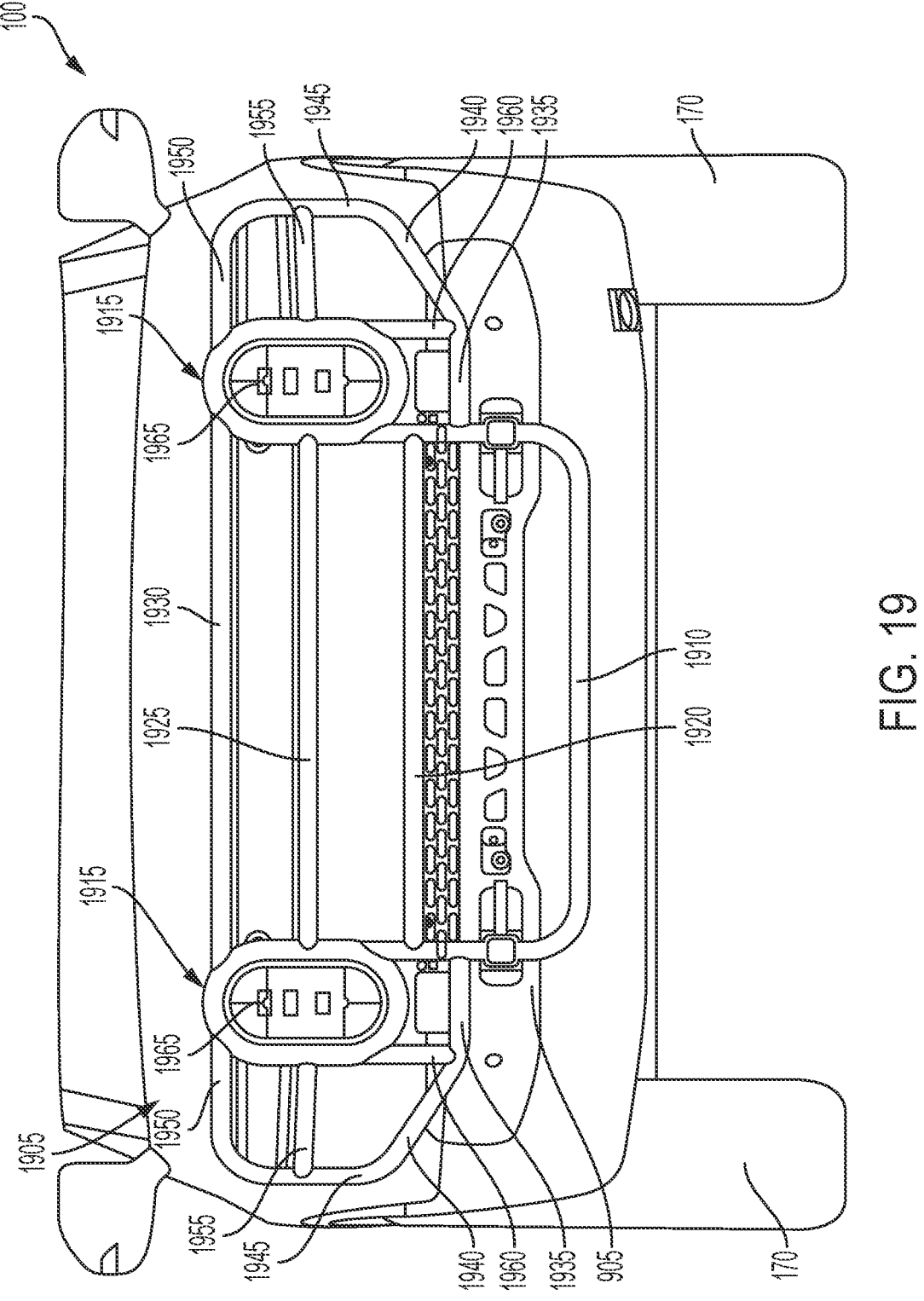
FIG. 19-21 depict an example vehicle including a grille guard.
Figure 20:
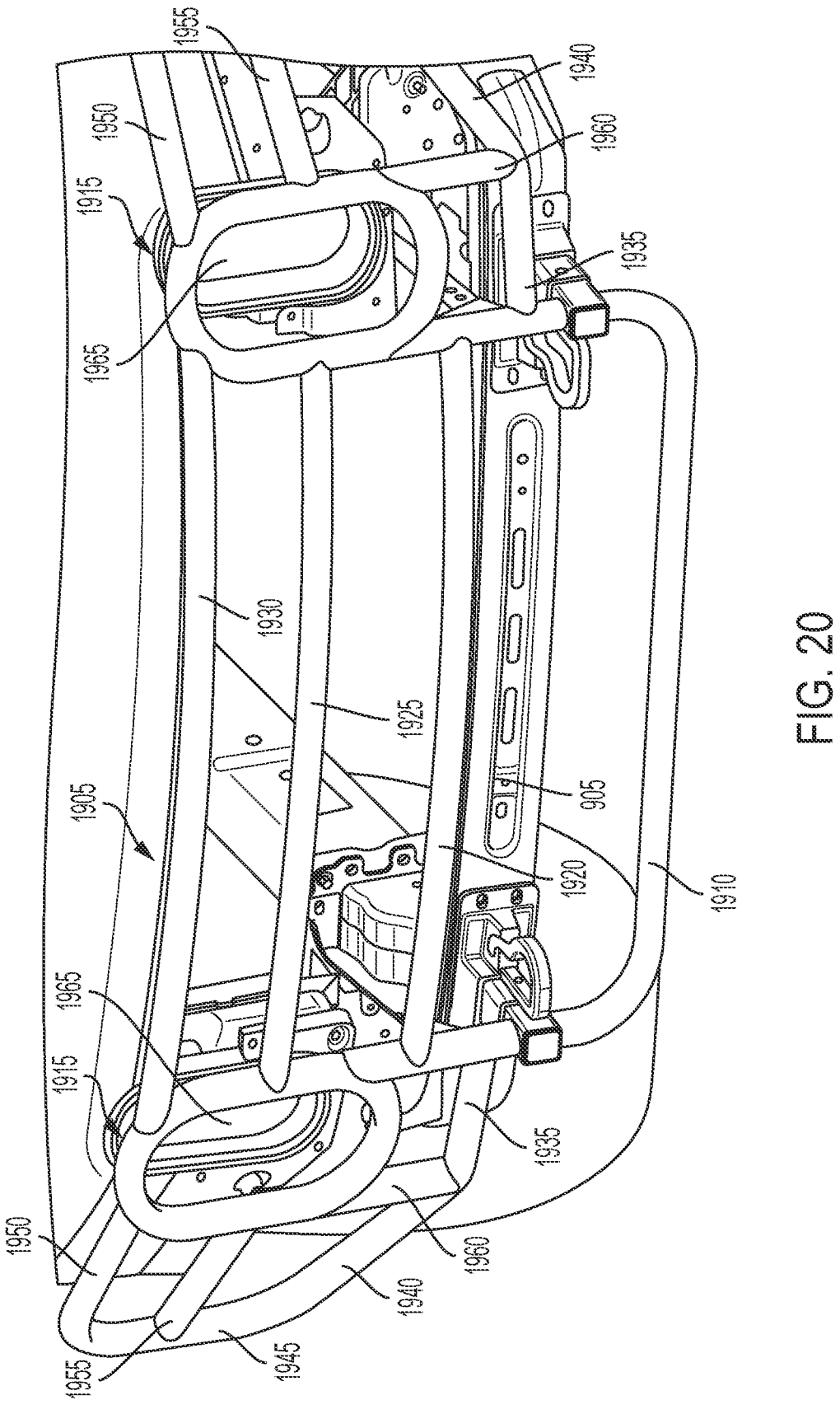
Figure 21:
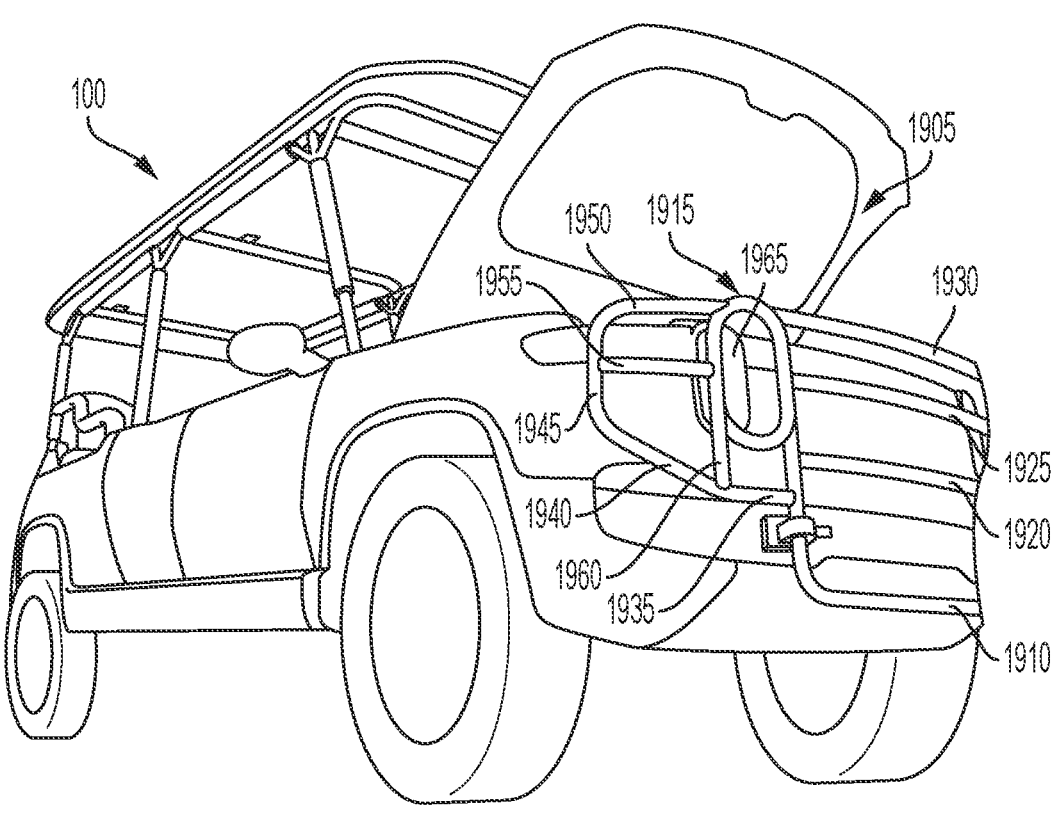

FIGS. 19-21 depict an example vehicle 100 including a grille guard 1905. The grill guard 1905 can be coupled, fixed, joined, or connected to the vehicle 100. For example, the grill guard 1905 can be coupled to the frame 905 of the vehicle 100. The frame 905 can support, suspend, lift, or cantilever the grille guard 1905. For example, a weight of the grille guard 1905 can be supported by the frame 905, which may be supported by the wheels 170 which contact a surface under the vehicle 100. The grille guard 1905 can be coupled to the frame 905 on a first side or a passenger side of the vehicle 100. The grille guard 1905 can be coupled to the frame 905 on a second side or a driver side of the vehicle 100. The grille guard 1905 can include one or multiple members 1910-1960. The members 1910-1960 can be beams, pipes, tubes, sections, or portions. The grille guard 1905 can be integrally formed from the members 1910-1960. The grille guard 1905 can be formed from separate members 1910-1960 that are connected to each other. The members 1910-1960 can be connected with a bolt, snap, weld, nut, bolt, or connector. The members 1910-1960 can be telescoping members. The members 1910-1960 can be formed from steel, aluminum, carbon fiber, copper, or a combination thereof.

The grille guard 1905 can include at least one member 1910. The member 1910 can be a first member to couple to a frame 905 of the vehicle 100. The member 1910 can be a u-shaped member. The member 1910 can be coupled to the frame 905 on the first and second sides of the vehicle 100. The member 1910 can include a parallel portion and two vertical or perpendicular portions. The member 1910 can be integrally formed. A first portion of the member 1910 can be parallel to a surface under the vehicle 100, to a hood of the vehicle 100, to a front bumper of the vehicle 100. The member 1910 can extend from one side of the vehicle 100 to another side of the vehicle 100. For example, the member 1910 can extend from a driver side to a passenger side of the vehicle 100. The member 1910 can extend from a first connector to connect the grille guard 1905 on a passenger side of the vehicle 100 to a second connector to connect the grill guard 1905 to the frame 905 on the driver side of the vehicle 100. The member 1910 can extend upwards. For example, the member 1910 can extend from a bumper of the vehicle towards a hood or roof of the vehicle 100. For example, at ends of the parallel portion of the member 1910, the member 1910 can extend perpendicularly to the parallel portion upwards. The parallel portion of the member 1910 can extend between ends of the vertical portions of the member 1910. The perpendicular portions of the member 1910 can extend away from a surface under the vehicle 100. The perpendicular portions of the members 1910 can meet the parallel portion of the member 1910 at corners. The corners can be angled or curved.

The perpendicular portions of the member 1910 can extend upwards towards stadium shaped members 1915. The stadium shaped member 1915 can be a second member. The stadium shaped member 1915 can be a third member. The member 1910 can support the stadium shaped members 1915. The grille guard 1905 can include at least one member 1915. The members 1915 can be stadium shaped, track shaped, circuit shaped, pill shaped, discorectangle shaped, squectangle shaped, obround shaped. The grille guard 1905 can include a first member 1915 and a second member 1915. The first member 1915 can be a driver side member 1915 located on a driver side of the vehicle 100. The second member 1915 can be a passenger side member 1915 located on a passenger side of the vehicle 100. A first end of the member 1910 can be coupled to the first stadium shaped member 1915. A second end of the member 1910 can be coupled to the second stadium shaped member 1915.

The vehicle 100 can include lights 1965. The vehicle 100 can include a first light or headlight 1965 located on a passenger side of the vehicle 100. The vehicle can include a second light or headlight 1965 located on a driver side of the vehicle 100. The lights 1965 can be or include head lights, flood lights, blinker lights, a laminating component, light emitting diodes (LEDs), incandescent light bulbs, mirrors, waveguides, reflectors. The lights 1965 can have a stadium shape, track shape, circuit shape, pill shape, discorectangle shape, squectangle shape, obround shape. For example, a face, outer face, or an outer boundary can have a circular shape, an oval shape, a stadium shape, a rectangular shape, or a square shape. The lights 1965 can be positioned, oriented, fixed, or coupled to the vehicle 100 such that curved sides of the lights 1965 are positioned on a top and bottom side of the headlight 1965. For example, a top curved or arc portion of the headlight 1965 can be positioned above a bottom curved or arc portion of the headlight 1965. For example, the bottom arc or curved portion of the light 1965 can be located closer to a ground or bottom surface under the vehicle 100 than the top arc or curved portion of the light 1965. Straight or flat sections of the lights 1965 can be parallel with each other. The straight or flat sections of the lights 1965 can be parallel with a member 1945, a member 1960, a vertical portion of the member 1910. The straight or flat sections of the lights 1965 can be perpendicular with the member 1950, the member 1955, the member 1935, the member 1930, the member 1925, the member 1920, or the parallel section of the member 1910.

The stadium shaped members 1915 can be centered on the lights 1965. For example, a first stadium shaped member 1915 can be centered on a first headlight 1965. A second stadium shaped member 1915 can be centered on a second headlight 1965. The stadium shaped members 1915 can be positioned, oriented, fixed, or coupled to the vehicle 100 such that curved sides of the stadium shaped members 1915 are positioned on a top and bottom side of the stadium shaped members 1915. For example, a top curved or arc portion of the stadium shaped members 1915 can be positioned above a bottom curved or arc portion of the stadium shaped members 1915. For example, the bottom arc or curved portion of the stadium shaped members 1915 can be located closer to a ground or bottom surface under the vehicle 100 than the top arc or curved portion of the stadium shaped members 1915. Straight or flat sections of the lights 1965 can be parallel with each other. The straight or flat sections of the lights 1965 can be parallel with a member 1945, a member 1960, a vertical portion of the member 1910. The straight or flat sections of the stadium shaped members 1915 can be perpendicular with the member 1950, the member 1955, the member 1935, the member 1930, the member 1925, the member 1920, or the parallel section of the member 1910.

The stadium shaped members 1915 can include lateral sides that are straight or flat. These lateral sides of the stadium shaped members 1915 can be parallel with the straight or flat lateral sides of the lights 1965. The stadium shaped members 1915 can be the same size, or substantially the same size, as the lights 1965. For example, an outer boundary of the stadium shaped members 1915 can be positioned on the outer boundary of the lights 1965. The stadium shaped members 1915 can be slightly larger than the lights 1965. For example, the outer boundary of the headlight 1965 can be completely or partially included or contained within an inner or outer boundary of the stadium shaped member 1915. For example, the stadium shaped member 1915 can circumscribe all or part of the headlight 1965. A driver side stadium shaped member 1915 can circumscribe all or part of a driver side headlight 1965 while a passenger side stadium shaped member 1915 can circumscribe all or part of a passenger side stadium shaped member 1915.

A member 1920 can extend between the vertical portions of the member 1910. A first end of the member 1920 can be coupled to a first vertical portion of the member 1910. A second end of the member 1920 can be coupled to a second vertical portion of the member 1910. The member 1920 can be parallel to the bottom portion of the member 1910. The member 1920 can be disposed below the stadium shaped members 1915. For example, the member 1920 can be disposed below the ends of the member 1910. The member 1920 can be located closer to a surface under the vehicle than the stadium shaped members 1915. The member 1920 can be located closer to a bumper or wheels 170 of the vehicle 100 than the stadium shaped members 1915.

The grille guard 1905 can include at least one member 1925. The member 1925 can be a fourth member. The member 1925 can be coupled to the first stadium shaped member 1915 and the second stadium shaped member 1915. For example, the member 1925 can extend from the first stadium shaped member 1915 to the second stadium shaped member 1915. For example, a first end of the member 1925 can be coupled to the first stadium shaped member 1915. A second end of the member 1925 can be coupled to the second stadium shaped member 1915. The member 1925 can be parallel to the member 1920. The member 1925 can be parallel to the member 1920. The member 1925 can be parallel to the parallel portion of the member 1910. The members 1925 and 1920 can be the same length. The members 1925 and 1920 can be different lengths, or slightly different lengths.

The grille guard 1905 can include at least one member 1930. The member 1930 can be parallel to the member 1925, the member 1920, or the parallel portion of the member 1910. The member 1930 can be longer than the member 1925 or the member 1920. The member 1930 can be coupled to the first stadium shaped member 1915 and the second stadium shaped member 1915. A first end of the member 1915 can be coupled to the first stadium shaped member 1915. A second end of the member 1915 can be coupled to the second stadium shaped member 1915.

The grille guard 1905 can include at least one member 1935. A first member 1935 can extend from a first vertical portion of the member 1910. A second member 1935 can extend from a second vertical portion of the member 1910. The first member 1935 can extend away from a center of the vehicle 100 towards a side of the vehicle, e.g., towards a passenger side wall of the vehicle 100 or towards a passenger side wheel 170 of the vehicle. The second member 1935 can extend away from a center of the vehicle 100 towards a side of the vehicle, e.g., towards a driver side wall of the vehicle 100 or towards a diver side wheel 170 of the vehicle. The members 1935 can be parallel with the member 1930, the member 1925, the member 1920, or the parallel portion of the member 1910. The member 1935 can have a width that is the same, slightly greater than, or slightly less than, the width of the stadium shaped members 1915.

The grille guard 1905 can include at least one member 1940. A first member 1940 can extend from the first member 1935. A second member 1940 can extend from the second member 1935. The member 1940 can extend at an oblique or acute angle from the member 1935. For example, the first member 1940 can extend from the member 1940 in a direction upwards towards the hood of the vehicle 100, a roof of a cab of the vehicle 100, a passenger side mirror of the vehicle 100, away from a surface under the vehicle 100, away from a tire 170 of the vehicle. The first member 1940 can extend at an upwards angle relative to the member 1935. The angle may be between forty and fifty degrees. The angle can be between thirty five and fifty five degrees. The angle can be less than thirty five degrees. The angle can be greater than fifty five degrees. The portion 1940 can extend towards the vehicle 100. For example, the portion 1940 can extend towards a grille of the vehicle 100, towards a rear of the vehicle 100, towards a truck bed of the vehicle 100. The portion 1940 can wrap around a front side, corner, or end of the vehicle 100. The portion 1940 can extend at an angle from the member 1935 towards the rear of the vehicle 100. The angle may be between forty and fifty degrees. The angle can be between thirty five and fifty five degrees. The angle can be less than thirty five degrees. The angle can be greater than fifty five degrees.

The grille guard 1905 can include at least one member 1945. A first member 1945 can extend from the first member 1940. A second member 1945 can extend from a second member 1940. The member 1945 can extend vertically. The member 1945 can be parallel to the vertical portions of the member 1910. The member 1945 can be parallel to the sides of the stadium shaped members 1915.

The grille guard 1905 can include at least one member 1950. A first member 1950 can extend from the first member 1945. A second member 1950 can extend from the second member 1945. The portion 1950 can extend towards the vehicle 100. For example, the portion 1950 can extend towards a grille of the vehicle 100, towards a rear of the vehicle 100, towards a truck bed of the vehicle 100. The portion 1950 can wrap around a front side or corner of the vehicle 100. The portion 1940 can extend at an angle from the member 1915 towards the rear of the vehicle 100. The angle may be between forty and fifty degrees. The angle can be between thirty five and fifty five degrees. The angle can be less than thirty five degrees. The angle can be greater than fifty five degrees. The member 1950 and the member 1945 can be perpendicular and meet at a corner. The corner may be a right angle or may be a curved corner.

The grille guard 1905 can include at least one member 1955. A first member 1955 can extend from the first stadium shaped member 1915. A second member 1955 can extend from the second stadium shaped member 1915. The first member 1955 can extend from the first stadium shaped member 1915 to the first member 1945. The second member 1955 can extend from the second stadium shaped member 1915 to the second member 1945. The member 1955 can wrap around a front side of the vehicle 100. The member 1955 can extend at an angle from the member 1915 towards the rear of the vehicle 100. The angle may be between forty and fifty degrees. The angle can be between thirty five and fifty five degrees. The angle can be less than thirty five degrees. The angle can be greater than fifty five degrees.

The grille guard 1905 can include at least one member 1960. For example, the grille guard 1905 can include a first member 1960 on a passenger side of the vehicle 100. The grille guard 1905 can include a second member 1960 on a driver side of the vehicle 100. The first member 1960 can be coupled to the first stadium shaped member 1915. The second member 1960 can be coupled to the second stadium shaped member 1915. The first member 1960 can extend from the first member 1935 or the first member 1940 to the first stadium shaped member 1915. The second member 1960 can extend from the second member 1935 or the second member 1940 to the second stadium shaped member 1915. The member 1960 can be parallel to the member 1945 or the vertical portions of the member 1910. The member 1960 can be perpendicular to the member 1935, the parallel portion 1910, the member 1920, the member 1925, the member 1930, the member 1950, or the member 1955.

The portion 1950, the portion 1955, or the portion 1940 can wrap or curve around a front side, corner, or end of the vehicle 100. For example, on a passenger side of the vehicle 100, the portion 1950, the portion 1955, or the portion 1940 can wrap around an end of the vehicle 100 towards a passenger side or passenger side door of the vehicle 100. For example, on a driver side of the vehicle 100, the portion 1950, the portion 1955, or the portion 1940 can wrap around an end of the vehicle 100 towards a driver side or driver side door of the vehicle 100. The portion 1950, the portion 1955, or the portion 1940 can extend from the stadium shaped member 1915 and curve towards around the front end or surface of the vehicle 100.

Figure 22:
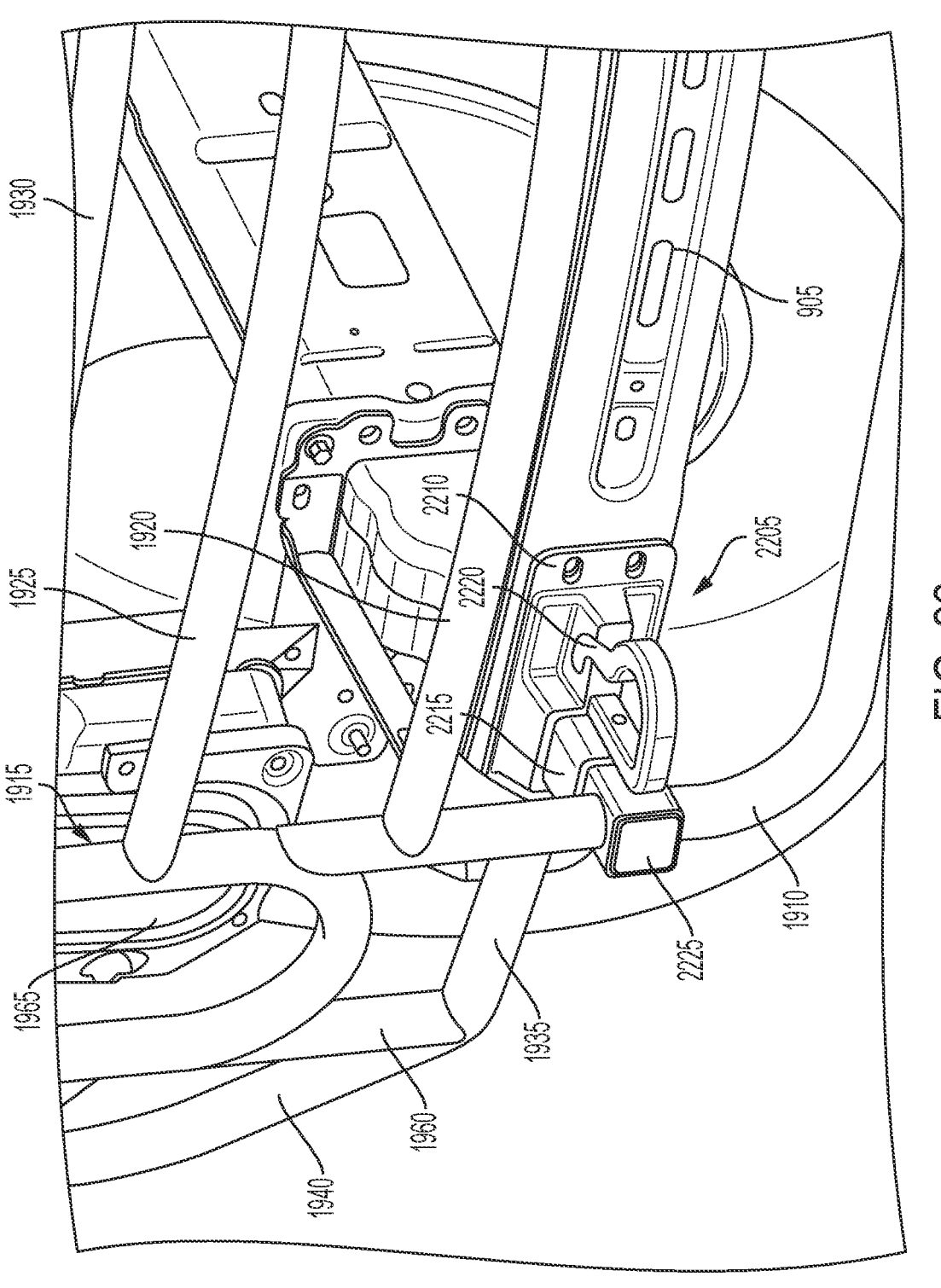
FIG. 22 depicts another example vehicle including an apparatus to couple a grille guard to a frame of the vehicle.

FIG. 22 depicts another example vehicle 100 including an apparatus 2205 to couple a grille guard 1905 to a frame 905 of the vehicle 100. The apparatus 2205 can be an apparatus, system, component, or device. The apparatus 2205 can be a component of the vehicle 100. The apparatus 2205 can be a component of the grille guard 1905. The apparatus 2205 can be a component of both the vehicle 100 and the grille guard 1905. The apparatus 2205 can include a plate 2210. The plate 2210 can be a plate, bracket, component, or device. The plate 2210 can be coupled to the frame 905. For example, the plate 2210 can be coupled to a cross member or bumper member of the frame 905.

The plate 2210 can be coupled, fixed, connected, contacted to, fixedly coupled, to the frame 905. For example, the plate 2210 can be coupled to the frame 905 via at least one bolt, nut, washer, screw, snap. The plate 2210 can include at least one opening. The openings can be circular openings, oval shaped openings, stadium shaped openings, rectangular shaped openings, square shaped openings. The openings can allow a bolt to be inserted through the plate 2210 into openings in the frame 905. Via the bolt inserted through the openings, the plate 2210 can be coupled to the frame 905. The plate 2210 can be a permanent component of the vehicle 100. For example, the plate 2210 can be coupled to the vehicle 100 regardless of whether the grille guard 1905 is coupled to the vehicle 100. For example, the plate 2210 can be left connected to the frame 905 regardless of whether the grille guard 1905 is coupled to the plate 2210.

Components 2215 and 2220 can be coupled to the plate 2210. The component 2215 can be inserted into an opening or cavity of the plate 2210. For example, the plate 2210 can include a raised portion forming a rectangular solid shaped opening or cavity, a cube shaped opening or cavity. The component 2215 can be a member that inserted into the cavity of the plate 2210. The component 2215 can fix or couple to the component 2210. For example, the component 2215 can be coupled to the plate 2210 via a nut, bolt, snap, connector, weld, or other component. The component 2220 can be a handle. The component 2220 can be coupled to, or integrally formed with, the component 2215. The component 2220 can be handle shaped and can integrally formed or connected to the plate 2210. The component 2220 can spring or flex responsive to a pressure applied to the grille guard 1905. The component 2220 can be fixed or coupled to the component 2215 or a component 2225.

For example, the component 2225 can be coupled to the member 1910. The component 2225 can be coupled to the component 2215. For example, the component 2225 and the component 2215 can telescope. For example, the component 2225 can have a beam shape and can insert into an opening of the component 2215. For example, the component 2225 can be a rectangular solid. An end of the component 2225 can be square shaped. The component 2225 can be inserted into a square or rectangle shaped opening of the component 2215. The component 2225 can be inserted into a cube or rectangular solid shaped cavity. A bolt, screw, nut, nail, or other component can couple the component 2225, the component 2215, and the component 2220. For example, the component 2220, the component 2215, and the component 2225 can include holes or openings that can have longitudinal axis perpendicular to a longitudinal axis of the member 22215. If the openings of the component 2220, the component 2215, and the component 2225 are aligned, e.g., the longitudinal axis of the component 2220, the component 2215, and the component 2225 are aligned, a component can be inserted through the openings and remain in the openings. The component can fix or couple the component 2220, the component 2215, and the component 2225.

Figure 23:
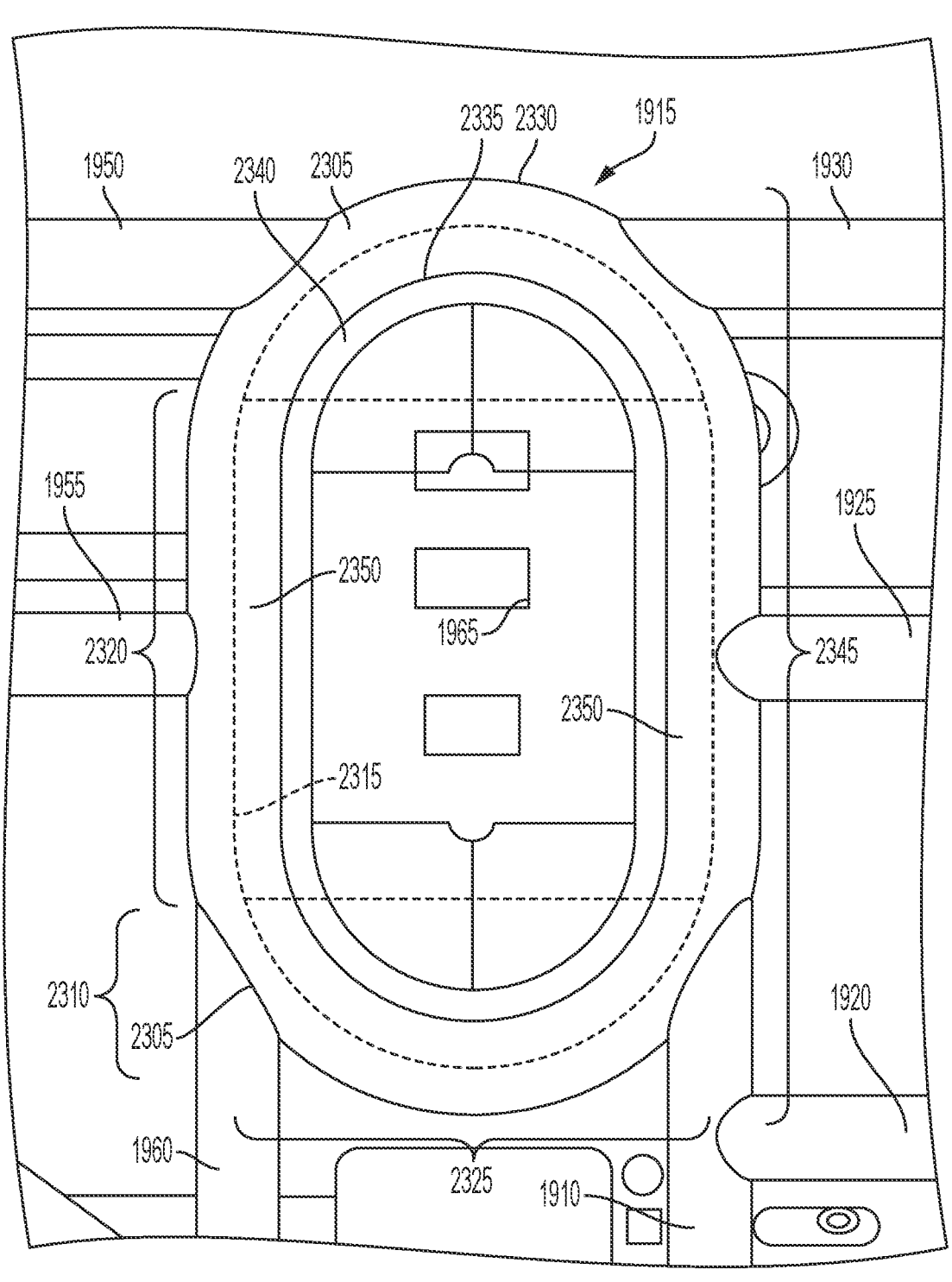
FIG. 23 depicts a grille guard of a vehicle including a member with a stadium shape.

FIG. 23 depicts a grille guard 1905 of a vehicle 100 that has a member 1915 with a stadium shape. The stadium shaped member 1915 can include at least one curved portion 2305. For example, the stadium shaped member 1915 can include a top curved portion 2305 and a bottom curved portion 2305. The curved portions 2305 can be half circles, arcs, portions of ovals. The curved portions 2305 can have or be defined by a radius 2310. The radius 2310 can be five to ten inches. The radius 2310 can be four to eleven inches. The radius 2310 can be less than five inches. The radius 2310 can be greater than eleven inches. The member 1960 and the member 1910 can be coupled to the bottom curved portion 2305. The member 1950 and the member 1930 can be coupled to the top curved portion 2305.

The stadium shaped member 1915 can include lateral portions 2350. The lateral portions 2350 can be defined based on rectangular shape 2315 between the upper curved portion 2305 and the lower curved portion 2305. The rectangular shape 2315 can include a length 2320 and a width 2325. The width 2325 can be twice the radius 2310. The length 2320 can be ten to twelve inches long. The length 2320 can be nine to thirteen inches long. The length 2320 can be less than nine inches long. The length 2320 can be greater than thirteen inches long. The stadium shaped member 1915 can have a length 2345. The length 2345 can be a greatest length between the upper curved portion 2305 and the lower curved portion 2305. The length 2345 can be the length 2320 plus double the radius 2310. The length 2345 can be ten to fifteen inches. The length 2345 can be eight to seventeen inches. The length 2345 can be less than eight inches. The length 2345 can be greater than seventeen inches.

The stadium shaped member 1915 can include a first lateral portion 2350. The stadium shaped member 1915 can include a second lateral portion 2350. The first lateral portion 2350 and the second lateral portion 2350 can be parallel. The first lateral portion 2350 can be coupled to the lower curved portion 2305 and the upper curved portion 2305. The first lateral portion 2350 can extend from the lower portion 2305 to the upper portion 2305. The member 1955 can be coupled to the first lateral portion 2350. The member 1955 can extend from, or extend to, the lateral portion 2350. The member 1955 can extend from, or extend to, a midpoint of the first lateral member 2350. The midpoint of the first lateral member 2350 can be a point on the lateral portion 2350 equally between the upper curved portion 2305 and the lower curved portion 2305.

The second lateral portion 2350 can be coupled to the lower curved portion 2305 and the upper curved portion 2305. The first lateral portion 2350 can extend from the lower portion 2305 to the upper portion 2305. The member 1925 can be coupled to the second lateral portion 2350. The member 1925 can extend from, or extend to, the second lateral portion 2350. The member 1925 can extend from, or extend to, a midpoint of the second lateral member 2350, e.g., equally between the upper curved portion 2305 and the lower curved portion 2305.

The stadium shaped member 1915 can have an inner boundary 2335 and an outer boundary 2330. The stadium shaped member 1915 can be a tube, beam, rectangular solid, or pipe bent or cast into a stadium shape. The inner boundary 2335 can be or define a boundary, edge, section, or area that defines an inner most portion of the stadium shape. The outer boundary 2335 can be or define a boundary, edge, section, or area that defines an outer most portion of the stadium shape. The stadium shaped member 1915 can have a constant or varying width between the inner boundary 2335 and the outer boundary 2335. The width can be one to two inches. The width can be half an inch to two and a half inches. The width can be less than half an inch. The width can be greater than two and a half inches.

The headlight 1965 can include an outer boundary 2340. The boundary 2340 can be or define a boundary, edge, section, or area that defines an outer most portion of the stadium shape. The outer boundary 2340 of the headlight 1965 can be coplanar with the inner boundary 2335. The outer boundary of the headlight 1965 and the inner boundary 2335 of the stadium shaped member 1915 can be aligned. The outer boundary of the headlight 1965 can be completely or partially contained, included, disposed, or positioned within the inner boundary 2335 of the stadium shaped member 1915. The boundary 2330 or the boundary 2335 of the member 1915 can completely or partially circumscribe the boundary 2340 of the headlight 1965.

A distance between the inner boundary 2335 of the stadium shaped member 1915 and the outer boundary of the headlight 1965 can be defined by a line (or a shortest line) between the inner boundary 2335 of the stadium shaped member 1915 and the outer boundary 2340 of the headlight 1965 that is perpendicular with both the outer boundary 2340 of the headlight 1965 and the inner boundary 2335 of the stadium shaped member 1915. A distance between the outer boundary of the headlight 1965 and the inner boundary 2335 of the stadium shaped member can be fixed or constant. A distance between the outer boundary of the headlight 1965 and the inner boundary 2335 of the stadium shaped member can be varying or changing.

A stadium shape can be a geometric shape. A stadium shape can be constructed of a square or rectangle with semicircles at a pair of opposite sides. The semicircles can have the same radius. A stadium shape can be a pill shape, a discorectangle, a squectangle, or an obround. The stadium shape of the members 1915 can be a first size (e.g., a rectangle with a first length and a first width and half circles with a first radius). The stadium shape of the lights 1965 can be a second size (e.g., a rectangle with a second length and second width and half circles with a second radius). The size of the stadium shape of the lights 1965 can be smaller than the stadium shape of the members 1915. Because the size of the stadium shape of the lights 1965 is smaller than the stadium shape of the members 1915, and the stadium shape of the members 1915 can circumscribe the stadium shape of the lights 1965, light generated by the lights 1965 can pass through the stadium shape of the members 1915.

Figure 24:
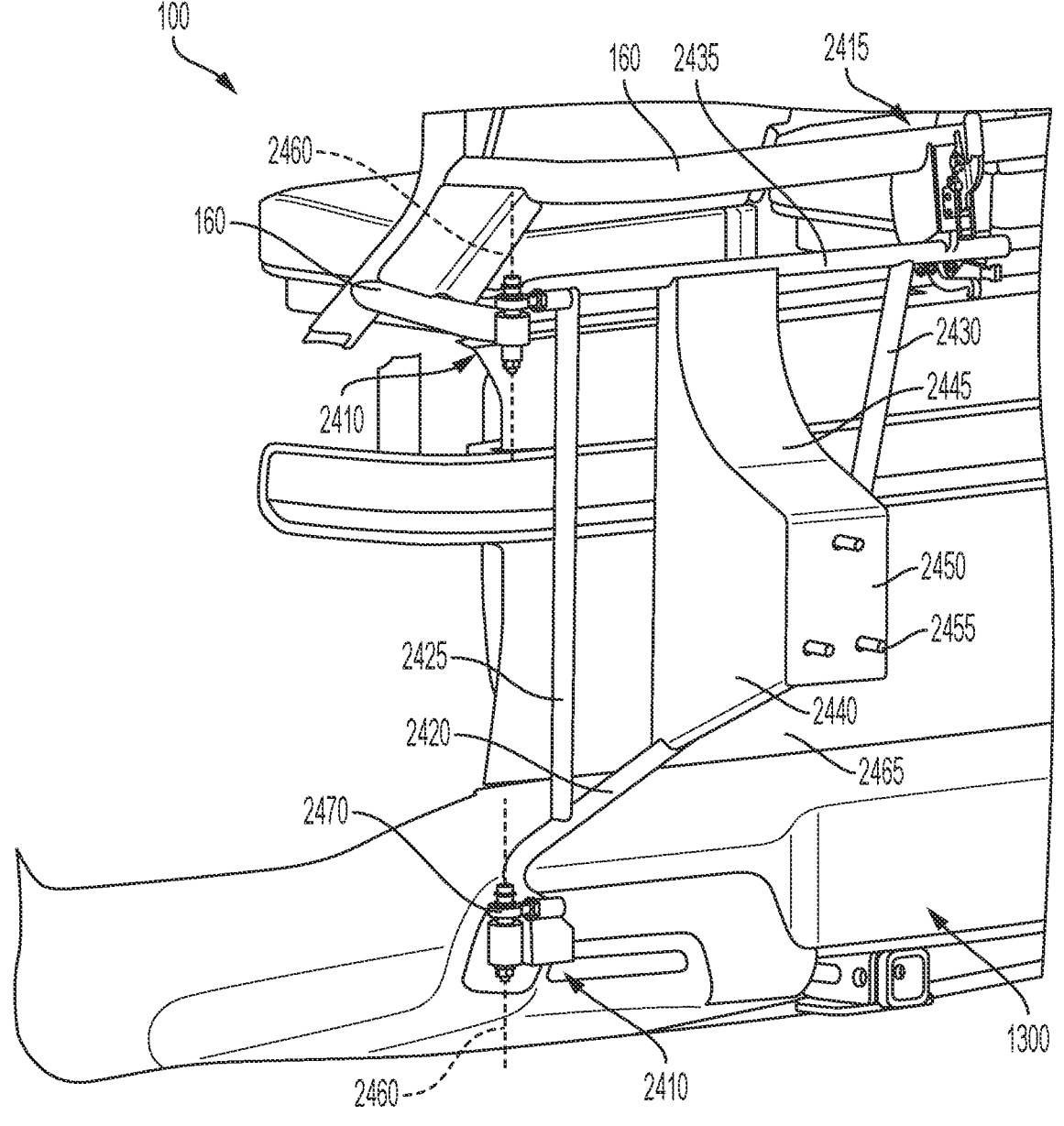
FIGS. 24-25 depict an example vehicle including a tire carrier.
Figure 25:
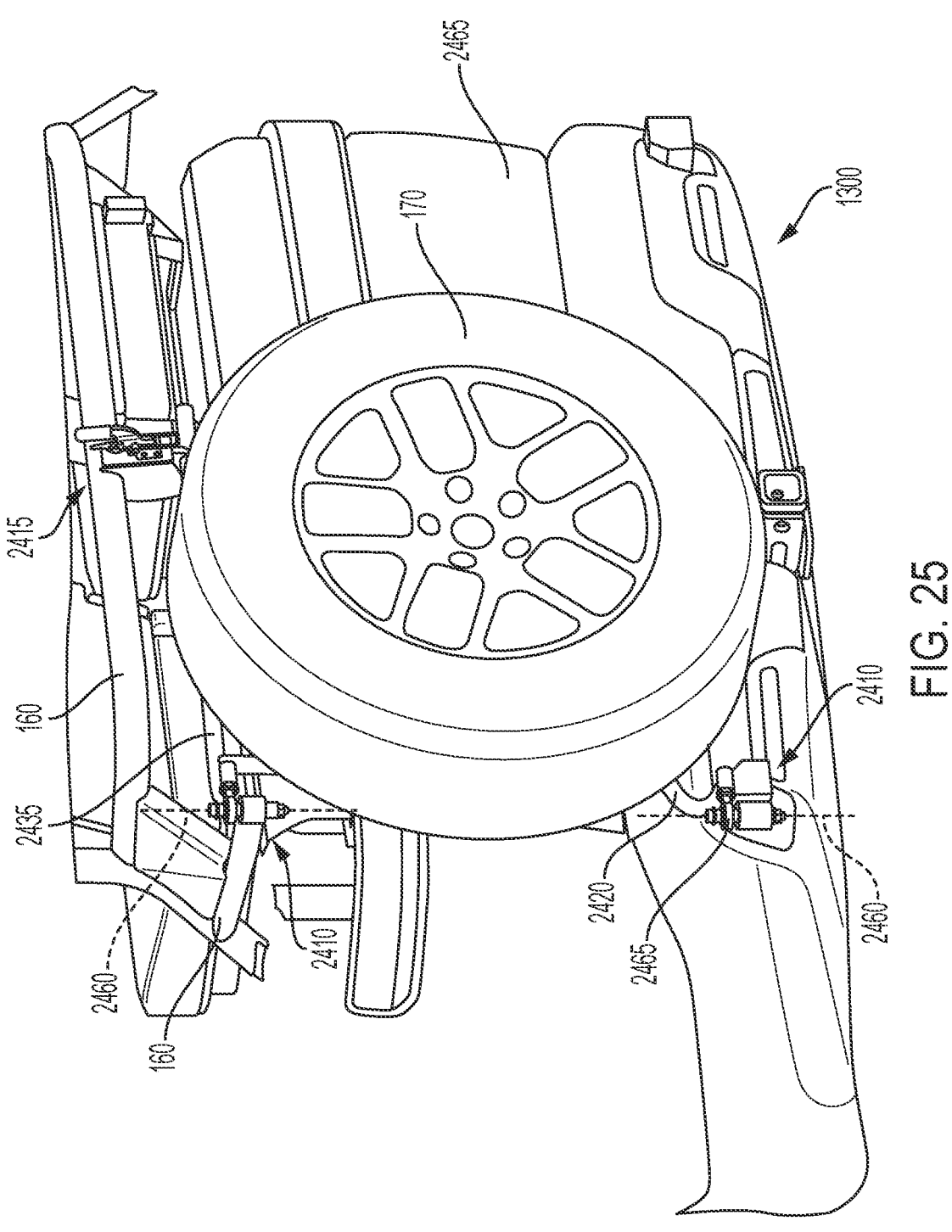

FIGS. 24-25 depict a vehicle 100 including at least one tire carrier 1300. The tire carrier 1300 can be an apparatus, a device, a system, a component, a set of components, a set of devices. The vehicle 100 can include one, two, three, or more tire carriers 1300. For example, the vehicle 100 can include a first tire carrier 1300 and a second tire carrier 1300. The tire carriers 1300 can be stored so that the tire carrier 1300 is flat respective to, parallel with, or stowed against, a rear tailgate 2465 of the vehicle 100, a back or front bumper of the vehicle 100, a back wall of the vehicle 100. For example, a longitudinal axis of the tire 170 can be perpendicular with the rear tailgate 2465 of the vehicle 100 or the back or front bumper of the vehicle 100 when the tire carrier 1300 is in a stowed position. The tire carrier 1300 can rotate the tire 170 to an open position. In the open position, the longitudinal axis of the tire 170 may be parallel with the rear tailgate 2465 of the vehicle 100, the back bumper of the vehicle 100, or the front bumper of the vehicle 100.

The tire carrier 1300 can be fixed to the vehicle 100 on a driver side of the vehicle 100. The tire carrier 1300 can rotate the tire 170 around the point where the tire carrier is fixed to the vehicle 100, thereby rotating the tire 170 towards the driver side of the vehicle 100. The tire carrier 1300 can be fixed to the vehicle 100 on a passenger side of the vehicle 100. The tire carrier 1300 can rotate the tire 170 around the point where the tire carrier 1300 is fixed to the vehicle 100, thereby rotating the tire 170 towards the passenger side of the vehicle 100. The vehicle 100 can include a tire carrier 1300 fixed to a driver side of the vehicle 100 and a second tire carrier 1300 that is fixed to a passenger side of the vehicle 100. The tire carries 2405 can rotate the tires 170 supported by the tire carries 2405 away from one each other from stowed positions to open positions. For example, the first tire carrier 1300 can rotate the tire 170 towards a driver side of the vehicle 100 and the second tire carrier 1300 can rotate the tire 170 towards a passenger side of the vehicle 100. When the tire carriers 1300 moves the tires 170 from the open positions to the stowed positions, the tire carriers 1300 can rotate the tires 170 towards each other, e.g., towards a center of the vehicle 100, towards a center of the rear tailgate 2465 of the vehicle 100, towards a center of the bumper of the vehicle 100.

The tire carrier 1300 can include at least one hinge 2410. The tire carrier 1300 can include a first hinge 2410 and a second hinge 2410. The hinges 2410 can be stacked over each other. For example, the hinges 2410 can be stacked over each other on a line perpendicular with a floor of the vehicle 100, with a surface under the vehicle 100, with a ceiling of the vehicle 100, with a bed of the vehicle 100. An upper hinge 2410 can be fixed to a support 160. The support can be positioned above a top of a tailgate 2465 of the vehicle 100. The upper hinge 2410 can be supported by the support 160, which can be supported by the frame 905. The upper hinge 2410 can be coupled to the frame 905 (e.g., through the support 160). The lower hinge 2410 can be coupled to the frame 905. The lower hinge 2410 can be coupled to a rear bumper of the vehicle 100. The rear bumper of the vehicle 100 can be coupled to the frame 905. The lower hinge 2410 can be supported by the frame 905 (e.g., through the rear bumper of the vehicle 100).

The tire carrier 1300 can include one or more members 2420-2435. The members 2420-2435 can be beams, pipes, tubes, sections, or portions. The tire carrier 1300 can be integrally formed from the members 2420-2435. The tire carrier 1300 can be formed from separate members 2420-2435 that are connected to each other. The members 2420-2435 can be connected with a bolt, snap, weld, nut, bolt, or connector. The members 2420-2435 can be telescoping members. The members 2420-2435 can be formed from steel, aluminum, carbon fiber, copper, or a combination thereof.

The member 2410 can be coupled to the bottom hinge 2410. The bottom hinge 2410 can have a cylindrical body. The cylindrical body can be coupled to the vehicle 100. The bottom hinge 2410 can include a member, a shaft, a bolt, that fits through the cylindrical body of the hinge 2410. The member can fit through an opening or cavity along a longitudinal axis 2460 of the cylindrical body. A ring or eyelet 2470 can be fixed to the cylindrical body by the member. The ring 2470 can rotate on at least one bearing or rotating device around the longitudinal axis 2460 of the hinge 2410. An end of the member 2420 can be coupled to the ring 2470. The member 2420 can rotate, via the ring 2470, around the longitudinal axis 2460 of the hinge 2410 between the open and stowed positions. The upper hinge 2410 and the lower hinge 2410 can each have the same longitudinal axis 2460. The member 2420 can rotate about the longitudinal axis 2460 the upper hinge 2410 or the lower hinge 2410 of the longitudinal axis 2460.

The bottom hinge 2410 can include a plate. When the member 2410 rotates to the stowed position, the member 2420 can come into contact with the plate. The plate can stop or limit movement of the member 2420. The member 240 can prevent the member 2420, or other members of the tire carrier 1300 from contacting or touching the vehicle 100 (e.g., the bumper or tailgate 2465 of the vehicle 100). For example, the plate can stop or prevent the member 2420 from contacting the bumper of the vehicle 100.

The member 2420 can extend from the bottom hinge 2410 to a plate 2440 or the member 2430. The member 2430 can extend at an oblique angle relative to the longitudinal axis 2460 of the hinges 2410, the longitudinal axis of tires 170 of the vehicle 100 or tire 170 mounted to the tire carrier 1300. The member 2420 can extend two to three feet. The member 2420 can extend one and a half to three and a half feet. The member 2420 can extend less than one and a half feet. The member 2420 can extend more than three and a half feet.

A member 2425 can extend from the member 2420 at an oblique angle relative to the member 2420. The member 2425 can extend from the member 2420 in a direction parallel with the longitudinal axis 2460 of the hinges 2410. The member 2425 can extend in a direction perpendicular to a longitudinal axis of a tire 170 coupled to the vehicle 100 or coupled to the tire carrier 1300. The member 2425 can extend from the member 2420 to the member 2435. The member 2435 and the member 2425 can be perpendicular. The member 2425 an be coupled to the upper hinge 2410. The member 2425 can extend from the hinge 2410 to an end. The member 2425 can extend past a latch 2415. The latch 2415 can be positioned between upper hinge 2410 and an end of the member 2435.

The latch 2415 can be an apparatus, a device, a connector, a system, a lock, a catch. The latch 2415 can be coupled, fixed, or connected to a support 160. The support 160 can be parallel with the member 2435. The latch 2415 can lock or unlock the member 2435 or the tire carrier 1300. The latch 2415 can latch or unlatch the member 2435 or the tire carrier 1300. The latch 2415 can fasten or unfasten the member 2435 or the tire carrier 1300. The latch 2415 can couple or decouple from the member 2435 or the tire carrier 1300. The latch 2415 can couple with the member 2435 to prevent or limit movement or rotation of the tire carrier 1300 about the hinges 2410 (or about the longitudinal axis 2460 of the hinges 2410). When the latch 2415 is secured, latched, locked, or fastened, the member 2435 may not move freely, e.g., the latch 2415 may limit or prevent movement of the member 2435. When the latch 2415 is unsecured, unlatched, unlocked, or unsecured, the member 2435 may move freely, e.g., the latch 2415 may not limit or prevent movement of the member 2435 and the member 2435 may move freely.

The member 2435 can be coupled with a member 2430. The member 2430 can extend at an oblique or acute angle from the member 2435. The member 2430 can extend from the member 2435 to the member 2420, the plate 2440, or the plate 2450. The tire carrier 1300 can include a curved plate 2445 and a flat plate 2450. The curved plate 2445 can extend from the member 2453 to the flat plate 2450. The curved plate 2445 can include a concave shape. The curved plate 2445 can include a ramp shape. The curved plate 2445 can extend perpendicular from the member 2435 towards a bumper of the vehicle 100 or a surface under the vehicle 100. The curved plate 2445 can curve to an end where the curved plate 2445 is perpendicular to the member 2435.

The plate 2450 can extend from the end of the curved plate 2445. The plate 2450 can extend perpendicular to the end of the plate 2445. The plate 2450 can extend parallel with the length of the member 2425. The plate 2450 can extend perpendicular to a length of the member 2435. The plate 2450 can include one or multiple shafts 2455. The shafts 2455 can be bolts, pipes, cylindrical shaped portions, threaded components. The plate 2450 can include one, two, three, or any number of shafts 2455. The shafts 2455 can be positioned on points of an octagonal shape. The octagonal shape can be the same size or shape as a second octagonal shape. The second octagonal shape can be defined by holes of the tires 170 used to couple the tires 170 to a rotor, wheel hub, or other connector of the vehicle 100. The holes can define corners of the second octagonal shape.

The shafts 2455, the plate 2450, the plate 2445, or the plate 2440 can be a connector or connecting components that couple with a tire 170. The tire carrier 1300 can rotate, move, or swing the connector or connecting component on the hinges 2410 between stowed and open positions. The connector or connecting component can couple with a tire 170 and the tire carrier 1300 can rotate the tire 170 via the hinges 2410.

Figure 26:
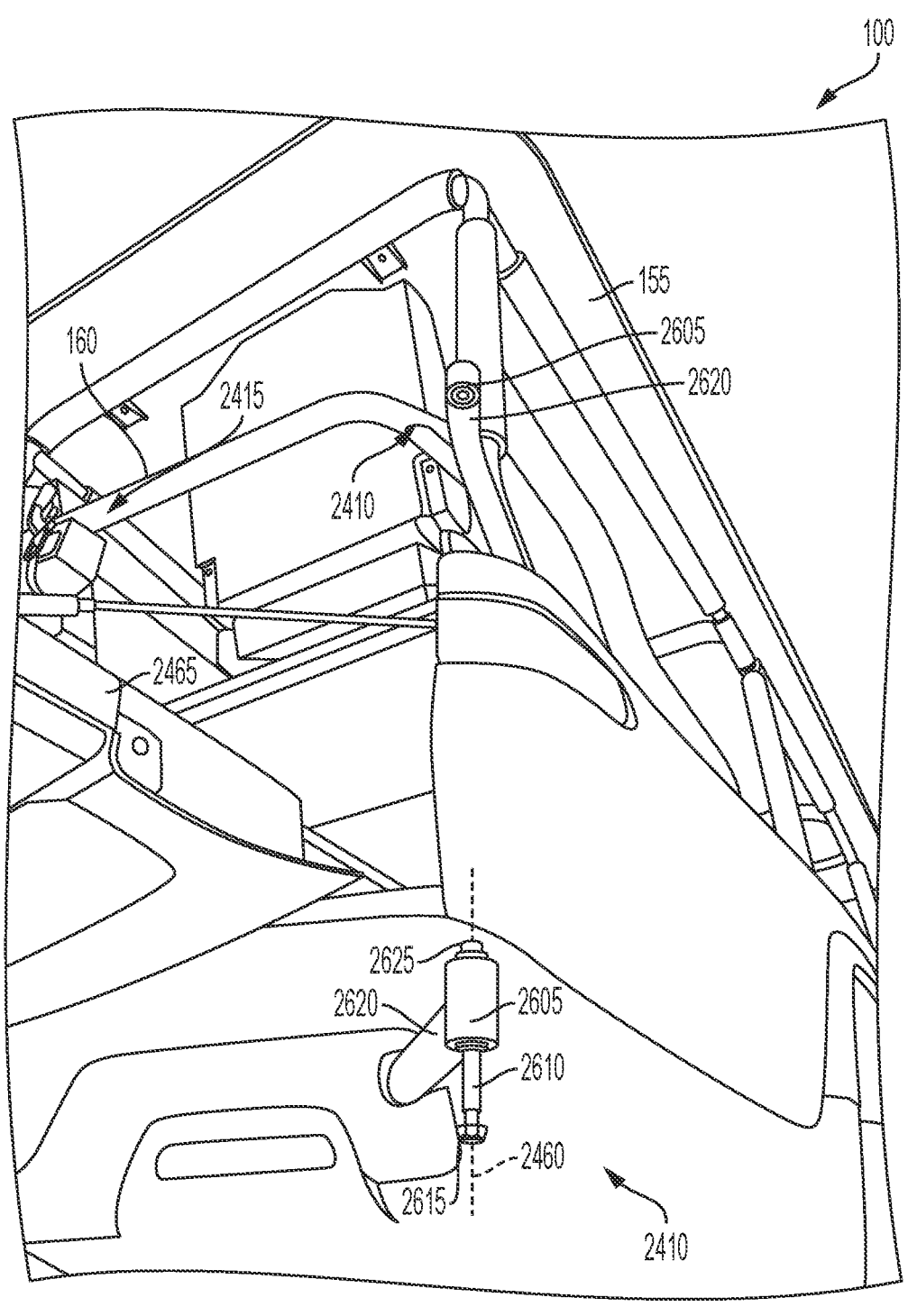

FIG. 26 depicts a vehicle 100 including hinges 2410 that the tire carrier 1300 couples with. The hinges 2410 can include a body 2605. The body 2605 can be cylindrical shaped. The body 2605 can include a cylindrical shaped cavity, opening, or space within the body 2605. The body 2605 can include the longitudinal axis 2460. The longitudinal axis 2460 can be perpendicular with a surface under the vehicle 100. The longitudinal axis 2460 can be perpendicular with a surface of the canopy 155. The longitudinal axis 2460 can be perpendicular with longitudinal axis of the tires 170 coupled with the vehicle 100 or coupled to the tire carrier 1300.

A member 2620 can extend from the vehicle 100. The body 2605 can be coupled to the member 2620. The body 2605 can be coupled to an end of the member 2620 extended away from the vehicle 100. The member 2620 can be pipe shaped, cylindrical shaped, tube shaped. The member 2620 can be steel, aluminum, carbon fiber, copper, or a combination thereof. The member 2620 can be fixed, coupled, attached, or connected to the frame 905 of the vehicle 100. The member 2620 can extend in a direction perpendicular to the longitudinal axis 2460 of the body 2605.

The member 2620 can extend from a rear corner of the vehicle 100. An angle formed between the member 2620 and the rear bumper, tailgate 2465, or back side of the vehicle 100 can be greater than ninety degrees. The angle can be one hundred to one hundred and twenty degrees. The angle can be ninety five degrees to one hundred and twenty five degrees. The angle can be less than ninety five degrees. The angle can be more than one hundred and twenty five degrees. The member 2620 can extend from a rear corner of the vehicle 100. An angle formed between the member 2620 can the passenger side of the vehicle 100 can be greater than ninety degrees. The angle can be one hundred to one hundred and twenty degrees. The angle can be ninety five degrees to one hundred and twenty five degrees. The angle can be less than ninety five degrees. The angle can be more than one hundred and twenty five degrees.

The hinge 2410 can include a rod, bar, bolt, or shaft 2610. The shaft 2610 can be a cylindrical shaped component. The shaft 2610 can include ends. At least one end of the shaft 2610 can be threaded. The shaft 2610 can be inserted into the cavity of the body 2605. The shaft 2610 can be inserted along the longitudinal axis 2460 of the body 2605. The shaft 2610 can include an end, bolt, washer, or other component 2625 on a top end of the shaft 2610. The component on the top end of the shaft 2610 can have a width or diameter greater than a width or diameter of the opening of the body 2605. The component can stop the shaft 2610 from falling through the body 2605. The component 2625 can be integrally formed with the end of the shaft 2610. The component 2625 can be coupled or fixed to the end of the component 2810. For example, the component 2625 can screw onto threads of the upper end of the shaft 2610.

The shaft 2610 can include a component 2615 coupled or fixed to the bottom end of the shaft 2610. The component 2615 can be removed or coupled from the bottom end of the shaft 2610. The component 2615 can be a nut, washer, connector, or other component. The component 2615 can screw onto threads on the bottom end of the shaft 2610. The component 2615 can be removed from the shaft 2610, and the bottom end can be inserted through the ring 2470 of the member 2420, an upper opening of the body 2605, and out a lower opening of the body 2605. After the shaft 2610 is inserted through the body 2605, the component 2615 can be coupled to the bottom end of the shaft 2610 to prevent or limit movement of the shaft 2610, for example, prevent the shaft 2610 from completely coming out of the body 2605.

Figure 27:
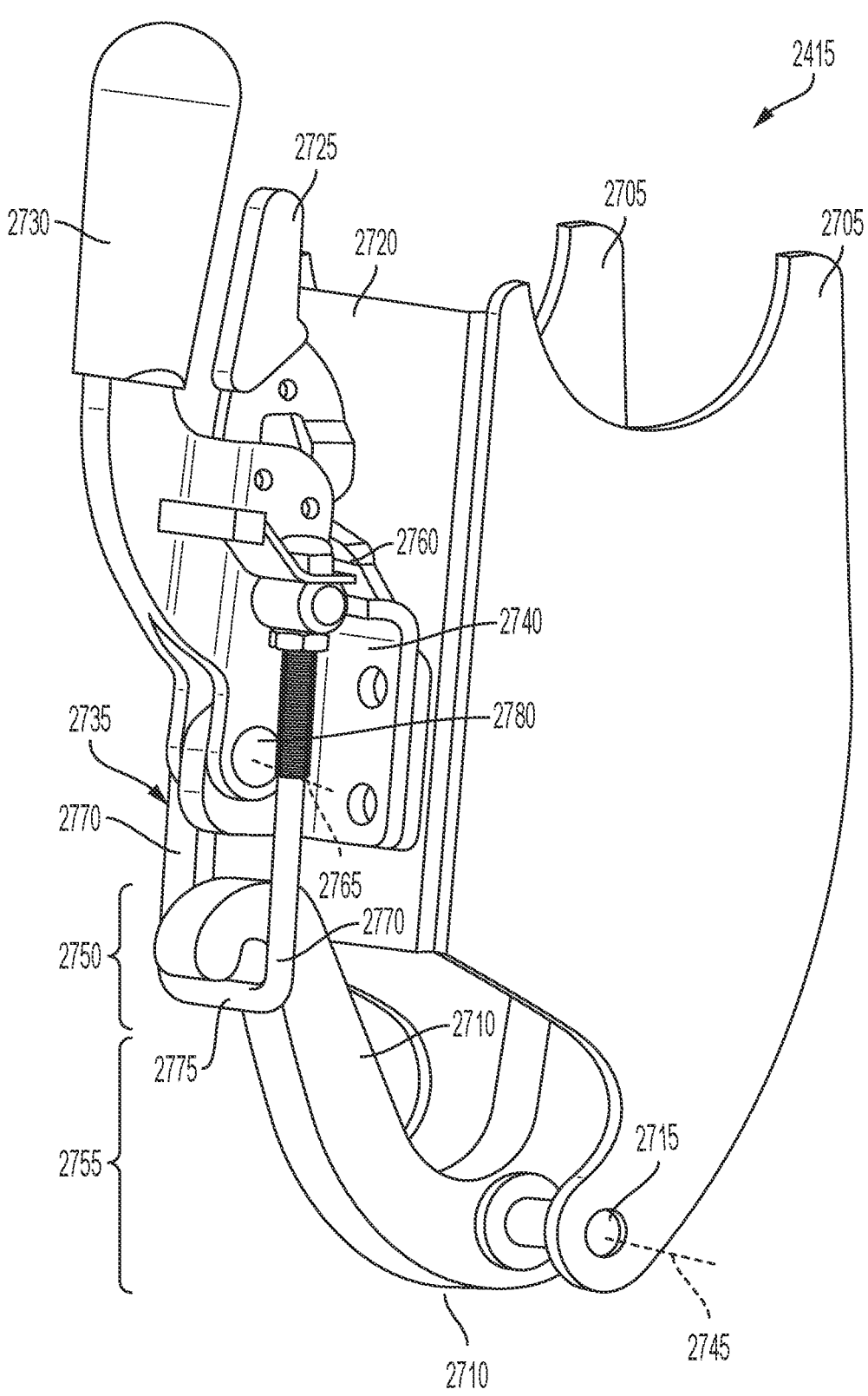
FIGS. 27-28 depict an example latch for a tire carrier of a vehicle.
Figure 28:
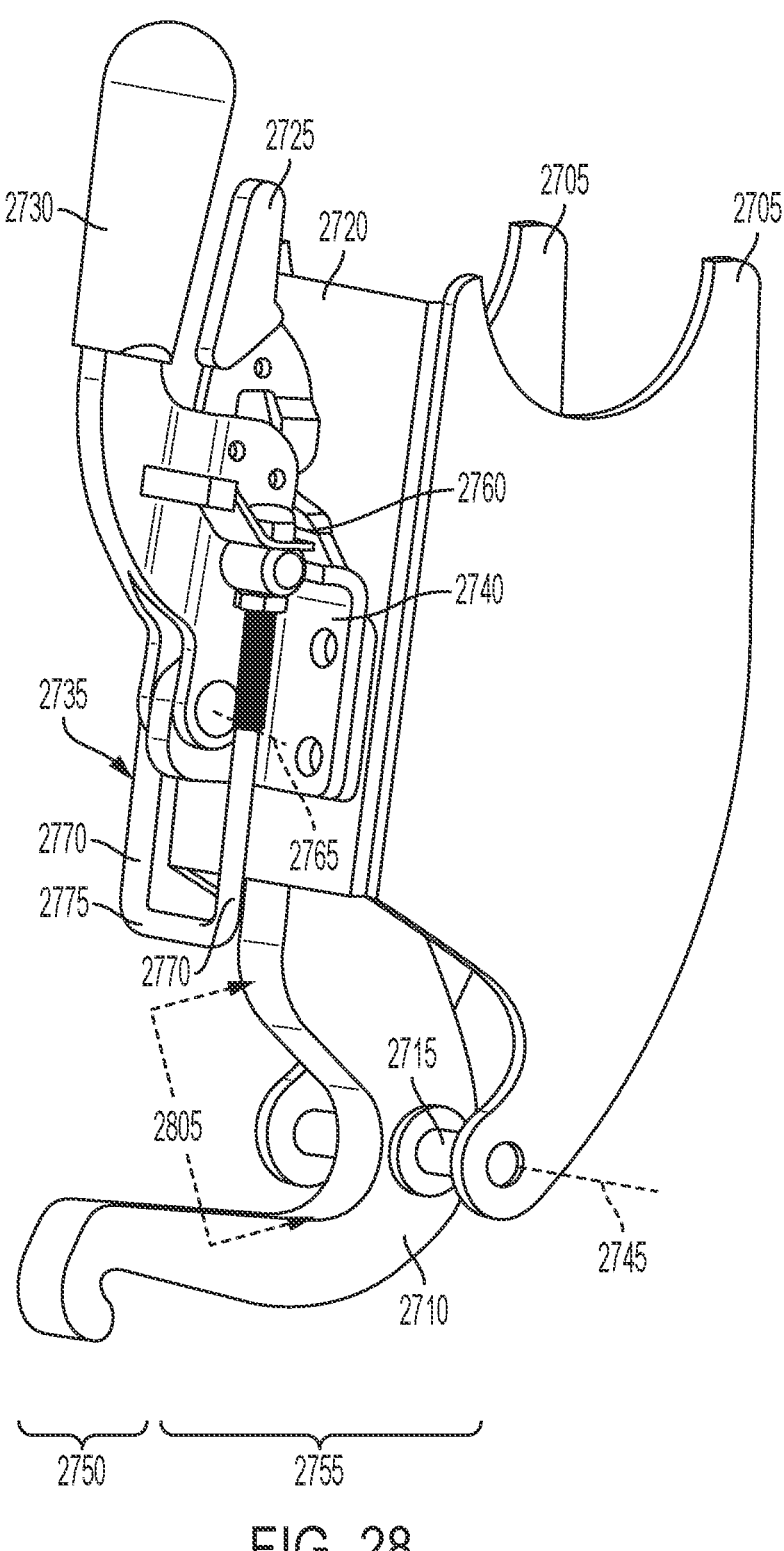

FIGS. 27-28 depict an example latch 2415 for the tire carrier 1300 of the vehicle 100. The latch 2415 can include two plates 2705. The surfaces of the two plates 2705 can be parallel with each other. The plates 2705 can be separated by a distance. The distance can be three to four inches. The distance can be two to five inches. The distance can be less than two inches. The distance can be greater than five inches. The plates 2705 can be coupled via a plate 2720. The plate 2720 can extend from an edge of one plate 2705 to another plate 2705. The plate 2720 can be rectangular shaped, such as a rectangular solid. The plates 2705 and the plate 2720 can be separate pieces or integrally formed.

The plates 2705 can include cutouts on a top side of the plates 2705. The cutouts can be circular shaped. For example, the cutouts can be shaped like half circles. The cutouts can be shaped like portions of ovals. The cutouts can conform to a shape of the support 160. The support 160 can be inserted into the cutouts and coupled to the plates 2705 via the cutouts. The support 160 and the cutouts of the plates 2705 can be welded, adhered, coupled via bolts or brackets.

The latch 2415 can include at least one hook 2710. The hook 2710 can be disposed between plates 2705. The hook 2710 can be coupled to the plates 2705 via a pin 2715. The pin 2715 can extend from the first plate 2705, through an opening in the hook 2710, to the second plate 2705. The pin 2715 can extend through an opening on a first side the first plate 2705, through an opening in the hook 2710, and an opening on an inner side of the second plate 2705. The hook 2710 can rotate about a longitudinal axis 2745 of the pin 2715. The hook 2710 can include a first section 2750 and a second section 2755. The first section can be curved. In the latched position, the curve of the first section 2750 can curve around at least a portion of a component 2735, e.g., the portion 2775. The second section 2755 can extend from the first section 2750. The second section 2755 and the first section 2735 can be an s-shape. The first section 2735 and the second section 2755 can be separate components or integrally formed.

The latch 2415 can include a handle 2730. The handle 2730 can be locked or unlocked by a handle 2725. The handle 2725 can move between positions. In a first position, the handle 2725 can limit or prevent the handle 2730 from moving. In a second position, when the handle 2725 is pulled towards the handle 2730, the handle 2730 can be unlocked and the handle 2725 may not limit movement of the handle 2730. The handle 2725 can be fixed to a bracket 2760. The bracket 2760 can be coupled, fixed, or attached to a surface of the plate 2720. The latch 2415 can include a bracket 2740. The bracket 2740 can be coupled, fixed, or attached to a surface of the bracket 2760. The bracket 2740 can include a pin 2780 inserted through the handle 2730. The handle can rotate about a longitudinal axis 2765 of the pin 2780. The bracket 2760 can include a pin that inserts through the handle 2725. The handle 2725 can rotate about a longitudinal axis of the pin.

The handle 2730 can move the component 2735. The handle 2730 can move the component from a first position securing the hook 2710 to a second position allowing the hook 2710 to move or move freely. The component 2735 can be a rectangular shape. The component 2735 can include two arms 2770 that extend parallel from the handle 2730 to ends. The ends can be coupled via portion 2775 of the component 2735 extending between the two ends, perpendicular to the direction that the two arms 2770 extend from the handle 2730. The upper ends of the arms 2770 can be threaded and can adjusted at least one nut or other threaded component of the handle 2730. The nut or threaded component of the handle 2730 can control the distance that the arms 2770 extend.

In FIG. 27, the hook 2710 is shown in the fixed position. The member 2435 can be stowed by the portion 2755 of the hook 2710. The cylindrical shape of the member 2435 can fit or couple within the curved portion 2755. The curved portion 2755 can limit the movement of the member 2435 and prevent the tire carrier 1300 from opening. In FIG. 28, the hook 2710 is shown in the open position. In the open position, the member 2435 can move. For example, the member 2435 can rotate on the hinges 2410. When the member 2435 rotates on the hinges 2410, the member 2435 can make contact with a surface 2805. The member 2435 can push against the surface 2805 of the hook 2710 causing the hook 2710 to rotate on the pin 2715 to the fixed position.

Figure 29:
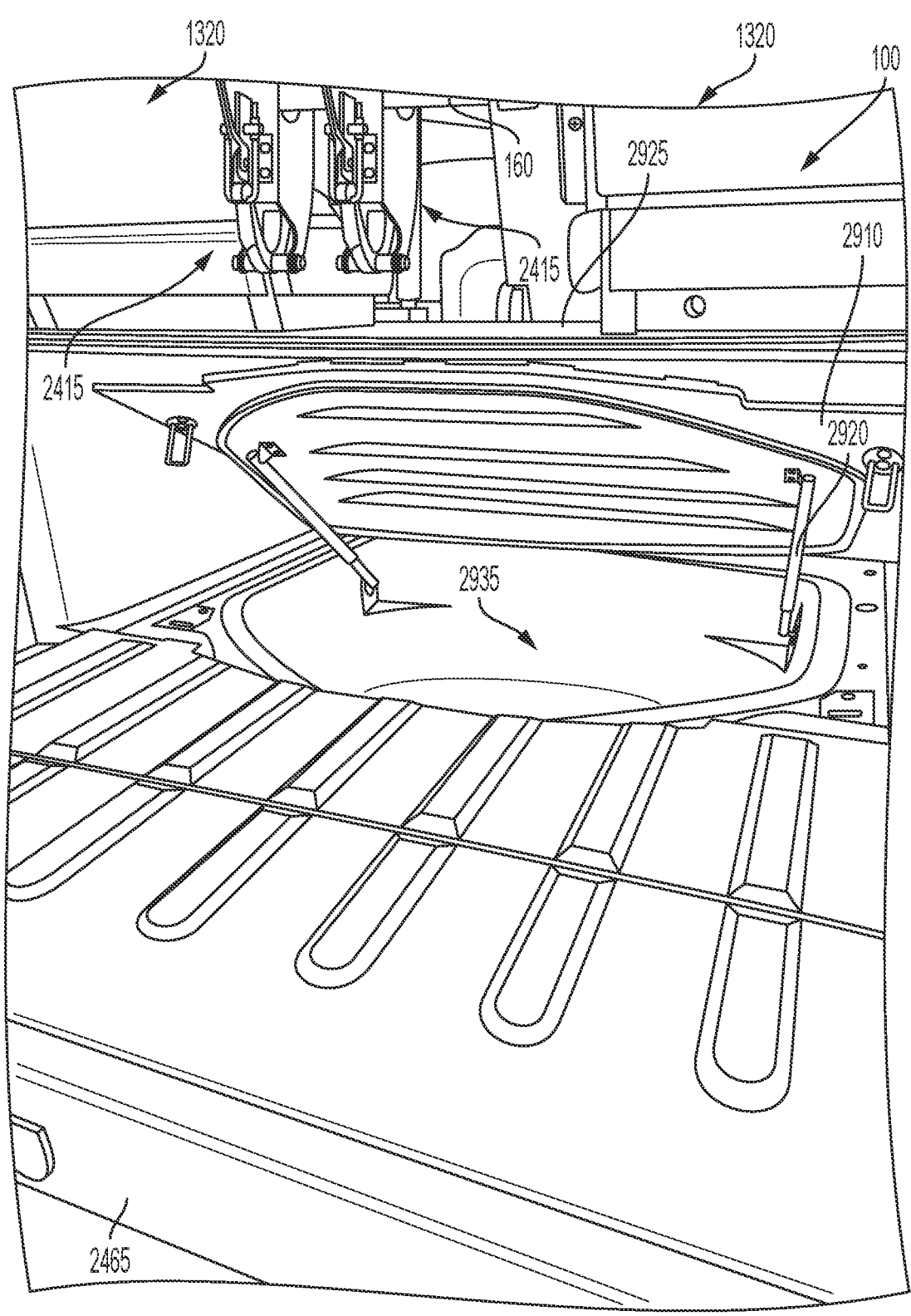
FIG. 29 depicts an example vehicle including a compartment under a seat of the vehicle, the compartment accessible through a tailgate.
Figure 30:
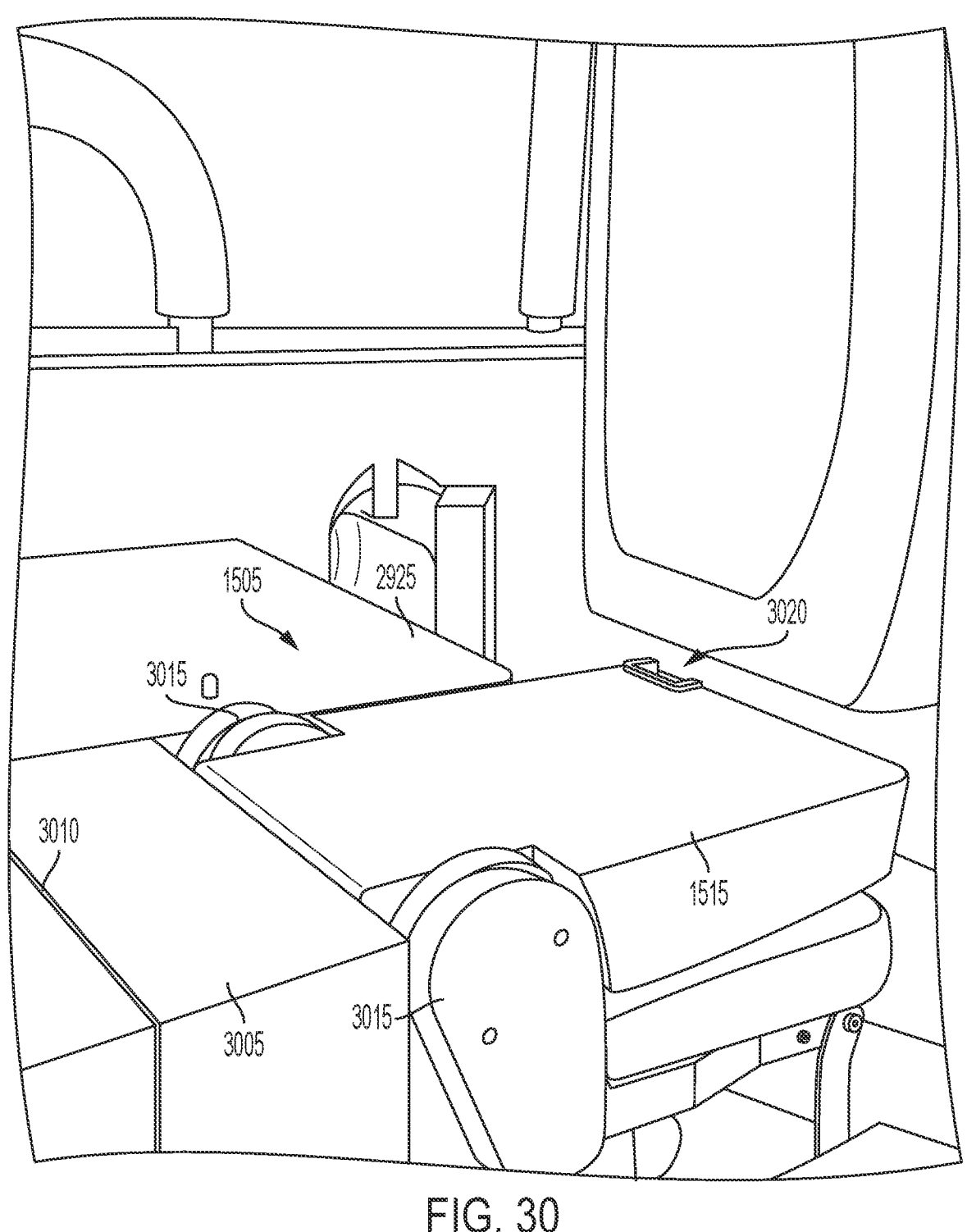
FIGS. 30-33 depict a chair of a vehicle that moves from a position stowed under a floor of a vehicle to a deployed position.
Figure 31:
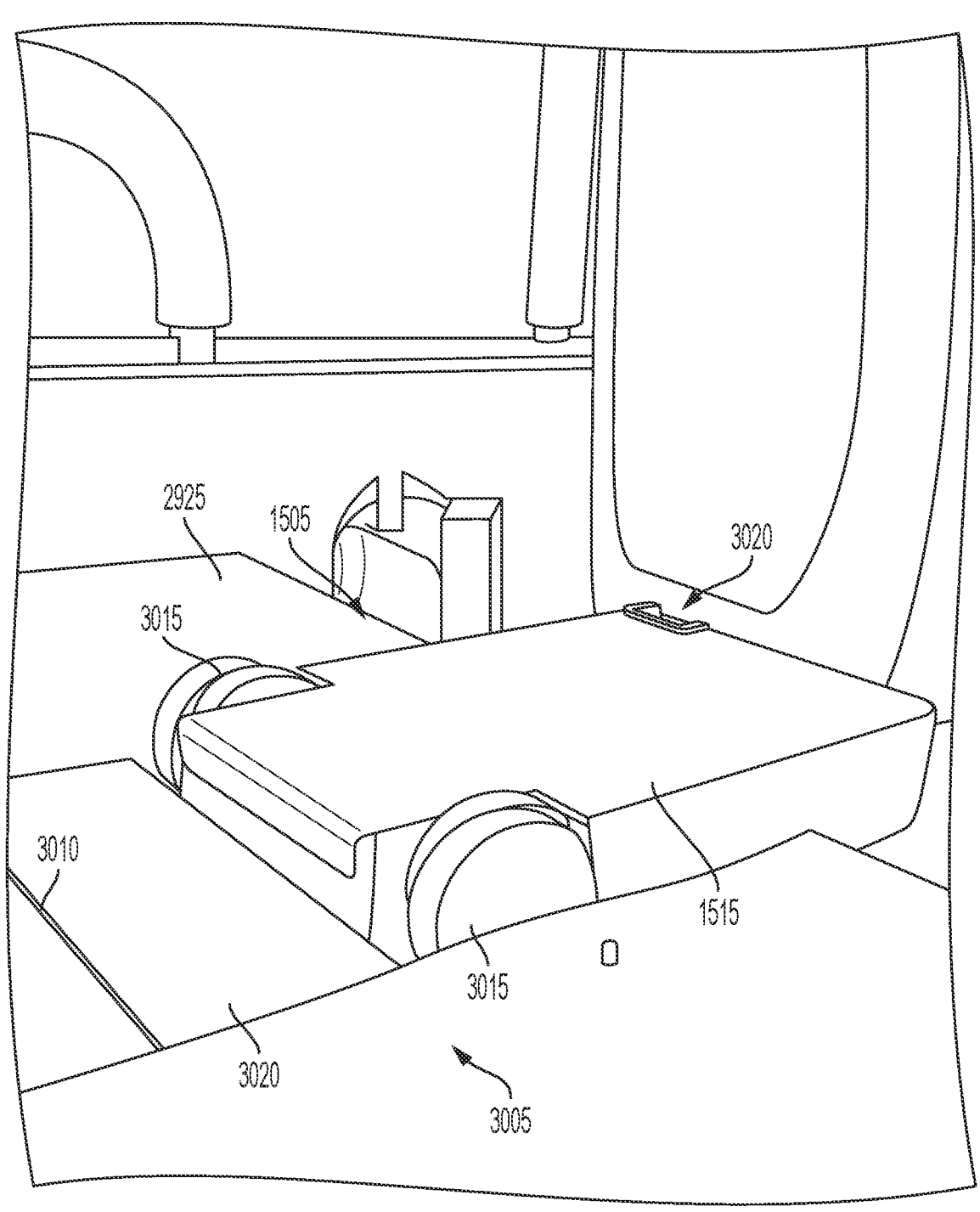
Figure 32:
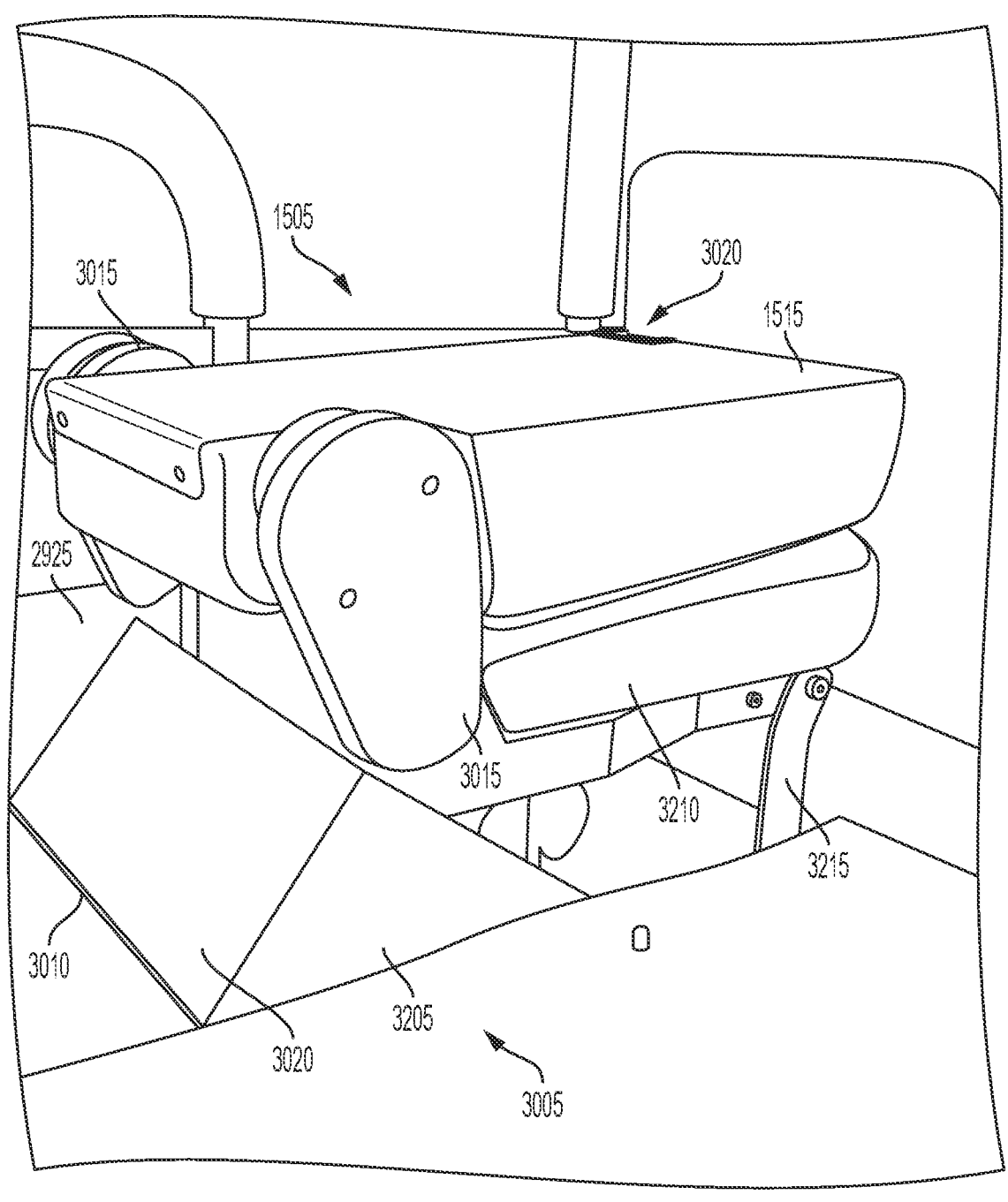
Figure 33:
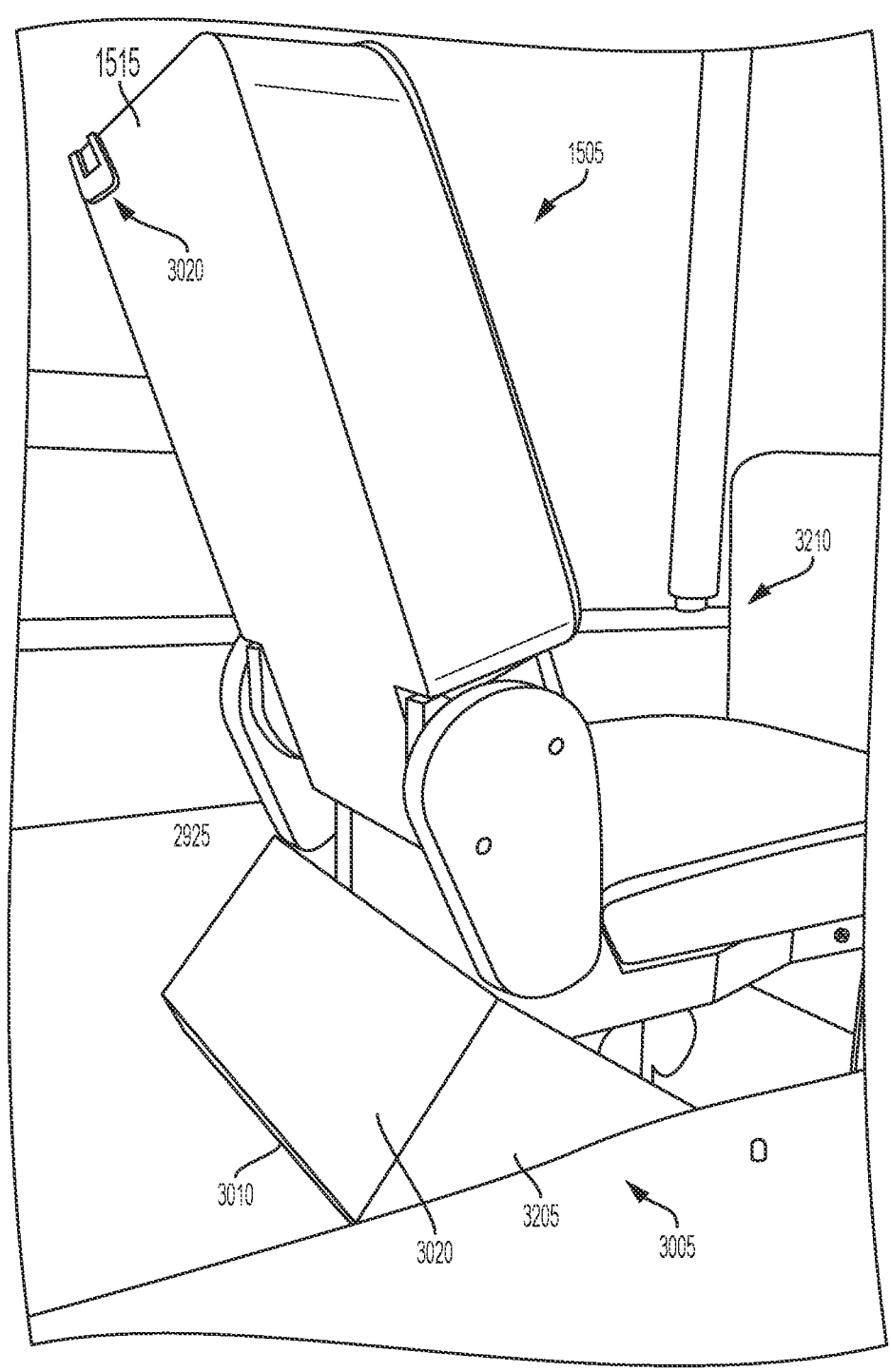

FIG. 29 depicts an example vehicle 100 including a compartment 2935 under a seat 1320 of the vehicle, the compartment 2935 accessible through a tailgate 2465. The compartment 2935 can be located under a floor 2925 of the vehicle 100. The seats 1320 can be coupled or fixed to the floor 2925 or a floor 2910 of the vehicle 100. A tailgate 2465 of the vehicle 100 can rotate between an upright position perpendicular with the floor 2925 or the floor 2910 of the vehicle 100 to an open position parallel with the floor 2925. The floor 2910 can cover the compartment 2935. The compartment 2935 can store objects such as tires 170, groceries, camping supplies, food, water, tools. A piston 2920 can support the floor 2910 in an open position. A first end of the piston 2920 can be coupled to the floor 2910. A second end of the piston 2920 can be coupled to a wall of the compartment 2935.

FIGS. 30-33 depict an example seat 1505 of the vehicle 100 that moves from a position stowed under the floor 2925 of the vehicle 100 to a deployed position. The seat 1505 can include a back 1515. When the seat 1505 is stowed, the back 1515 can be flush with the floor 2925, or parallel with the floor 2925. For example, a back surface of the back 1515 can be flush with, or parallel to, a top surface of the floor 2925. The back 1515 can include a plate or substrate formed out of carbon fiber, steel, iron, or plastic. The back 1515 can further include a cushion, foam portion, or pillow portion coupled to the plate. The plate of the back 1515 can be parallel with or flush with the floor 2925.

The seat 1505 can include at least one hinge 3015. The seat 1505 can include a first hinge 3015 coupled to a first side of the back 1515. The seat 1505 can include a second hinge 3015 coupled to a second side of the back 1515. A first portion of the hinge 3015 can be coupled to a seat portion 3210 of the seat 1505. A second portion of the hinge 3015 can be coupled with the seat portion 3210. The seat portion 3210 can include a plate or substrate formed out of carbon fiber, steel, iron, or plastic. The seat portion 3210 can further include a cushion, foam portion, or pillow portion coupled to the plate. The cushion of the seat portion 3210 and the cushion of the back 1515 can touch or come into contact when the seat 1505 is folded on the hinges 3015 or stowed under the floor 2925.

The seat 1505 can move from being under the floor 2925 to being above the floor 2925. One or more components such as hinges, supports, members, lifts, springs can lift the seat 1505 from under the floor 2925 to being above the floor 2925. The components can move the seat 1505 from being above the floor 2925 to below or parallel with the floor 2925. A component 3005 can cover at least a portion of the seat 1505 when the seat 1505 is stored under the floor 2925. The component 3005 can include a first side 3020. When the seat 1505 is under the floor 2925, the side 3020 can be flush or parallel with the floor 2925. The side 3020 can be coupled to a hinge 3010. The hinge 3010 can be coupled to the floor 2925. When the seat 1505 moves up from the floor 2925, the seat 1505 can push against the side 3020, causing the side 3020 to rotate on the hinge 3010.

The component 3005 can include at least one side 3205. The side 3205 can extend from an end of the side 3020 towards a surface under the vehicle 100. The side 3020 can extend from the side 3205 at a right angle. A first side 3205 can extend from a first end of the component 3005. A second side 3205 can extend from a second end of the component 3005 opposite the first end. The sides 3205 can raise from the floor 2925 when the seat 1505 is raised, and move below the floor 2925 when the seat 1505 is lowered. Once the seat 1505 is raised, the back 1515 can rotate on the hinges 3015 to an open position. Back 1515 can rotate on the hinges 3015 to a position forming an angle with the bottom 3210. The angle can be one hundred to one hundred twenty degrees. The angle can be ninety five to one hundred and twenty five degrees. The angle can be less than ninety five degrees. The angle can be greater than one hundred and twenty five degrees.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one imple- mentation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled or fixed elements can be electrically, mechanically, or physically coupled with one another directly or with intervening elements. Mechanically coupled elements can be fixed, fastened, welded, interlocked, connected, attached, linked, or joined. Scope of the systems and methods described herein is thus indicated by the appended claims, rather than the foregoing description, and changes that come within the meaning and range of equivalency of the claims are embraced therein.

What is claimed is:

1. An apparatus, comprising:
a door configured to couple with a side of a vehicle, the door comprising a step, the door configured to move the step;
a pin fixed to a sprag bearing that rotates with the door; and
the sprag bearing configured to rotate with the pin when the door is rotated to a closed position;
the sprag bearing configured to resist rotation of the pin and engage a load when the door is rotated to an open position.

2. The apparatus of claim 1, comprising:
the door comprising a hinge that rotates the door from a first position to a second position to cantilever the door from the side of the vehicle.

3. The apparatus of claim 1, comprising:
the door comprising:
a hinge configured to rotate a top side of the door from the vehicle down towards a ground surface under the vehicle.

4. The apparatus of claim 1, comprising:
the door comprising:
a hinge fixed to a bottom side of the door and the side of the vehicle, the hinge configured to rotate a top side of the door from the closed position down towards a ground surface under the vehicle.

5. The apparatus of claim 1, comprising:
the door comprising:
a stairway comprising:
the step comprising a back end; and
a second step comprising a front end aligned with or offset from the back end of the step.

6. The apparatus of claim 1, comprising:
the door comprising:
a stairway comprising:
the step comprising a left lateral wall and a right lateral wall; and
a second step comprising a left lateral wall offset in a direction from the left lateral wall of the step and comprising a right lateral wall offset in the direction from the right lateral wall of the step.

7. The apparatus of claim 1, comprising:
the door, comprising:
a frame within a housing of the door, the frame comprising the step;
a hinge fixed to the frame of the door and fixed to the side of the vehicle; and the frame configured to transfer a force exerted on the step to the side of the vehicle through the hinge.

8. The apparatus of claim 1, comprising:
the door comprising:
a handle, wherein an end of the handle extends beyond an end of the door towards a ground surface under the vehicle when the door is opened.

9. The apparatus of claim 1, comprising:
the door comprising a hinge, the hinge comprising:
the pin fixed to the sprag bearing that rotates with the door;
the sprag bearing configured to rotate with the pin when the door is rotated to the closed position;
the sprag bearing configured to resist rotation of the pin and turn a cylindrical component telescoped around the sprag bearing to turn the cylindrical component when the door is rotated to the open position; and
the cylindrical component configured to engage with the load, the load clamped to an end of the cylindrical component that resists rotation of the cylindrical component.

10. The apparatus of claim 1, comprising:
the door comprising a hinge that cantilevers the door from the side of the vehicle when the door is opened;
wherein the hinge is the only component that supports the door when the door is opened.

11. A vehicle, comprising:
a door configured to couple with a side of the vehicle, the door comprising a step, the door configured to move the step;
a pin fixed to a sprag bearing that rotates with the door; and
the sprag bearing configured to rotate with the pin when the door is rotated to a closed position;
the sprag bearing configured to resist rotation of the pin and engage a load when the door is rotated to an open position.

12. The vehicle of claim 11, comprising:
a front area, comprising:
a first row of seats; and
a second row of seats elevated above the first row of seats; and
a rear area, comprising:
a third row of seats elevated above the second row of seats, the third row of seats comprising a storage compartment between seats of the third row of seats and a floor of the vehicle; and
a fourth row of seats elevated above the third row of seats.

13. The vehicle of claim 11, comprising:
a rear area, comprising:
a first row of seats positioned a first distance from a front of the vehicle; and
a second row of seats positioned a second distance from the front of the vehicle greater than the first distance; and
the door configured to open to expose an opening on the side of the vehicle to access the first row of seats, the door positioned on the side of the vehicle a third distance from the front of the vehicle less than the first distance.

14. The vehicle of claim 11, comprising:
the door comprising:
a hinge configured to rotate a top side of the door from the vehicle down towards a ground surface under the vehicle.

15. The vehicle of claim 11, comprising:

the door comprising a hinge, the hinge comprising:

a bearing configured to rotate when the door is moved to the closed position; and the bearing configured to resist rotation and engage the load of the hinge when the door is moved to the open position.

16. A method, comprising:

coupling a door with a side of a vehicle, the door comprising a step fixing a pin with a sprag bearing that rotates with the door; and configuring the sprag bearing to rotate with the pin when the door is rotated to a closed position and resist rotation of the pin and engage a load when the door is rotated to an open position.

17. The method of claim 16, comprising:

coupling a hinge to the door and to the side of the vehicle;

rotating, via the hinge, a top side of the door from the vehicle down towards a ground surface under the vehicle.

18. The method of claim 16, comprising:

providing a bearing;

rotating, via the bearing, the door to move the door to the closed position;

resisting, via the bearing, rotation of the door when the door is moved to the open position; and engaging, via the bearing, the load when the door is moved to the open position.

19. The method of claim 16, comprising:

rotating, via the pin, the sprag bearing when the door is rotated to the closed position;

resisting, via the sprag bearing, rotation of the pin when the door is rotated to the open position;

turning, via the sprag bearing, a cylindrical component telescoped around the sprag bearing when the door is rotated to the open position; and engaging, via the cylindrical component, with load clamped to an end of the cylindrical component that resists rotation of the cylindrical component when the door is rotated to the open position.

\* \* \* \* \*